United States Patent
Kadayam et al.

(10) Patent No.: US 9,697,267 B2
(45) Date of Patent: Jul. 4, 2017

(54) METHODS AND SYSTEMS FOR PERFORMING EFFICIENT SNAPSHOTS IN TIERED DATA STRUCTURES

(71) Applicant: SanDisk Enterprise IP LLC, Milpitas, CA (US)

(72) Inventors: Harihara Kadayam, Fremont, CA (US); Niranjan Patre Neelakanta, Bangalore (IN); Ajit Kumar Tapse, Adoni (IN); Manavalan Krishnan, Fremont, CA (US); Brian Walter O'Krafka, Austin, TX (US); Johann George, Sunnyvale, CA (US)

(73) Assignee: SANDISK TECHNOLOGIES LLC, Plano, TX (US)

( * ) Notice: Subject to any disclaimer, the term of this patent is extended or adjusted under 35 U.S.C. 154(b) by 516 days.

(21) Appl. No.: 14/454,687

(22) Filed: Aug. 7, 2014

(65) Prior Publication Data
US 2015/0286695 A1  Oct. 8, 2015

(30) Foreign Application Priority Data

Apr. 3, 2014 (IN) .......................... 1798/CHE/2014

(51) Int. Cl.
G06F 17/30 (2006.01)
G06F 11/14 (2006.01)
G06F 3/06 (2006.01)

(52) U.S. Cl.
CPC .... G06F 17/30575 (2013.01); G06F 11/1448 (2013.01); G06F 17/30345 (2013.01);
(Continued)

(58) Field of Classification Search
CPC ............. G06F 11/1446; G06F 11/2071; G06F 11/2082; G06F 12/08; G06F 17/30345;
(Continued)

(56) References Cited

U.S. PATENT DOCUMENTS

| 4,173,737 A | 11/1979 | Skerlos et al. |
| 4,888,750 A | 12/1989 | Kryder et al. |

(Continued)

FOREIGN PATENT DOCUMENTS

| EA | 2 620 946 A2 | 7/2013 |
| EP | 1 299 800 | 4/2003 |

(Continued)

OTHER PUBLICATIONS

IBM Research—Zurich, "The Fundamental Limit of Flash Random Write Performance: Understanding, Analysis and Performance Modeling," Mar. 31, 2010, pp. 1-15.

(Continued)

*Primary Examiner* — Merilyn Nguyen
(74) *Attorney, Agent, or Firm* — Morgan, Lewis & Bockius LLP

(57) ABSTRACT

A memory controller detects a request, with a key to a data object and a value, to perform an operation. The memory controller locates the data object by mapping the key to a location of the data object in a tiered data structure and identifies a sequence number of the data object. When the sequence number of the data object is greater than a sequence number of a snapshot of the tiered data structure, the memory controller replaces the data object with a modified data object, including the key and the value, and assigns the modified object a unique sequence number. When the sequence number of the data object is less than the sequence number of the snapshot, the memory controller inserts a new data object, including the key and the value, into the tiered data structure and assigns the new data object the unique sequence number.

20 Claims, 22 Drawing Sheets

(52) U.S. Cl.
CPC ...... *G06F 17/30371* (2013.01); *G06F 3/0619* (2013.01); *G06F 3/0667* (2013.01); *G06F 3/0679* (2013.01)

(58) Field of Classification Search
CPC ............. G06F 12/0802; G06F 12/0806; G06F 17/30575; G06F 17/30371; G06F 17/3048; G06F 17/30589
See application file for complete search history.

(56) References Cited

U.S. PATENT DOCUMENTS

| | | | |
|---|---|---|---|
| 4,916,652 A | 4/1990 | Schwarz et al. | |
| 5,129,089 A | 7/1992 | Nielsen | |
| 5,270,979 A | 12/1993 | Harari et al. | |
| 5,329,491 A | 7/1994 | Brown et al. | |
| 5,381,528 A | 1/1995 | Brunelle | |
| 5,404,485 A | 4/1995 | Ban | |
| 5,488,702 A | 1/1996 | Byers et al. | |
| 5,519,847 A | 5/1996 | Fandrich et al. | |
| 5,530,705 A | 6/1996 | Malone | |
| 5,537,555 A | 7/1996 | Landry | |
| 5,551,003 A | 8/1996 | Mattson et al. | |
| 5,636,342 A | 6/1997 | Jeffries | |
| 5,657,332 A | 8/1997 | Auclair et al. | |
| 5,666,114 A | 9/1997 | Brodie et al. | |
| 5,708,849 A | 1/1998 | Coke et al. | |
| 5,765,185 A | 6/1998 | Lambrache et al. | |
| 5,890,193 A | 3/1999 | Chevallier | |
| 5,930,188 A | 7/1999 | Roohparvar | |
| 5,936,884 A | 8/1999 | Hasbun et al. | |
| 5,943,692 A | 8/1999 | Marberg et al. | |
| 5,946,714 A | 8/1999 | Miyauchi | |
| 5,982,664 A | 11/1999 | Watanabe | |
| 6,000,006 A | 12/1999 | Bruce et al. | |
| 6,006,345 A | 12/1999 | Berry, Jr. | |
| 6,016,560 A | 1/2000 | Wada et al. | |
| 6,018,304 A | 1/2000 | Bessios | |
| 6,044,472 A | 3/2000 | Crohas | |
| 6,070,074 A | 5/2000 | Perahia et al. | |
| 6,104,304 A | 8/2000 | Clark et al. | |
| 6,119,250 A | 9/2000 | Nishimura et al. | |
| 6,138,261 A | 10/2000 | Wilcoxson et al. | |
| 6,182,264 B1 | 1/2001 | Ott | |
| 6,192,092 B1 | 2/2001 | Dizon et al. | |
| 6,260,120 B1 | 7/2001 | Blumenau et al. | |
| 6,295,592 B1 | 9/2001 | Jeddeloh et al. | |
| 6,311,263 B1 | 10/2001 | Barlow et al. | |
| 6,408,394 B1 | 6/2002 | Vander Kamp et al. | |
| 6,412,042 B1 | 6/2002 | Paterson et al. | |
| 6,442,076 B1 | 8/2002 | Roohparvar | |
| 6,449,625 B1 | 9/2002 | Wang | |
| 6,484,224 B1 | 11/2002 | Robins et al. | |
| 6,516,437 B1 | 2/2003 | Van Stralen et al. | |
| 6,564,285 B1 | 5/2003 | Mills et al. | |
| 6,647,387 B1 | 11/2003 | McKean et al. | |
| 6,675,258 B1 | 1/2004 | Bramhall et al. | |
| 6,678,788 B1 | 1/2004 | O'Connell | |
| 6,728,879 B1 | 4/2004 | Atkinson | |
| 6,757,768 B1 | 6/2004 | Potter et al. | |
| 6,775,792 B2 | 8/2004 | Ulrich et al. | |
| 6,810,440 B2 | 10/2004 | Micalizzi, Jr. et al. | |
| 6,836,808 B2 | 12/2004 | Bunce et al. | |
| 6,836,815 B1 | 12/2004 | Purcell et al. | |
| 6,842,436 B2 | 1/2005 | Moeller | |
| 6,865,650 B1 | 3/2005 | Morley et al. | |
| 6,871,257 B2 | 3/2005 | Conley et al. | |
| 6,895,464 B2 | 5/2005 | Chow et al. | |
| 6,934,755 B1 | 8/2005 | Saulpaugh et al. | |
| 6,966,006 B2 | 11/2005 | Pacheco et al. | |
| 6,978,343 B1 | 12/2005 | Ichiriu | |
| 6,980,985 B1 | 12/2005 | Amer-Yahia et al. | |
| 6,981,205 B2 | 12/2005 | Fukushima et al. | |
| 6,988,171 B2 | 1/2006 | Beardsley et al. | |
| 7,020,017 B2 | 3/2006 | Chen et al. | |
| 7,024,514 B2 | 4/2006 | Mukaida et al. | |
| 7,028,165 B2 | 4/2006 | Roth et al. | |
| 7,032,123 B2 | 4/2006 | Kane et al. | |
| 7,043,505 B1 | 5/2006 | Teague et al. | |
| 7,076,598 B2 | 7/2006 | Wang | |
| 7,100,002 B2 | 8/2006 | Shrader et al. | |
| 7,102,860 B2 | 9/2006 | Wenzel | |
| 7,111,293 B1 | 9/2006 | Hersh et al. | |
| 7,126,873 B2 | 10/2006 | See et al. | |
| 7,133,282 B2 | 11/2006 | Sone | |
| 7,155,579 B1 | 12/2006 | Neils et al. | |
| 7,162,678 B2 | 1/2007 | Saliba | |
| 7,173,852 B2 | 2/2007 | Gorobets et al. | |
| 7,184,446 B2 | 2/2007 | Rashid et al. | |
| 7,212,440 B2 | 5/2007 | Gorobets | |
| 7,269,755 B2 | 9/2007 | Moshayedi et al. | |
| 7,275,170 B2 | 9/2007 | Suzuki | |
| 7,295,479 B2 | 11/2007 | Yoon et al. | |
| 7,328,377 B1 | 2/2008 | Lewis et al. | |
| 7,426,633 B2 | 9/2008 | Thompson et al. | |
| 7,486,561 B2 | 2/2009 | Mokhlesi | |
| 7,516,292 B2 | 4/2009 | Kimura et al. | |
| 7,523,157 B2 | 4/2009 | Aguilar, Jr. et al. | |
| 7,527,466 B2 | 5/2009 | Simmons | |
| 7,529,466 B2 | 5/2009 | Takahashi | |
| 7,533,214 B2 | 5/2009 | Aasheim et al. | |
| 7,546,478 B2 | 6/2009 | Kubo et al. | |
| 7,566,987 B2 | 7/2009 | Black et al. | |
| 7,571,277 B2 | 8/2009 | Mizushima | |
| 7,574,554 B2 | 8/2009 | Tanaka et al. | |
| 7,596,643 B2 | 9/2009 | Merry et al. | |
| 7,669,003 B2 | 2/2010 | Sinclair et al. | |
| 7,681,106 B2 | 3/2010 | Jarrar et al. | |
| 7,685,494 B1 | 3/2010 | Varnica et al. | |
| 7,707,481 B2 | 4/2010 | Kirschner et al. | |
| 7,761,655 B2 | 7/2010 | Mizushima et al. | |
| 7,765,454 B2 | 7/2010 | Passint | |
| 7,774,390 B2 | 8/2010 | Shin | |
| 7,809,836 B2 | 10/2010 | Mihm et al. | |
| 7,840,762 B2 | 11/2010 | Oh et al. | |
| 7,870,326 B2 | 1/2011 | Shin et al. | |
| 7,890,818 B2 | 2/2011 | Kong et al. | |
| 7,913,022 B1 | 3/2011 | Baxter | |
| 7,925,960 B2 | 4/2011 | Ho et al. | |
| 7,934,052 B2 | 4/2011 | Prins et al. | |
| 7,945,825 B2 | 5/2011 | Cohen et al. | |
| 7,954,041 B2 | 5/2011 | Hong et al. | |
| 7,971,112 B2 | 6/2011 | Murata | |
| 7,974,368 B2 | 7/2011 | Shieh et al. | |
| 7,978,516 B2 | 7/2011 | Olbrich | |
| 7,996,642 B1 | 8/2011 | Smith | |
| 8,006,161 B2 | 8/2011 | Lestable et al. | |
| 8,032,724 B1 | 10/2011 | Smith | |
| 8,041,884 B2 | 10/2011 | Chang | |
| 8,042,011 B2 | 10/2011 | Nicolaidis et al. | |
| 8,069,390 B2 | 11/2011 | Lin | |
| 8,190,967 B2 | 5/2012 | Hong et al. | |
| 8,250,380 B2 | 8/2012 | Guyot | |
| 8,254,181 B2 | 8/2012 | Hwang et al. | |
| 8,259,506 B1 | 9/2012 | Sommer et al. | |
| 8,261,020 B2 * | 9/2012 | Krishnaprasad .... G06F 12/0813 711/118 |
| 8,312,349 B2 | 11/2012 | Reche et al. | |
| 8,385,117 B2 | 2/2013 | Sakurada et al. | |
| 8,412,985 B1 | 4/2013 | Bowers et al. | |
| 8,429,436 B2 | 4/2013 | Fillingim et al. | |
| 8,438,459 B2 | 5/2013 | Cho et al. | |
| 8,453,022 B2 | 5/2013 | Katz | |
| 8,473,680 B1 | 6/2013 | Pruthi | |
| 8,510,499 B1 | 8/2013 | Banerjee | |
| 8,531,888 B2 | 9/2013 | Chilappagari et al. | |
| 8,554,984 B2 | 10/2013 | Yano et al. | |
| 8,627,117 B2 | 1/2014 | Johnston | |
| 8,634,248 B1 | 1/2014 | Sprouse et al. | |
| 8,694,854 B1 | 4/2014 | Dar et al. | |
| 8,700,842 B2 * | 4/2014 | Dinker ............. G06F 17/30519 711/103 |
| 8,724,789 B2 | 5/2014 | Altberg et al. | |
| 8,775,741 B1 | 7/2014 | de la Iglesia | |

(56) References Cited

U.S. PATENT DOCUMENTS

| | | |
|---|---|---|
| 8,788,778 B1 | 7/2014 | Boyle |
| 8,832,384 B1 | 9/2014 | de la Iglesia |
| 8,849,825 B1* | 9/2014 | McHugh .............. G06F 17/3023 |
| | | 707/737 |
| 8,874,992 B2 | 10/2014 | Desireddi et al. |
| 8,885,434 B2 | 11/2014 | Kumar |
| 8,898,373 B1 | 11/2014 | Kang et al. |
| 8,909,894 B1 | 12/2014 | Singh et al. |
| 8,910,030 B2 | 12/2014 | Goel |
| 8,923,066 B1 | 12/2014 | Subramanian et al. |
| 8,928,681 B1 | 1/2015 | Edmondson et al. |
| 9,002,805 B1* | 4/2015 | Barber .............. G06F 17/30303 |
| | | 707/692 |
| 9,043,517 B1 | 5/2015 | Sprouse et al. |
| 9,052,942 B1* | 6/2015 | Barber .................. G06F 9/4843 |
| 9,063,946 B1* | 6/2015 | Barber .............. G06F 17/30117 |
| 9,110,843 B2 | 8/2015 | Chiu et al. |
| 9,128,690 B2 | 9/2015 | Lotzenburger et al. |
| 9,329,789 B1 | 5/2016 | Chu et al. |
| 9,355,060 B1* | 5/2016 | Barber ................ H04L 67/1097 |
| 9,417,917 B1* | 8/2016 | Barber .................. G06F 9/5005 |
| 2001/0026949 A1 | 10/2001 | Ogawa et al. |
| 2001/0050824 A1 | 12/2001 | Buch |
| 2002/0024846 A1 | 2/2002 | Kawahara et al. |
| 2002/0032891 A1 | 3/2002 | Yada et al. |
| 2002/0036515 A1 | 3/2002 | Eldridge et al. |
| 2002/0083299 A1 | 6/2002 | Van Huben et al. |
| 2002/0099904 A1 | 7/2002 | Conley |
| 2002/0116651 A1 | 8/2002 | Beckert et al. |
| 2002/0122334 A1 | 9/2002 | Lee et al. |
| 2002/0152305 A1 | 10/2002 | Jackson et al. |
| 2002/0162075 A1 | 10/2002 | Talagala et al. |
| 2002/0165896 A1 | 11/2002 | Kim |
| 2003/0041299 A1 | 2/2003 | Kanazawa et al. |
| 2003/0043829 A1 | 3/2003 | Rashid |
| 2003/0079172 A1 | 4/2003 | Yamagishi et al. |
| 2003/0088805 A1 | 5/2003 | Majni et al. |
| 2003/0093628 A1 | 5/2003 | Matter et al. |
| 2003/0163594 A1 | 8/2003 | Aasheim et al. |
| 2003/0163629 A1 | 8/2003 | Conley et al. |
| 2003/0188045 A1 | 10/2003 | Jacobson |
| 2003/0189856 A1 | 10/2003 | Cho et al. |
| 2003/0198100 A1 | 10/2003 | Matsushita et al. |
| 2003/0204341 A1 | 10/2003 | Guliani et al. |
| 2003/0212719 A1 | 11/2003 | Yasuda et al. |
| 2003/0225961 A1 | 12/2003 | Chow et al. |
| 2004/0024957 A1 | 2/2004 | Lin et al. |
| 2004/0024963 A1 | 2/2004 | Talagala et al. |
| 2004/0057575 A1 | 3/2004 | Zhang et al. |
| 2004/0062157 A1 | 4/2004 | Kawabe |
| 2004/0073829 A1 | 4/2004 | Olarig |
| 2004/0085849 A1 | 5/2004 | Myoung et al. |
| 2004/0114265 A1 | 6/2004 | Talbert |
| 2004/0143710 A1 | 7/2004 | Walmsley |
| 2004/0148561 A1 | 7/2004 | Shen et al. |
| 2004/0153902 A1 | 8/2004 | Machado et al. |
| 2004/0158775 A1 | 8/2004 | Shibuya et al. |
| 2004/0167898 A1 | 8/2004 | Margolus et al. |
| 2004/0181734 A1 | 9/2004 | Saliba |
| 2004/0199714 A1 | 10/2004 | Estakhri et al. |
| 2004/0210706 A1 | 10/2004 | In et al. |
| 2004/0237018 A1 | 11/2004 | Riley |
| 2005/0060456 A1 | 3/2005 | Shrader et al. |
| 2005/0060501 A1 | 3/2005 | Shrader |
| 2005/0073884 A1 | 4/2005 | Gonzalez et al. |
| 2005/0108588 A1 | 5/2005 | Yuan |
| 2005/0114587 A1 | 5/2005 | Chou et al. |
| 2005/0138442 A1 | 6/2005 | Keller, Jr. et al. |
| 2005/0144358 A1 | 6/2005 | Conley et al. |
| 2005/0144361 A1 | 6/2005 | Gonzalez et al. |
| 2005/0144367 A1 | 6/2005 | Sinclair |
| 2005/0144516 A1 | 6/2005 | Gonzalez et al. |
| 2005/0154825 A1 | 7/2005 | Fair |
| 2005/0172065 A1 | 8/2005 | Keays |
| 2005/0172207 A1 | 8/2005 | Radke et al. |
| 2005/0193161 A1 | 9/2005 | Lee et al. |
| 2005/0201148 A1 | 9/2005 | Chen et al. |
| 2005/0210348 A1 | 9/2005 | Totsuka |
| 2005/0231765 A1 | 10/2005 | So et al. |
| 2005/0249013 A1 | 11/2005 | Janzen et al. |
| 2005/0251617 A1 | 11/2005 | Sinclair et al. |
| 2005/0257120 A1 | 11/2005 | Gorobets et al. |
| 2005/0273560 A1 | 12/2005 | Hulbert et al. |
| 2005/0281088 A1 | 12/2005 | Ishidoshiro et al. |
| 2005/0289314 A1 | 12/2005 | Adusumilli et al. |
| 2006/0010174 A1 | 1/2006 | Nguyen et al. |
| 2006/0039196 A1 | 2/2006 | Gorobets et al. |
| 2006/0039227 A1 | 2/2006 | Lai et al. |
| 2006/0053246 A1 | 3/2006 | Lee |
| 2006/0062054 A1 | 3/2006 | Hamilton et al. |
| 2006/0069932 A1 | 3/2006 | Oshikawa et al. |
| 2006/0085671 A1 | 4/2006 | Majni et al. |
| 2006/0087893 A1 | 4/2006 | Nishihara et al. |
| 2006/0103480 A1 | 5/2006 | Moon et al. |
| 2006/0107181 A1 | 5/2006 | Dave et al. |
| 2006/0136570 A1 | 6/2006 | Pandya |
| 2006/0136655 A1 | 6/2006 | Gorobets et al. |
| 2006/0136681 A1 | 6/2006 | Jain et al. |
| 2006/0156177 A1 | 7/2006 | Kottapalli et al. |
| 2006/0184738 A1 | 8/2006 | Bridges et al. |
| 2006/0195650 A1 | 8/2006 | Su et al. |
| 2006/0209592 A1 | 9/2006 | Li et al. |
| 2006/0224841 A1 | 10/2006 | Terai et al. |
| 2006/0244049 A1 | 11/2006 | Yaoi et al. |
| 2006/0259528 A1 | 11/2006 | Dussud et al. |
| 2006/0265568 A1 | 11/2006 | Burton |
| 2006/0291301 A1 | 12/2006 | Ziegelmayer |
| 2007/0011413 A1 | 1/2007 | Nonaka et al. |
| 2007/0033376 A1 | 2/2007 | Sinclair et al. |
| 2007/0058446 A1 | 3/2007 | Hwang et al. |
| 2007/0061597 A1 | 3/2007 | Holtzman et al. |
| 2007/0076479 A1 | 4/2007 | Kim et al. |
| 2007/0081408 A1 | 4/2007 | Kwon et al. |
| 2007/0083697 A1 | 4/2007 | Birrell et al. |
| 2007/0088716 A1 | 4/2007 | Brumme et al. |
| 2007/0091677 A1 | 4/2007 | Lasser et al. |
| 2007/0101096 A1 | 5/2007 | Gorobets |
| 2007/0106679 A1 | 5/2007 | Perrin et al. |
| 2007/0113019 A1 | 5/2007 | Beukema |
| 2007/0133312 A1 | 6/2007 | Roohparvar |
| 2007/0147113 A1 | 6/2007 | Mokhlesi et al. |
| 2007/0150790 A1 | 6/2007 | Gross et al. |
| 2007/0156842 A1 | 7/2007 | Vermeulen et al. |
| 2007/0157064 A1 | 7/2007 | Falik et al. |
| 2007/0174579 A1 | 7/2007 | Shin |
| 2007/0180188 A1 | 8/2007 | Fujbayashi et al. |
| 2007/0180346 A1 | 8/2007 | Murin |
| 2007/0191993 A1 | 8/2007 | Wyatt |
| 2007/0201274 A1 | 8/2007 | Yu et al. |
| 2007/0204128 A1 | 8/2007 | Lee et al. |
| 2007/0208901 A1 | 9/2007 | Purcell et al. |
| 2007/0234143 A1 | 10/2007 | Kim |
| 2007/0245061 A1 | 10/2007 | Harriman |
| 2007/0245099 A1 | 10/2007 | Gray et al. |
| 2007/0263442 A1 | 11/2007 | Cornwell et al. |
| 2007/0268754 A1 | 11/2007 | Lee et al. |
| 2007/0277036 A1 | 11/2007 | Chamberlain et al. |
| 2007/0279988 A1 | 12/2007 | Nguyen |
| 2007/0291556 A1 | 12/2007 | Kamei |
| 2007/0294496 A1 | 12/2007 | Goss et al. |
| 2007/0300130 A1 | 12/2007 | Gorobets |
| 2008/0013390 A1 | 1/2008 | Zipprich-Rasch |
| 2008/0019182 A1 | 1/2008 | Yanagidaira et al. |
| 2008/0022163 A1 | 1/2008 | Tanaka et al. |
| 2008/0028275 A1 | 1/2008 | Chen et al. |
| 2008/0043871 A1 | 2/2008 | Latouche et al. |
| 2008/0052446 A1 | 2/2008 | Lasser et al. |
| 2008/0052451 A1 | 2/2008 | Pua et al. |
| 2008/0056005 A1 | 3/2008 | Aritome |
| 2008/0059602 A1 | 3/2008 | Matsuda et al. |
| 2008/0071971 A1 | 3/2008 | Kim et al. |
| 2008/0077841 A1 | 3/2008 | Gonzalez et al. |
| 2008/0077937 A1 | 3/2008 | Shin et al. |
| 2008/0086677 A1 | 4/2008 | Yang et al. |

(56) References Cited

U.S. PATENT DOCUMENTS

| | | |
|---|---|---|
| 2008/0112226 A1 | 5/2008 | Mokhlesi |
| 2008/0141043 A1 | 6/2008 | Flynn et al. |
| 2008/0144371 A1 | 6/2008 | Yeh et al. |
| 2008/0147714 A1 | 6/2008 | Breternitz et al. |
| 2008/0147964 A1 | 6/2008 | Chow et al. |
| 2008/0147998 A1 | 6/2008 | Jeong |
| 2008/0148124 A1 | 6/2008 | Zhang et al. |
| 2008/0163030 A1 | 7/2008 | Lee |
| 2008/0168191 A1 | 7/2008 | Biran et al. |
| 2008/0168319 A1 | 7/2008 | Lee et al. |
| 2008/0170460 A1 | 7/2008 | Oh et al. |
| 2008/0180084 A1 | 7/2008 | Dougherty et al. |
| 2008/0209282 A1 | 8/2008 | Lee et al. |
| 2008/0229000 A1 | 9/2008 | Kim |
| 2008/0229003 A1 | 9/2008 | Mizushima et al. |
| 2008/0229176 A1 | 9/2008 | Arnez et al. |
| 2008/0270680 A1 | 10/2008 | Chang |
| 2008/0282128 A1 | 11/2008 | Lee et al. |
| 2008/0285351 A1 | 11/2008 | Shlick et al. |
| 2008/0313132 A1 | 12/2008 | Hao et al. |
| 2008/0320110 A1 | 12/2008 | Pathak |
| 2009/0003046 A1 | 1/2009 | Nirschl et al. |
| 2009/0003058 A1 | 1/2009 | Kang |
| 2009/0019216 A1 | 1/2009 | Yamada et al. |
| 2009/0031083 A1 | 1/2009 | Willis et al. |
| 2009/0037652 A1 | 2/2009 | Yu et al. |
| 2009/0070608 A1 | 3/2009 | Kobayashi |
| 2009/0116283 A1 | 5/2009 | Ha et al. |
| 2009/0125671 A1 | 5/2009 | Flynn et al. |
| 2009/0144598 A1 | 6/2009 | Yoon et al. |
| 2009/0158288 A1 | 6/2009 | Fulton et al. |
| 2009/0168525 A1 | 7/2009 | Olbrich et al. |
| 2009/0172258 A1 | 7/2009 | Olbrich et al. |
| 2009/0172259 A1 | 7/2009 | Prins et al. |
| 2009/0172260 A1 | 7/2009 | Olbrich et al. |
| 2009/0172261 A1 | 7/2009 | Prins et al. |
| 2009/0172262 A1 | 7/2009 | Olbrich et al. |
| 2009/0172308 A1 | 7/2009 | Prins et al. |
| 2009/0172335 A1 | 7/2009 | Kulkarni et al. |
| 2009/0172499 A1 | 7/2009 | Olbrich et al. |
| 2009/0193058 A1 | 7/2009 | Reid |
| 2009/0204823 A1 | 8/2009 | Giordano et al. |
| 2009/0207660 A1 | 8/2009 | Hwang et al. |
| 2009/0213649 A1 | 8/2009 | Takahashi et al. |
| 2009/0222708 A1 | 9/2009 | Yamaga |
| 2009/0228761 A1 | 9/2009 | Perlmutter et al. |
| 2009/0235128 A1 | 9/2009 | Eun et al. |
| 2009/0249160 A1 | 10/2009 | Gao et al. |
| 2009/0251962 A1 | 10/2009 | Yun et al. |
| 2009/0268521 A1 | 10/2009 | Ueno et al. |
| 2009/0292972 A1 | 11/2009 | Seol et al. |
| 2009/0296466 A1 | 12/2009 | Kim et al. |
| 2009/0296486 A1 | 12/2009 | Kim et al. |
| 2009/0310422 A1 | 12/2009 | Edahiro et al. |
| 2009/0319864 A1 | 12/2009 | Shrader |
| 2010/0002506 A1 | 1/2010 | Cho et al. |
| 2010/0008175 A1 | 1/2010 | Sweere et al. |
| 2010/0011261 A1 | 1/2010 | Cagno et al. |
| 2010/0020620 A1 | 1/2010 | Kim et al. |
| 2010/0037012 A1 | 2/2010 | Yano et al. |
| 2010/0054034 A1 | 3/2010 | Furuta et al. |
| 2010/0061151 A1 | 3/2010 | Miwa et al. |
| 2010/0091535 A1 | 4/2010 | Sommer et al. |
| 2010/0103737 A1 | 4/2010 | Park |
| 2010/0110798 A1 | 5/2010 | Hoei et al. |
| 2010/0115206 A1 | 5/2010 | de la Iglesia et al. |
| 2010/0118608 A1 | 5/2010 | Song et al. |
| 2010/0138592 A1 | 6/2010 | Cheon |
| 2010/0153616 A1 | 6/2010 | Garratt |
| 2010/0161936 A1 | 6/2010 | Royer et al. |
| 2010/0174959 A1 | 7/2010 | No et al. |
| 2010/0185807 A1 | 7/2010 | Meng et al. |
| 2010/0199027 A1 | 8/2010 | Pucheral et al. |
| 2010/0199125 A1 | 8/2010 | Reche |
| 2010/0199138 A1 | 8/2010 | Rho |
| 2010/0202196 A1 | 8/2010 | Lee et al. |
| 2010/0202239 A1 | 8/2010 | Moshayedi et al. |
| 2010/0208521 A1 | 8/2010 | Kim et al. |
| 2010/0257379 A1 | 10/2010 | Wang et al. |
| 2010/0262889 A1 | 10/2010 | Bains |
| 2010/0281207 A1 | 11/2010 | Miller et al. |
| 2010/0281342 A1 | 11/2010 | Chang et al. |
| 2010/0306222 A1 | 12/2010 | Freedman et al. |
| 2010/0332858 A1 | 12/2010 | Trantham et al. |
| 2010/0332863 A1 | 12/2010 | Johnston |
| 2011/0010514 A1 | 1/2011 | Benhase et al. |
| 2011/0022779 A1 | 1/2011 | Lund et al. |
| 2011/0022819 A1 | 1/2011 | Post et al. |
| 2011/0051513 A1 | 3/2011 | Shen et al. |
| 2011/0066597 A1 | 3/2011 | Mashtizadeh et al. |
| 2011/0066806 A1 | 3/2011 | Chhugani et al. |
| 2011/0072207 A1 | 3/2011 | Jin et al. |
| 2011/0072302 A1 | 3/2011 | Sartore |
| 2011/0078407 A1 | 3/2011 | Lewis |
| 2011/0078496 A1 | 3/2011 | Jeddeloh |
| 2011/0083060 A1 | 4/2011 | Sakurada et al. |
| 2011/0099460 A1 | 4/2011 | Dusija et al. |
| 2011/0113281 A1 | 5/2011 | Zhang et al. |
| 2011/0122691 A1 | 5/2011 | Sprouse |
| 2011/0131444 A1 | 6/2011 | Buch et al. |
| 2011/0138260 A1 | 6/2011 | Savin |
| 2011/0173378 A1 | 7/2011 | Filor et al. |
| 2011/0179249 A1 | 7/2011 | Hsiao |
| 2011/0199825 A1 | 8/2011 | Han et al. |
| 2011/0205823 A1 | 8/2011 | Hemink et al. |
| 2011/0213920 A1 | 9/2011 | Frost et al. |
| 2011/0222342 A1 | 9/2011 | Yoon et al. |
| 2011/0225346 A1 | 9/2011 | Goss et al. |
| 2011/0225347 A1 | 9/2011 | Goss et al. |
| 2011/0228601 A1 | 9/2011 | Olbrich et al. |
| 2011/0231600 A1 | 9/2011 | Tanaka et al. |
| 2011/0239077 A1 | 9/2011 | Bai et al. |
| 2011/0264843 A1 | 10/2011 | Haines et al. |
| 2011/0271040 A1 | 11/2011 | Kamizono |
| 2011/0283119 A1 | 11/2011 | Szu et al. |
| 2011/0289125 A1 | 11/2011 | Guthery |
| 2011/0320733 A1 | 12/2011 | Sanford et al. |
| 2012/0011393 A1 | 1/2012 | Roberts et al. |
| 2012/0017053 A1 | 1/2012 | Yang et al. |
| 2012/0023144 A1 | 1/2012 | Rub |
| 2012/0026799 A1 | 2/2012 | Lee |
| 2012/0054414 A1 | 3/2012 | Tsai et al. |
| 2012/0063234 A1 | 3/2012 | Shiga et al. |
| 2012/0072639 A1 | 3/2012 | Goss et al. |
| 2012/0096217 A1 | 4/2012 | Son et al. |
| 2012/0110250 A1 | 5/2012 | Sabbag et al. |
| 2012/0117317 A1 | 5/2012 | Sheffler |
| 2012/0117397 A1 | 5/2012 | Kolvick et al. |
| 2012/0124273 A1 | 5/2012 | Goss et al. |
| 2012/0131286 A1 | 5/2012 | Faith et al. |
| 2012/0151124 A1 | 6/2012 | Baek et al. |
| 2012/0151253 A1 | 6/2012 | Horn |
| 2012/0151294 A1 | 6/2012 | Yoo et al. |
| 2012/0173797 A1 | 7/2012 | Shen |
| 2012/0173826 A1 | 7/2012 | Takaku |
| 2012/0185750 A1 | 7/2012 | Hayami |
| 2012/0195126 A1 | 8/2012 | Roohparvar |
| 2012/0203804 A1 | 8/2012 | Burka et al. |
| 2012/0203951 A1 | 8/2012 | Wood et al. |
| 2012/0210095 A1 | 8/2012 | Nellans et al. |
| 2012/0216079 A1 | 8/2012 | Fai et al. |
| 2012/0233391 A1 | 9/2012 | Frost et al. |
| 2012/0236658 A1 | 9/2012 | Byom et al. |
| 2012/0239858 A1 | 9/2012 | Melik-Martirosian |
| 2012/0239868 A1 | 9/2012 | Ryan et al. |
| 2012/0239976 A1 | 9/2012 | Cometti et al. |
| 2012/0246204 A1 | 9/2012 | Nalla et al. |
| 2012/0259863 A1 | 10/2012 | Bodwin et al. |
| 2012/0275466 A1 | 11/2012 | Bhadra et al. |
| 2012/0278564 A1 | 11/2012 | Goss et al. |
| 2012/0284574 A1 | 11/2012 | Avila et al. |
| 2012/0284587 A1 | 11/2012 | Yu et al. |
| 2012/0297122 A1 | 11/2012 | Gorobets |
| 2013/0007073 A1 | 1/2013 | Varma |

(56) References Cited

U.S. PATENT DOCUMENTS

| | | |
|---|---|---|
| 2013/0007343 A1 | 1/2013 | Rub et al. |
| 2013/0007381 A1 | 1/2013 | Palmer |
| 2013/0007543 A1 | 1/2013 | Goss et al. |
| 2013/0024735 A1 | 1/2013 | Chung et al. |
| 2013/0031438 A1 | 1/2013 | Hu et al. |
| 2013/0036418 A1 | 2/2013 | Yadappanavar et al. |
| 2013/0038380 A1 | 2/2013 | Cordero et al. |
| 2013/0047045 A1 | 2/2013 | Hu et al. |
| 2013/0058145 A1 | 3/2013 | Yu et al. |
| 2013/0070527 A1 | 3/2013 | Sabbag et al. |
| 2013/0073784 A1 | 3/2013 | Ng et al. |
| 2013/0073798 A1 | 3/2013 | Kang et al. |
| 2013/0073924 A1 | 3/2013 | D'Abreu et al. |
| 2013/0079942 A1 | 3/2013 | Smola et al. |
| 2013/0086131 A1 | 4/2013 | Hunt et al. |
| 2013/0086132 A1 | 4/2013 | Hunt et al. |
| 2013/0094288 A1 | 4/2013 | Patapoutian et al. |
| 2013/0103978 A1 | 4/2013 | Akutsu |
| 2013/0110891 A1 | 5/2013 | Ogasawara et al. |
| 2013/0111279 A1 | 5/2013 | Jeon et al. |
| 2013/0111298 A1 | 5/2013 | Seroff et al. |
| 2013/0117606 A1 | 5/2013 | Anholt et al. |
| 2013/0121084 A1 | 5/2013 | Jeon et al. |
| 2013/0124792 A1 | 5/2013 | Melik-Martirosian et al. |
| 2013/0124888 A1 | 5/2013 | Tanaka et al. |
| 2013/0128666 A1 | 5/2013 | Avila et al. |
| 2013/0132647 A1 | 5/2013 | Melik-Martirosian |
| 2013/0132652 A1 | 5/2013 | Wood et al. |
| 2013/0159609 A1 | 6/2013 | Haas et al. |
| 2013/0176784 A1 | 7/2013 | Cometti et al. |
| 2013/0179646 A1 | 7/2013 | Okubo et al. |
| 2013/0191601 A1 | 7/2013 | Peterson et al. |
| 2013/0194865 A1 | 8/2013 | Bandic et al. |
| 2013/0194874 A1 | 8/2013 | Mu et al. |
| 2013/0232289 A1 | 9/2013 | Zhong et al. |
| 2013/0238576 A1 | 9/2013 | Binkert et al. |
| 2013/0254498 A1 | 9/2013 | Adachi et al. |
| 2013/0254507 A1 | 9/2013 | Islam et al. |
| 2013/0258738 A1 | 10/2013 | Barkon et al. |
| 2013/0265838 A1 | 10/2013 | Li |
| 2013/0282955 A1 | 10/2013 | Parker et al. |
| 2013/0290611 A1 | 10/2013 | Biederman et al. |
| 2013/0297613 A1 | 11/2013 | Yu |
| 2013/0301373 A1 | 11/2013 | Tam |
| 2013/0304980 A1 | 11/2013 | Nachimuthu et al. |
| 2013/0314988 A1 | 11/2013 | Desireddi et al. |
| 2013/0343131 A1 | 12/2013 | Wu et al. |
| 2013/0346672 A1 | 12/2013 | Sengupta et al. |
| 2014/0013027 A1 | 1/2014 | Jannyavula Venkata et al. |
| 2014/0013188 A1 | 1/2014 | Wu et al. |
| 2014/0025864 A1 | 1/2014 | Zhang et al. |
| 2014/0032890 A1 | 1/2014 | Lee et al. |
| 2014/0063905 A1 | 3/2014 | Ahn et al. |
| 2014/0067761 A1 | 3/2014 | Chakrabarti et al. |
| 2014/0071761 A1 | 3/2014 | Sharon et al. |
| 2014/0075133 A1 | 3/2014 | Li et al. |
| 2014/0082261 A1 | 3/2014 | Cohen et al. |
| 2014/0082310 A1 | 3/2014 | Nakajima |
| 2014/0082456 A1 | 3/2014 | Li et al. |
| 2014/0082459 A1 | 3/2014 | Li et al. |
| 2014/0095775 A1 | 4/2014 | Talagala et al. |
| 2014/0101389 A1 | 4/2014 | Nellans et al. |
| 2014/0115238 A1 | 4/2014 | Xi et al. |
| 2014/0122818 A1 | 5/2014 | Hayasaka et al. |
| 2014/0122907 A1 | 5/2014 | Johnston |
| 2014/0136762 A1 | 5/2014 | Li et al. |
| 2014/0136883 A1 | 5/2014 | Cohen |
| 2014/0136927 A1 | 5/2014 | Li et al. |
| 2014/0143505 A1 | 5/2014 | Sim et al. |
| 2014/0153333 A1 | 6/2014 | Avila et al. |
| 2014/0157065 A1 | 6/2014 | Ong |
| 2014/0173224 A1 | 6/2014 | Fleischer et al. |
| 2014/0181458 A1 | 6/2014 | Loh et al. |
| 2014/0201596 A1 | 7/2014 | Baum et al. |
| 2014/0223084 A1 | 8/2014 | Lee et al. |
| 2014/0244578 A1 | 8/2014 | Winkelstraeter |
| 2014/0258755 A1 | 9/2014 | Stenfort |
| 2014/0269090 A1 | 9/2014 | Flynn et al. |
| 2014/0279909 A1* | 9/2014 | Sudarsanam ..... G06F 17/30088 707/639 |
| 2014/0310494 A1 | 10/2014 | Higgins et al. |
| 2014/0359044 A1 | 12/2014 | Davis et al. |
| 2014/0359381 A1 | 12/2014 | Takeuchi et al. |
| 2015/0023097 A1 | 1/2015 | Khoueir et al. |
| 2015/0032967 A1 | 1/2015 | Udayashankar et al. |
| 2015/0037624 A1 | 2/2015 | Thompson et al. |
| 2015/0153799 A1 | 6/2015 | Lucas et al. |
| 2015/0153802 A1 | 6/2015 | Lucas et al. |
| 2015/0212943 A1 | 7/2015 | Yang et al. |
| 2015/0268879 A1 | 9/2015 | Chu |
| 2015/0286438 A1 | 10/2015 | Simionescu et al. |

FOREIGN PATENT DOCUMENTS

| | | |
|---|---|---|
| EP | 1 465 203 A1 | 10/2004 |
| EP | 1 990 921 A2 | 11/2008 |
| EP | 2 386 958 A1 | 11/2011 |
| JP | 2002-532806 | 10/2002 |
| WO | WO 2007/036834 | 4/2007 |
| WO | WO 2007/080586 | 7/2007 |
| WO | WO 2008/075292 A2 | 6/2008 |
| WO | WO 2008/121553 | 10/2008 |
| WO | WO 2008/121577 | 10/2008 |
| WO | WO 2009/028281 | 3/2009 |
| WO | WO 2009/032945 | 3/2009 |
| WO | WO 2009/058140 | 5/2009 |
| WO | WO 2009/084724 | 7/2009 |
| WO | WO 2009/134576 | 11/2009 |
| WO | WO 2011/024015 | 3/2011 |

OTHER PUBLICATIONS

International Search Report and Written Opinion dated Jun. 30, 2015, received in International Patent Application No. PCT/US2015/023927, which corresponds to U.S. Appl. No. 14/454,687, 11 pages (Kadayam).

Bayer, "Prefix B-Trees", ip.com Journal, ip.com Inc., West Henrietta, NY, Mar. 30, 2007, 29 pages.

Bhattacharjee et al., "Efficient Index Compression in DB2 LUW", IBM Research Report, Jun. 23, 2009, http://domino.research.ibm.com/library/cyberdig.nsf/papers/40B2C45876D0D747852575E100620CE7/$File/rc24815.pdf, 13 pages.

Lee et al., "A Semi-Preemptive Garbage Collector for Solid State Drives," Apr. 2011, IEEE, pp. 12-21.

Oracle, "Oracle9i: Database Concepts", Jul. 2001, http://docs.oracle.com/cd/A91202_01/901_doc/server.901/a88856.pdf, 49 pages.

Office Action dated Feb. 17, 2015, received in Chinese Patent Application No. 201210334987.1, which corresponds to U.S. Appl. No. 12/082,207, 9 pages (Prins).

International Search Report and Written Opinion dated May 4, 2015, received in International Patent Application No. PCT/US2014/065987, which corresponds to U.S. Appl. No. 14/135,400, 12 pages (George).

International Search Report and Written Opinion dated Mar. 17, 2015, received in International Patent Application No. PCT/US2014/067467, which corresponds to U.S. Appl. No. 14/135,420, 13 pages (Lucas).

International Search Report and Written Opinion dated Apr. 20, 2015, received in International Patent Application No. PCT/US2014/063949, which corresponds to U.S. Appl. No. 14/135,433, 21 pages (Delpapa).

International Search Report and Written Opinion dated Jun. 8, 2015, received in International Patent Application No. PCT/US2015/018252, which corresponds to U.S. Appl. No. 14/339,072, 9 pages (Busch).

International Search Report and Written Opinion dated Jun. 2, 2015, received in International Patent Application No. PCT/US2015/018255, which corresponds to U.S. Appl. No. 14/336,967, 14 pages (Chander).

(56) References Cited

OTHER PUBLICATIONS

Ashkenazi et al., "Platform independent overall security architecture in multi-processor system-on-chip integrated circuits for use in mobile phones and handheld devices," ScienceDirect, Computers and Electrical Engineering 33 (2007), 18 pages.
Invitation to Pay Additional Fees dated Feb. 13, 2015, received in International Patent Application No. PCT/US2014/063949, which corresponds to U.S. Appl. No. 14/135,433, 6 pages (Delpapa).
International Search Report and Written Opinion dated Mar. 9, 2015, received in International Patent Application No. PCT/US2014/059747, which corresponds to U.S. Appl. No. 14/137,440, 9 pages (Fitzpatrick).
International Search Report and Written Opinion dated Jan. 21, 2015, received in International Application No. PCT/US2014/059748, which corresponds to U.S. Appl. No. 14/137,511, 13 pages (Dancho).
International Search Report and Written Opinion dated Feb. 18, 2015, received in International Application No. PCT/US2014/066921, which corresponds to U.S. Appl. No. 14/135,260, 13 pages (Fitzpatrick).
Barr, "Introduction to Watchdog Timers," Oct. 2001, 3 pgs.
Canim, "Buffered Bloom Filters on Solid State Storage," ADMS*10, Singapore, Sep. 13-17, 2010, 8 pgs.
Kang, "A Multi-Channel Architecture for High-Performance NAND Flash-Based Storage System," J. Syst. Archit., vol. 53, Issue 9, Sep. 2007, 15 pgs.
Kim, "A Space-Efficient Flash Translation Layer for CompactFlash Systems," May 2002, IEEE vol. 48, No. 2, 10 pgs.
Lu, "A Forest-structured Bloom Filter with Flash Memory," MSST 2011, Denver, CO, May 23-27, 2011, article, 6 pgs.
Lu, "A Forest-structured Bloom Filter with Flash Memory," MSST 2011, Denver, CO, May 23-27, 2011, presentation slides, 25 pgs.
McLean, "Information Technology—AT Attachment with Packet Interface Extension," Aug. 19, 1998, 339 pgs.
Microchip Technology, "Section 10. Watchdog Timer and Power-Saving Modes," 2005, 14 pages.
Park et al., "A High Performance Controller for NAND Flash-Based Solid State Disk (NSSD)," Proceedings of Non-Volatile Semiconductor Memory Workshop, Feb. 2006, 4 pgs.
Zeidman, "Verilog Designer's Library," 1999, 9 pgs.
International Search Report and Written Opinion dated Jun. 6, 2013, received in International Patent Application No. PCT/US2012/059447, which corresponds to U.S. Appl. No. 13/602,031, 12 pgs (Tai).
International Search Report and Written Opinion dated May 23, 2013, received in International Patent Application No. PCT/US2012/065914, which corresponds to U.S. Appl. No. 13/679,963, 7 pgs (Frayer).
International Search Report and Written Opinion dated Mar. 19, 2009 received in International Patent Application No. PCT/US08/88133, which corresponds to U.S. Appl. No. 12/082,202, 7 pgs (Prins).
International Search Report and Written Opinion dated Feb. 19, 2009, received in International Patent Application No. PCT/US08/88236, which corresponds to U.S. Appl. No. 12/082,203, 7 pgs (Olbrich).
International Search Report and Written Opinion dated Feb. 19, 2009, received in International Patent Application No. PCT/US08/88217, which corresponds to U.S. Appl. No. 12/082,204, 7 pgs (Olbrich).
International Search Report and Written Opinion dated Mar. 19, 2009, received in International Patent Application No. PCT/US08/88136, which corresponds to U.S. Appl. No. 12/082,205, 7 pgs (Olbrich).
International Search Report and Written Opinion dated Feb. 18, 2009, received in International Patent Application No. PCT/US08/88206, which corresponds to U.S. Appl. No. 12/082,206, 7 pgs (Prins).
International Search Report and Written Opinion dated Feb. 27, 2009, received in International Patent Application No. PCT/US2008/088154, which corresponds to U.S. Appl. No. 12/082,207, 8 pgs (Prins).
European Search Report dated Feb. 23, 2012, received in European Patent Application No. 08866997.3, which corresponds to U.S. Appl. No. 12/082,207, 6 pgs (Prins).
Office Action dated Apr. 18, 2012, received in Chinese Patent Application No. 200880127623.8, which corresponds to U.S. Appl. No. 12/082,207,12 pgs (Prins).
Office Action dated Dec. 31, 2012, received in Chinese Patent Application No. 200880127623.8, which corresponds to U.S. Appl. No. 12/082,207, 9 pgs (Prins).
Notification of the Decision to Grant a Patent Right for Patent for Invention dated Jul. 4, 2013, received in Chinese Patent Application No. 200880127623.8, which corresponds to U.S. Appl. No. 12/082,207, 1 pg (Prins).
Office Action dated Jul. 24, 2012, received in Japanese Patent Application No. JP 2010-540863, 3 pgs (Prins).
International Search Report and Written Opinion dated Feb. 13, 2009, received in International Patent Application No. PCT/US08/88164, which corresponds to U.S. Appl. No. 12/082,220, 6 pgs (Olbrich).
International Search Report and Written Opinion dated Feb. 26, 2009, received in International Patent Application No. PCT/US08/88146, which corresponds to U.S. Appl. No. 12/082,221, 10 pgs (Prins).
International Search Report and Written Opinion dated Feb. 19, 2009, received in International Patent Application No. PCT/US08/88232, which corresponds to U.S. Appl. No. 12/082,222, 8 pgs (Olbrich).
International Search Report and Written Opinion dated Feb. 13, 2009, received in International Patent Application No. PCT/US08/88229, which corresponds to U.S. Appl. No. 12/082,223, 7 pgs (Olbrich).
International Search Report and Written Opinion dated Oct. 27, 2011, received in International Patent Application No. PCT/US2011/028637, which corresponds to U.S. Appl. No. 12/726,200,13 pgs (Olbrich).
International Search Report and Written Opinion dated Aug. 31, 2012, received in International Patent Application No. PCT/US2012/042764, which corresponds to U.S. Appl. No. 13/285,873,12 pgs (Frayer).
International Search Report and Written Opinion dated Mar. 4, 2013, received in International Patent Application No. PCT/US2012/042771, which corresponds to U.S. Appl. No. 13/286,012, 14 pgs (Stonelake).
International Search Report and Written Opinion dated Sep. 26, 2012, received in International Patent Application No. PCT/US2012/042775, which corresponds to U.S. Appl. No. 13/285,892, 8 pgs (Weston-Lewis et al.).
International Search Report and Written Opinion dated Jun. 6, 2013, received in International Patent Application No. PCT/US2012/059453, which corresponds to U.S. Appl. No. 13/602,039,12 pgs (Frayer).
International Search Report and Written Opinion dated Feb. 14, 2013, received in International Patent Application No. PCT/US2012/059459, which corresponds to U.S. Appl. No. 13/602,047, 9 pgs (Tai).
International Search Report and Written Opinion dated Mar. 7, 2014, received in International Patent Application No. PCT/US2013/074772, which corresponds to U.S. Appl. No. 13/831,218, 10 pages (George).
International Search Report and Written Opinion dated Mar. 24, 2014, received in International Patent Application No. PCT/US2013/074777, which corresponds to U.S. Appl. No. 13/831,308, 10 pages (George).
International Search Report and Written Opinion dated Mar. 7, 2014, received in International Patent Application No. PCT/US2013/074779, which corresponds to U.S. Appl. No. 13/831,374, 8 pages (George).

(56) References Cited

OTHER PUBLICATIONS

International Search Report and Written Opinion dated Apr. 5, 2013, received in International Patent Application No. PCT/US2012/065916, which corresponds to U.S. Appl. No. 13/679,969, 7 pgs (Frayer).

International Search Report and Written Opinion dated Jun. 17, 2013, received in International Patent Application No. PCT/US2012/065919, which corresponds to U.S. Appl. No. 13/679,970, 8 pgs (Frayer).

Gasior, "Gigabyte's i-Ram storage device, Ram disk without the fuss," The Tech Report, p. 1, Jan. 25, 2006, 5 pages.

Oestreicher et al., "Object Lifetimes in Java Card," 1999, USENIX, 10 pages.

Office Action dated Apr. 25, 2016, received in Chinese Patent Application No. 201280066282.4, which corresponds to U.S. Appl. No. 13/602,047, 8 pages (Tai).

International Preliminary Report on Patentability dated May 24, 2016, received in International Patent Application No. PCT/US2014/065987, which corresponds to U.S. Appl. No. 14/135,400, 9 pages (George).

Office Action dated Dec. 8, 2014, received in Chinese Patent Application No. 201180021660.2, which corresponds to U.S. Appl. No. 12/726,200, 7 pages (Olbrich).

Office Action dated Jul. 31, 2015, received in Chinese Patent Application No. 201180021660.2, which corresponds to U.S. Appl. No. 12/726,200, 9 pages (Olbrich).

International Search Report and Written Opinion dated Jul. 23, 2015, received in International Patent Application No. PCT/US2015/030850, which corresponds to U.S. Appl. No. 14/298,843, 12 pages (Ellis).

International Search Report and Written Opinion dated Sep. 14, 2015, received in International Patent Application No. PCT/US2015/036807, which corresponds to U.S. Appl. No. 14/311,152, 9 pages (Higgins).

International Search Report and Written Opinion dated Jul. 25, 2014, received in International Patent Application No. PCT/US2014/029453, which corresponds to U.S. Appl. No. 13/963,444, 9 pages (Frayer).

Office Action dated Jan. 11, 2017, received in Chinese Patent Application No. 201280066282.4, which corresponds to U.S. Appl. No. 13/602,047, 3 pages (Tai).

International Preliminary Report on Patentability dated Dec. 6, 2016, received in International Patent Application No. PCT/US2015/030850, which corresponds to U.S. Appl. No. 14/298,843, 8 pages (Ellis).

International Preliminary Report on Patentability dated Dec. 20, 2016, received in International Patent Application No. PCT/US2015/036807, which corresponds to U.S. Appl. No. 14/311,152, 6 pages (Higgins).

\* cited by examiner

METHODS AND SYSTEMS FOR PERFORMING EFFICIENT SNAPSHOTS IN TIERED DATA STRUCTURES

This application claims priority to and the benefit of India Patent Application Serial No. 1798/CHE/2014, filed Apr. 3, 2014, which is incorporated herein by reference in its entirety.

This application is related to (1) U.S. application Ser. No. 14/336,931, filed Jul. 21, 2014, entitled "Efficient Cache Utilization in a Tiered Data Structure," (2) U.S. application Ser. No. 14/336,949, filed Jul. 21, 2014, entitled "Conditional Updates for Reducing Frequency of Data Modification Operations," (3) U.S. application Ser. No. 14/336,967, filed Jul. 21, 2014, entitled "Compaction of Information in Tiered Data Structure," (4) U.S. Provisional Application Ser. No. 61/973,215, filed Mar. 31, 2014, entitled "Methods and Systems for Efficient Non-Isolated Transactions," and (5) U.S. Provisional Application Ser. No. 61/973,221, filed Mar. 31, 2014, entitled "Methods and Systems for Insert Optimization of Tiered Data Structures," all of which are incorporated herein by reference in their entireties.

TECHNICAL FIELD

The disclosed embodiments relate generally to memory systems, and in particular, to improving the performance and reliability of tiered data structures.

BACKGROUND

The speed of many computer operations is frequently constrained by the speed and efficiency with which data can be stored and retrieved from data structures associated with a device. Many conventional data structures take a long time to store and retrieve data. However, tiered data structures can be used to dramatically improve the speed and efficiency of data storage. Some tiered data structures enable data searches, data insertions, data deletions, and sequential data access to be performed in logarithmic time. However, further improvements to tiered data structures can further increase the speed, efficiency, and reliability with which data can be stored and retrieved, thereby improving the performance of devices relying on such tiered data structures.

SUMMARY

Various implementations of systems, methods and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to improving the performance and reliability of tiered data structures.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

Figure 1:
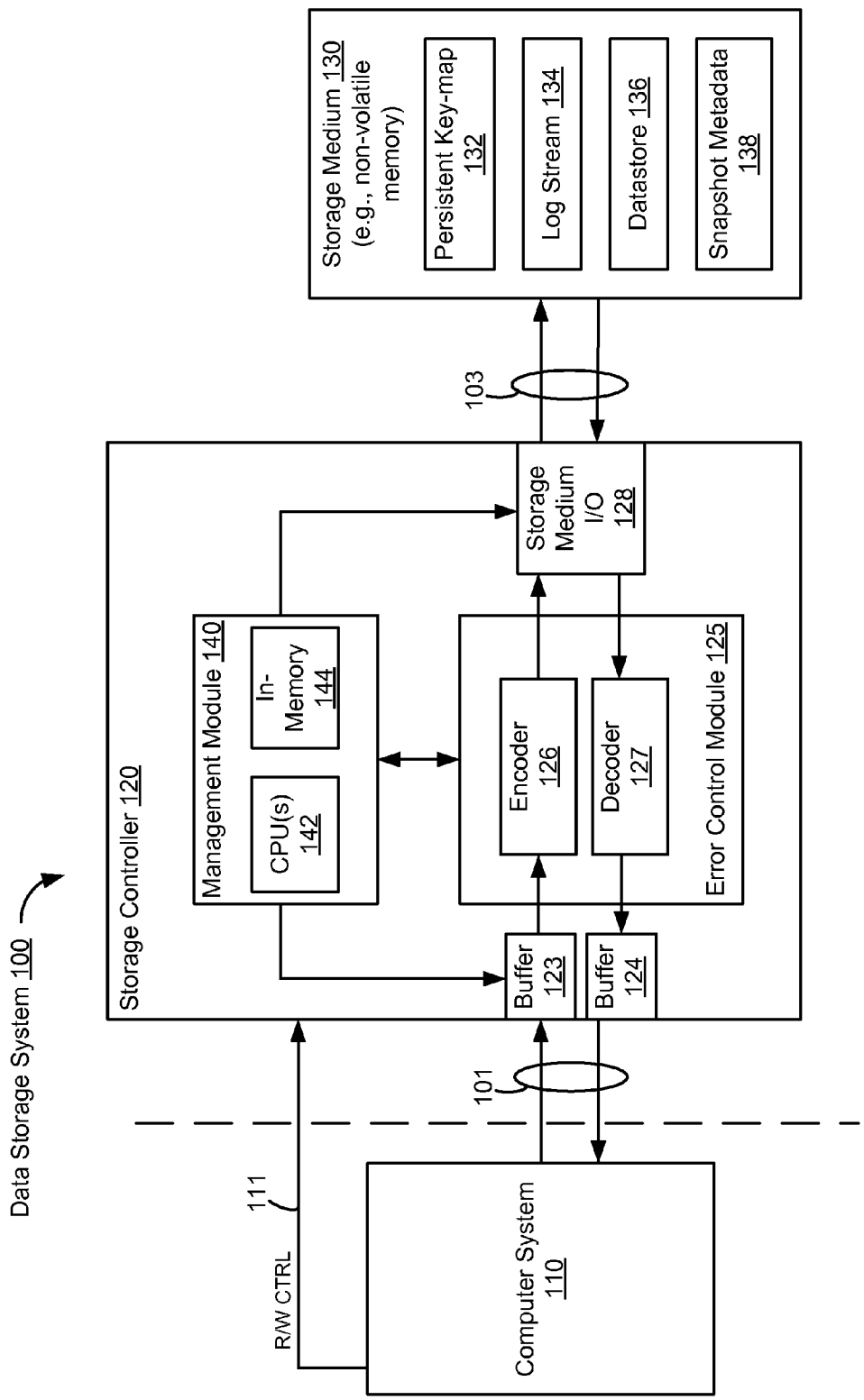
FIG. 1 is a block diagram illustrating an implementation of a data storage system in accordance with some embodiments.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DETAILED DESCRIPTION

The various implementations described herein include systems, methods and/or devices used to improve the performance and reliability of tiered data structures.

Some embodiments include a method of managing a datastore storing one or more tiered data structures. In some embodiments, the method is performed by a memory controller (e.g., management module 140, FIGS. 1 and 3) with one or more processors (e.g., CPU(s) 142, FIGS. 1 and 3) and memory (e.g., memory 302, FIG. 3). In some embodiments, the memory controller is operatively coupled with or, alternatively, includes non-volatile memory that includes the datastore. In some embodiments, the non-volatile memory (e.g., storage medium 130, FIGS. 1 and 2B) comprises one or more non-volatile memory devices. In some embodiments, the one or more non-volatile memory devices includes one or more three-dimensional (3D) memory devices and circuitry associated with operation of memory elements in the one or more 3D memory devices. In some embodiments, the circuitry and one or more memory elements in a respective 3D memory device, of the one or more 3D memory devices, are on the same substrate (e.g., a silicon substrate). The method includes detecting a request to perform an update operation of a first data object in a tiered data structure of the one or more tiered data structures stored in the datastore, the request includes first key information corresponding to the first data object and a new value for the first data object. The method includes: locating the first data object using a key-map to map the first key information to a location of the first data object in the datastore; and identifying a sequence number associated with the first data object. In accordance with a first determination that the sequence number associated with the first data object is greater than a first boundary sequence number corresponding to a first snapshot of the tiered data structure, the method includes: replacing the first data object in the tiered data structure with a modified first data object including the first key information and the new value; and assigning the modified first object a unique sequence number. In accordance with a second determination that the sequence number associated with the first data object is less than or equal to the first boundary sequence number corresponding to the first snapshot of the tiered data structure, the method includes: while maintaining the first data object in the tiered data structure, inserting a second data object into the tiered data structure, the second data object including the first key information and the new value; and assigning the second data object the unique sequence number.

Some embodiments include a computer system or device (e.g., data storage system 100, FIG. 1 or management module 140, FIGS. 1 and 3), comprising: one or more processors; and memory storing one or more programs to be executed by the one or more processors, the one or more programs comprising instructions for performing or controlling performance of any of the methods described herein. Some embodiments include a non-transitory computer readable storage medium, storing one or more programs for execution by one or more processors of a computer system or device (e.g., data storage system 100, FIG. 1 or management module 140, FIGS. 1 and 3), the one or more programs including instructions for performing any of the methods described herein. Some embodiments include a computer system or device (e.g., data storage system 100, FIG. 1 or management module 140, FIGS. 1 and 3) comprising: means for performing the operations of any of the methods described herein.

Numerous details are described herein in order to provide a thorough understanding of the example implementations illustrated in the accompanying drawings. However, some embodiments may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

FIG. 1 is a diagram of an implementation of a data storage system 100 in accordance with some embodiments. While some example features are illustrated, various other features have not been illustrated for the sake of brevity and so as not to obscure more pertinent aspects of the example embodiments disclosed herein. To that end, as a non-limiting example, data storage system 100 includes a storage controller 120, and a storage medium 130, and is used in conjunction with a computer system 110. In some embodiments, storage medium 130 includes a single memory device (e.g., a volatile memory device or a non-volatile memory ("NVM") device such as magnetic disk storage device, optical disk storage device, a flash memory device, a three-dimensional ("3D") memory device, or other NVM memory device) while in other implementations storage medium 130 includes a plurality of memory devices. In some embodiments, storage medium 130 includes NAND-type flash memory or NOR-type flash memory. Further, in some embodiments, storage controller 120 is a solid-state drive ("SSD") controller. However, one or more other types of storage media may be included in accordance with aspects of a wide variety of embodiments.

Computer system 110 is coupled to storage controller 120 through data connections 101. However, in some embodiments computer system 110 includes storage controller 120 as a component and/or a sub-system. Computer system 110 may be any suitable computer device such as a computer, a laptop computer, a tablet device, a wearable computing device, a netbook, an internet kiosk, a personal digital assistant, a mobile phone, a smart phone, a gaming device, a computer server, or any other computing device. Computer system 110 is sometimes called a host or host system. In some embodiments, computer system 110 includes one or more processors, one or more types of memory, a display and/or other user interface components such as a keyboard, a touch screen display, a mouse, a track-pad, a digital camera and/or any number of supplemental devices to add functionality.

Storage medium 130 is coupled to storage controller 120 through connections 103. Connections 103 are sometimes called data connections, but typically convey commands in addition to data, and optionally convey metadata, error correction information and/or other information in addition to data values to be stored in storage medium 130 and data values read from storage medium 130. In some embodiments, however, storage controller 120 and storage medium 130 are included in the same device as components thereof. Furthermore, in some implementations storage controller 120 and storage medium 130 are embedded in a host device, such as a mobile device, tablet, other computer or computer controlled device, and the methods described herein are performed by the embedded storage controller. Storage medium 130 may include any number (i.e., one or more) of memory devices including, without limitation, non-volatile semiconductor memory devices, such as flash memory. For example, flash memory devices can be configured for enterprise storage suitable for applications such as cloud computing, or for caching data stored (or to be stored) in secondary storage, such as hard disk drives. Additionally and/or alternatively, flash memory can also be configured for relatively smaller-scale applications such as personal flash drives or hard-disk replacements for personal, laptop and tablet computers.

In some embodiments, storage medium 130 comprises persistent memory (e.g., non-volatile memory such as flash memory), and storage medium 130 includes a subset or a superset of the following data structures or data regions: persistent key-map 132; log stream 134; and datastore 136. In some embodiments, datastore 136 comprises one or more NVM devices such as magnetic disk storage device(s), optical disk storage device(s), flash memory device(s), 3D memory device(s) (as further described herein), or other non-volatile solid state storage device(s). Storage medium 130 and its included data structures or data regions (e.g., persistent key-map 132, log stream 134, and datastore 136) are described below in more detail with reference to FIG. 2B.

In some embodiments, storage medium 130 is divided into a number of addressable and individually selectable blocks (sometimes also herein called "slabs"). In some embodiments, the individually selectable blocks are the minimum size erasable units in a flash memory device. In other words, each block contains the minimum number of memory cells that can be erased simultaneously. Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector, which is a subunit of a page. That is, a block includes a plurality of pages, each page contains a plurality of sectors, and each sector is the minimum unit of data for reading data from the flash memory device.

For example, one block comprises a predetermined number of pages, for example, 64 pages, 128 pages, 256 pages or another suitable number of pages. Blocks are typically grouped into a plurality of zones. Each block zone can be independently managed to some extent, which increases the degree of parallelism for parallel operations and simplifies management of storage medium 130.

In some embodiments, storage controller 120 includes a management module 140, an input buffer 123, an output buffer 124, an error control module 125 and a storage medium interface (I/O) 128. Storage controller 120 may include various additional features that have not been illustrated for the sake of brevity and so as not to obscure more pertinent features of the example embodiments disclosed herein, and that a different arrangement of features may be possible. Input buffer 123 and output buffer 124 provide an interface to computer system 110 through data connections 101. Similarly, storage medium I/O 128 provides an interface to storage medium 130 though connections 103. In some embodiments, storage medium I/O 128 includes read and write circuitry, including circuitry capable of providing reading signals to storage medium 130 (e.g., reading threshold voltages for NAND-type flash memory).

In some embodiments, management module 140 includes one or more processing units (CPU(s), also sometimes called one or more processors) 122 configured to execute instructions in one or more programs (e.g., stored in memory 302 (FIG. 3) of management module 140) and in-memory 144. In some embodiments, one or more CPUs 142 are shared by one or more components within, and in some cases, beyond the function of storage controller 120. In some embodiments, in-memory 144 comprises a portion of the memory associated with management module 140, and in-memory 144 comprises one or more volatile memory devices. For example, the one or more volatile memory devices comprising in-memory 144 include high-speed random access memory such as DRAM, SRAM, DDR RAM, or other random access solid state memory devices. Management module 140 is coupled to input buffer 123, output buffer 124 (connection not shown), error control module 125 and storage medium I/O 128 in order to coordinate the operation of these components.

Error control module 125 is coupled to storage medium I/O 128, input buffer 123 and output buffer 124. Error control module 125 is provided to limit the number of uncorrectable errors inadvertently introduced into data. In some embodiments, error control module 125 is executed in software by one or more CPUs 122 of management module 140, and, in other embodiments, error control module 125 is implemented in whole or in part using special purpose circuitry to perform encoding and decoding functions. To that end, error control module 125 includes an encoder 126 and a decoder 127. Encoder 126 encodes data by applying an error control code to produce a codeword, which is subsequently stored in storage medium 130.

When the encoded data (e.g., one or more codewords) is read from storage medium 130, decoder 127 applies a decoding process to the encoded data to recover the data, and to correct errors in the recovered data within the error correcting capability of the error control code. Those skilled in the art will appreciate that various error control codes have different error detection and correction capacities, and that particular codes are selected for various applications for reasons beyond the scope of this disclosure. As such, an exhaustive review of the various types of error control codes is not provided herein. Moreover, those skilled in the art will appreciate that each type or family of error control codes may have encoding and decoding algorithms that are particular to the type or family of error control codes. On the other hand, some algorithms may be utilized at least to some extent in the decoding of a number of different types or families of error control codes. As such, for the sake of brevity, an exhaustive description of the various types of encoding and decoding algorithms generally available and known to those skilled in the art is not provided herein.

During a write operation, input buffer 123 receives data to be stored in storage medium 130 from computer system 110 (e.g., write data). The data held in input buffer 123 is made available to encoder 126, which encodes the data to produce one or more codewords. The one or more codewords are made available to storage medium I/O 128, which transfers the one or more codewords to storage medium 130 in a manner dependent on the type of storage medium being utilized.

A read operation is initiated when computer system (host) 110 sends one or more host read commands on control line 111 to storage controller 120 requesting data from storage medium 130. Storage controller 120 sends one or more read access commands to storage medium 130, via storage medium I/O 128, to obtain raw read data in accordance with memory locations (addresses) specified by the one or more host read commands. Storage medium I/O 128 provides the raw read data (e.g., comprising one or more codewords) to decoder 127. If the decoding is successful, the decoded data is provided to output buffer 124, where the decoded data is made available to computer system 110. In some embodiments, if the decoding is not successful, storage controller 120 may resort to a number of remedial actions or provide an indication of an irresolvable error condition.

Figure 2A:
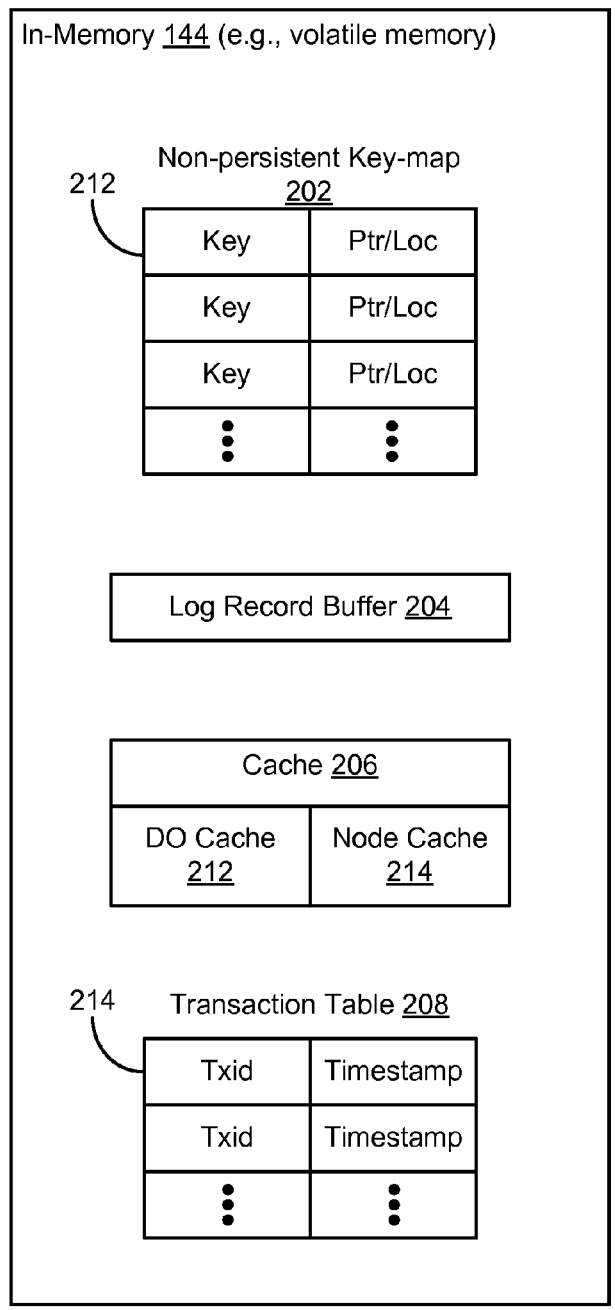
FIG. 2A is a block diagram illustrating data structures associated with a management module in accordance with some embodiments.

FIG. 2A is a block diagram illustrating data structures or data regions associated with management module 140 in accordance with some embodiments. In some embodiments, the data structures or data regions are stored in in-memory 144 of management module 140, which comprises one or more volatile memory devices. For example, the one or more volatile memory devices comprising in-memory 144 include high-speed random access memory such as DRAM, SRAM, DDR RAM, or other random access solid state memory devices. In some embodiments, in-memory 144 includes a subset or a superset of the following data structures or data regions: non-persistent key-map 202; log record buffer 204; cache 206; and transaction table 208.

In FIG. 2A, non-persistent key-map 202 includes a plurality of entries mapping keys to locations in datastore 136. For example, entry 212 maps respective key information associated with a data object stored in datastore 136 to location information. In some embodiments, the location information includes a pointer to a location in datastore 136 or a location in datastore 136. In some embodiments, the key information includes a unique key or information from which a unique key can be identified such as a shortened key and a location/length of a key prefix. In some embodiments, the location information includes an identifier number of a leaf node in a respective tiered data structure of the one or more tiered data structures stored in datastore 136, where the data object associated with the key information is included in the leaf node. In some embodiments, the location information is an index number associated with a slab in datastore 136 that stores the leaf node to which the data object associated with the key information belongs.

For example, management module 140 receives, from computer system 110, a request to perform a transaction including two or more memory operations on datastore 136. In this example, a first memory operation includes replacing the value of a data object stored in datastore 136 that corresponds to key 77 with a new value. Continuing with this example, management module 140 locates the data object in datastore 136 associated with the first memory operation by mapping key 77 in non-persistent key-map 202 to location information pointing to or giving the location of the data object in datastore 136. For example, key 77, in non-persistent key-map 202, is mapped to an index number for a slab in datastore 136 that stores a leaf node that includes the data object corresponding to key 77.

In FIGS. 2A, log record buffer 204 includes one or more operation commit records associated with pending memory operations being performed on datastore 136. In some embodiments, an operation commit record is populated and stored in log record buffer 204 prior to the operation commit record being written to log stream 134 in storage medium 130. With reference to the above example, management module 140 populates an operation commit record for the first memory operation that includes a subset or a superset of the following: a transaction identifier associated with the request to perform the transaction; key 77; location information pointing to the index number of the old slab in datastore 136 that stored the data object prior to the first memory operation; and location information pointing to the index number of the new slab in datastore 136 storing the data object after the first memory operation.

In FIGS. 2A, cache 206 stores nodes and/or data objects retrieved from a respective tiered data structure of the one or more tiered data structures stored in datastore 136. In some embodiments, cache 206 optionally includes data object cache portion 212, storing data objects retrieved from datastore 136, and node cache portion 214, storing nodes retrieved from datastore 136. With respect to the example above, management module 140 stores in node cache portion 214 of cache 206 nodes of a respective tiered data structure that were traversed in order to locate the data object corresponding to key 77, and management module 140 also stores in data object cache portion 212 of cache 206 the data object corresponding to key 77.

In FIG. 2A, transaction table 208 stores entries associated with each request to perform a transaction received from a requestor (e.g., computer system 110, FIG. 1). With reference to the above example, in response to receiving the request from computer system 110 to perform a transaction including two or more memory operations on datastore 136, management module 140 stores entry 214 in transaction table 208. In some embodiments, a respective entry in transaction table 208 includes a unique transaction identifier and a timestamp corresponding to the time the transaction request was received or the time the entry was created. In some embodiments, when the transaction is complete and after a transaction commit record is written to log stream 134, management module 140 deletes the entry corresponding to the complete transaction from transaction table 208.

Figure 2B:
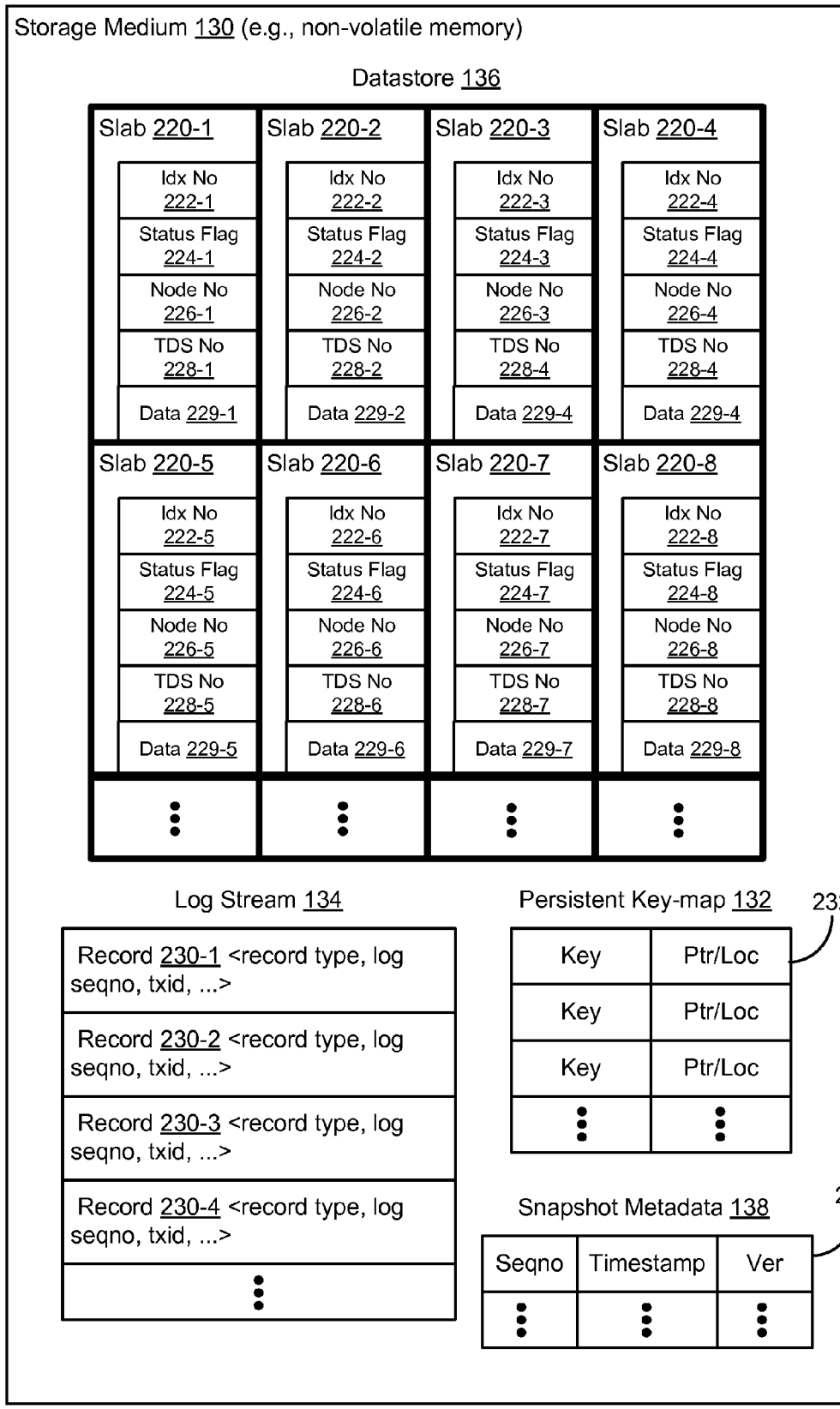
FIG. 2B is a block diagram illustrating data structures associated with a storage medium in accordance with some embodiments.

FIG. 2B is a block diagram illustrating data structures or data regions stored in storage medium 130 in accordance with some embodiments. In some embodiments, storage medium 130 includes one or more non-volatile memory devices such as magnetic disk storage device(s), optical disk storage device(s), flash memory device(s), 3D memory device(s), or other non-volatile solid state storage device(s).

In some embodiments, storage medium 130 includes a subset or a superset of the following data structures or data regions: datastore 136; persistent key-map 132; log stream 134; and snapshot metadata 138.

In FIG. 2B, datastore 136 includes a plurality of slabs 220. In some embodiments, slabs 220 are all a predetermined size. For example, slabs 220 are each 8 KB in size. Alternatively, in some embodiments, slabs 220 are one of a number of predetermined sizes. In one example, slabs 220 are allocated in four predetermined sizes: 8 KB, 16 KB, 32 KB, and 64 KB. In some embodiments, datastore 136 is organized into one or more tiered data structures. In some embodiments, a respective tiered data structure ("TDS") includes a plurality of nodes with one root node, zero or more internal nodes, and one or more leaf nodes. Each of the nodes (e.g., root, internal, and leaf nodes) comprising the respective TDS is stored in a separate slab 220, and each of the leaf nodes of the respective TDS includes one or more data objects.

In FIG. 2B, each of slabs 220 at least includes a unique index number 222 and a status flag 224 indicating whether the slab is free (i.e., neither occupied by nor storing a node) or occupied by a node of one of the one or more tiered data structures stored in datastore 136. In some embodiments, a respective free slab 220 only includes a unique index number 222 and a status flag 224 indicating that respective free slab 220 is free. In some embodiments, a respective occupied slab 220 further includes a node number 226 of a respective node in a respective TDS of the one or more tiered data structures that is stored at respective occupied slab 220, a tiered data structure number 228 corresponding to the respective TDS of the one or more tiered data structures that includes the respective node, and data 229.

In some embodiments, data 229 includes one or more data objects included in the respective node. In some embodiments, a respective data object comprises key information and a corresponding value. In some embodiments, the key information includes a unique key or information from which a unique key can be identified such as a shortened key and a location/length of a key prefix. In some embodiments, the corresponding value is data. In some embodiments, the corresponding value is a pointer identifying a location where the data is stored. In some embodiments, the one or more data objects included in the respective node are contiguous data objects where the unique key information for a respective contiguous data object is adjacent or substantially adjacent to the corresponding value for the respective contiguous data object or other data for the respective contiguous data object that is adjacent to the corresponding value. In some embodiments, the one or more data objects included in the respective node are split data objects where the unique key information for a respective split data object is separated from the corresponding value for the respective split data object by other data for other data objects and the unique key information for the respective split data object is stored with a pointer that identifies a location of the corresponding value for the respective split data object.

In FIG. 2B, persistent key-map 132 includes a plurality of entries mapping keys to locations in datastore 136. For example, entry 232 maps respective key information associated with a data object stored in datastore 136 to location information. In some embodiments, the location information includes a pointer to a location in datastore 136 or a location in datastore 136. In some embodiments, the key information includes a unique key or information from which a unique key can be identified such as a shortened key and a location/length of a key prefix. In some embodiments, the location information includes an identifier number of a leaf node in a respective tiered data structure of the one or more tiered data structures stored in datastore 136, where the data object associated with the key information is included in the leaf node. In some embodiments, the location information is an index number associated with a slab in datastore 136 that stores the leaf node to which the data object associated with the key information belongs.

In FIG. 2B, log stream 134 includes a plurality of records 230 (e.g., 230-1, 230-2, 230-3, 230-4, . . . ). A respective record 230 is associated with a record type: start transaction record, transaction commit record, or operation commit record. An operation commit record is associated with one of three memory operations types performed on datastore 126: replacement, deletion, or insertion. A respective record 230 at least includes the record type, a unique sequence number (i.e., seqno), and a transaction identifier (i.e., txid). In some embodiments, unique sequence numbers are assigned to records 230 in monotonically ascending order.

In some embodiments, records 230 each corresponds to a transaction that is associated with a transaction identifier. In some embodiments, a respective complete transaction corresponds to a first start transaction record in log stream 134 that includes a first transaction identifier and a first transaction commit record in log stream 134 that includes the first transaction identifier. In some embodiments, the respective complete transaction also corresponds to one or more operation commit records that include the first transaction identifier. In some embodiments, a respective incomplete transaction corresponds to a second start transaction record in log stream 134 that includes a second transaction identifier for which there is not a corresponding transaction commit record in log stream 134 that includes the second transaction identifier. In some embodiments, the respective incomplete transaction also corresponds to zero or more operation commit records that include the second transaction identifier.

In some embodiments, a respective start transaction record in log stream 134 includes a unique log sequence number and a transaction identifier (e.g., corresponding to the transaction to which the respective start transaction record belongs). In some embodiments, a respective transaction commit record in log stream 134 includes a unique log sequence number and a transaction identifier (e.g., corresponding to the transaction to which the respective transaction commit record belongs).

In some embodiments, a first example operation commit record in log stream 134, that corresponds to a replacement operation of a first data object, includes a unique log sequence number, a transaction identifier (e.g., corresponding to the transaction to which the first operation commit record belongs), key information corresponding to the first data object, a pointer to the old location of the first data object in datastore 136 (e.g., the slab storing the leaf node with the old first data object prior to the replacement operation), and a pointer to the new location of the first data object in datastore 136 (e.g., the slab storing the leaf node with the new first data object after the replacement operation). In some embodiments, a second example operation commit record in log stream 134, that corresponds to a deletion operation of a second data object, includes a unique log sequence number, a transaction identifier (e.g., corresponding to the transaction to which the second operation commit record belongs), key information corresponding to the second data object, a pointer to the old location of the second data object (e.g., the slab storing the leaf node with the old second data object prior to the deletion operation), and a pointer to a new location in datastore 136 (e.g., the slab storing the leaf node with the new second data object with a tombstone after the deletion operation). In some embodiments, a third example operation commit record in log stream 134, that corresponds to an insertion operation of a third data object, includes a unique log sequence number, a transaction identifier (e.g., corresponding to the transaction to which the third operation commit record belongs), key information corresponding to the third data object, a pointer to old location of the third data object in datastore 136 (e.g., the slab storing the leaf node with the new third data object after the insertion operation).

In FIG. 2B, snapshot metadata 138 includes zero or more entries each corresponding to a snapshot of one of the one or more tiered data structures stored in datastore 136. The number of entries in snapshot metadata 138 corresponds to the number of snapshots being maintained. A respective snapshot entry 242 includes a sequence number associated with the snapshot, a timestamp corresponding to when the snapshot was performed or when snapshot entry 242 was created, and a version number associated with the snapshot. In some embodiments, the sequence number of a respective snapshot entry corresponds to a highest (or latest) unique sequence number of a data object in TDS (or multiple tiered data structures) subject to the snapshot when the snapshot was performed. In some embodiments, respective snapshot entry 242 also includes an indication (not shown) of the TDS corresponding to the snapshot (e.g., the TDS on which the snapshot was performed). Alternatively, in some embodiments, each of the one or more tiered data structures stored in datastore 136 includes a node storing snapshot metadata.

Figure 3:
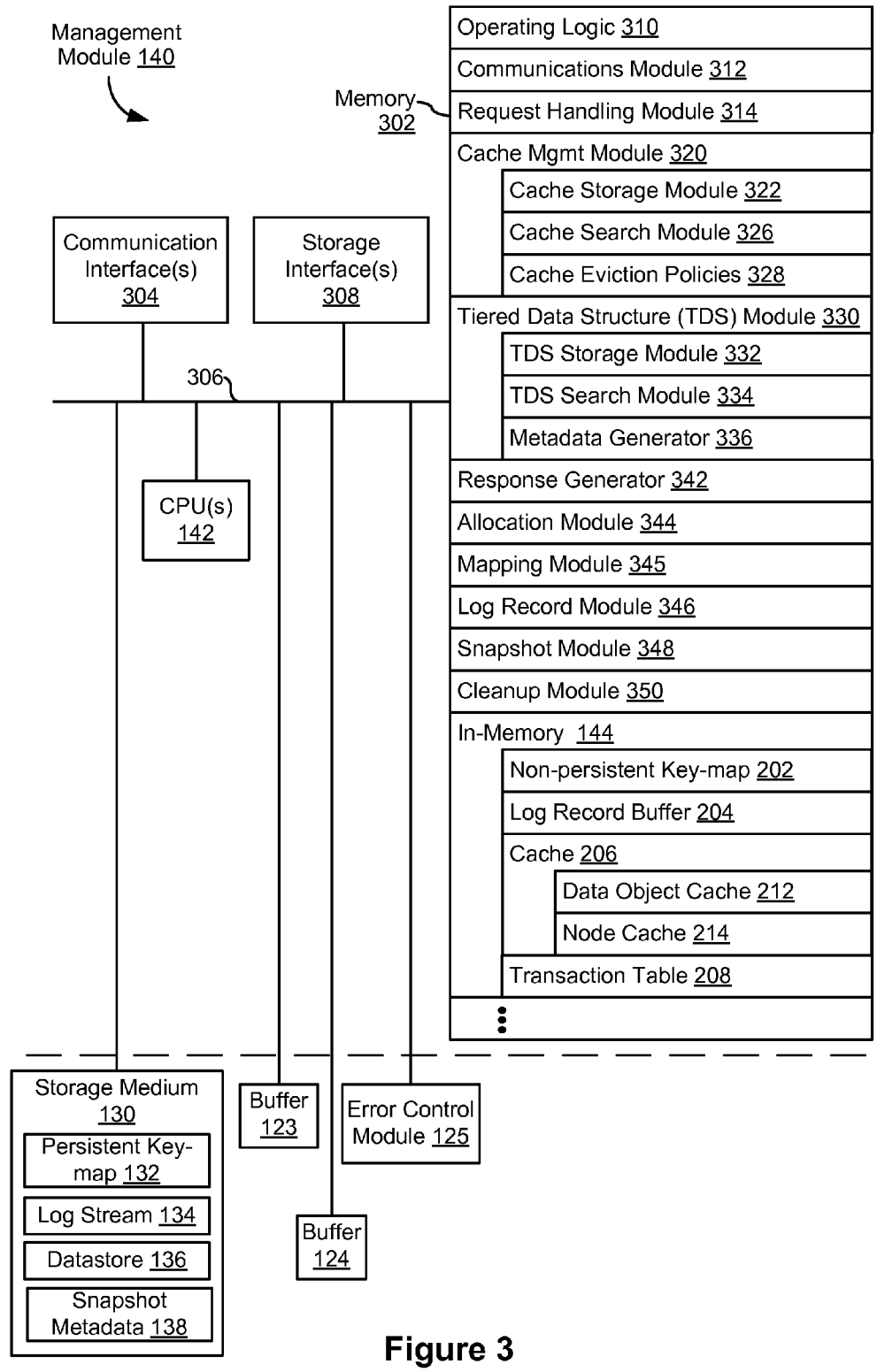
FIG. 3 is a block diagram of a memory management module in accordance with some embodiments.

FIG. 3 is a block diagram illustrating an implementation of management module 140 in accordance with some embodiments. Management module 140 typically includes one or more processors 142 (also sometimes called CPU(s), processing unit(s), microprocessor(s), microcontroller(s), or core(s)) for executing modules, programs and/or instructions stored in memory 302 and thereby performing processing operations, memory 302, one or more communication interfaces 304, one or more storage interfaces 308, and one or more communication buses 306 for interconnecting these components. One or more communication buses 306 optionally include circuitry (sometimes called a chipset) that interconnects and controls communications between system components. In some embodiments, management module 140 is operatively coupled with storage medium 130 by one or more communication buses 306 and one or more storage interfaces 308 (e.g., storage medium I/O 128 such as a PCI bus, PCIe bus, or the like). In some embodiments, management module 140 is operatively coupled with internal requestor(s) and/or external requestors (e.g., computer system 110) by one or more communication buses 306 and one or more communication interfaces 304. Memory 302 includes one or more semiconductor memory devices such as high-speed random access memory (e.g., DRAM, SRAM, DDR RAM or other random access solid state memory devices), and may include non-volatile memory (e.g., one or more NVM devices such as magnetic disk storage device(s), optical disk storage device(s), flash memory device(s), 3D memory device(s), or other non-volatile solid state storage device(s)). Memory 302 optionally includes one or more storage devices remotely located from one or more processors 142. Memory 302, or alternately the non-volatile memory device(s) within memory 302, comprises a non-transitory computer readable storage medium. In some embodiments, memory 302, or the computer readable storage medium of memory 302 stores the following programs, modules, and data structures, or a subset thereof:

operating logic 310 includes procedures for handling various basic system services and for performing hardware dependent tasks;

communications module 312 that is used for communicating with other computer systems or computer components (e.g., one or more communication interface 304 and one or more storage interfaces 308);

request handling module 314 for detecting and processing requests received from internal requestors and/or external requestors (e.g., computer system 110, FIG. 1);

cache management module 320 for storing and retrieving information (e.g., data objects and nodes) from cache 206, optionally including:

cache storage module 322 for storing information (e.g., data objects and nodes) in cache 206;

cache search module 324 for performing searches based on requested information (e.g., a search for a requested data object or retrieving a node for use in searching for a requested data object) in cache 206; and cache eviction policies 326 for determining which information (e.g., data objects and/or nodes) to evict from cache 206;

tiered data structure ("TDS") module 330 for storing and retrieving information (e.g., data objects and nodes) within one or more tiered data structures stored in datastore 136 (e.g., TDS 400, FIG. 4A), optionally including:

TDS storage module 332 for performing memory operations (e.g., replacement, deletion, and insertion operations) by writing information (e.g., inserting a new data object or replacing/updating the value of a data object) to leaf nodes stored in cache 206 or deleting information (e.g., deleting a data object and/or replacing the value of a data object with a tombstone) from leaf nodes stored in cache 206 so as to create new/modified leaf nodes and writing the new/modified leaf nodes to datastore 136;

TDS search module 334 for searching through the one or more tiered data structures for requested data (e.g., locating and retrieving a data object or node corresponding to a memory operation in a transaction requested by a requestor);

metadata generator 336 for generating metadata for data objects that are stored in leaf nodes of the one or more tiered data structures, where the metadata enables the data objects to be located with TDS search module 334 in response to transaction requests from requestors;

response generator 342 for generating responses to requests from internal and/or external requestors based on data retrieved in response to the requests;

allocation module 344 for allocating free slabs in datastore 136 for which to write a new/modified leaf node of a TDS;

mapping module 345 for updating non-persistent key-map 202 and persistent key-map 132;

log record module 346 for managing zero or more pending operation commit records in log record buffer 204 and for writing an operation commit records from log record buffer 204 to log stream 134;

snapshot module 348 for performing a snapshot of one or more specified tiered data structures stored in datastore 136 and writing a snapshot entry to snapshot metadata 138 for the snapshot;

cleanup module 350 for performing a cleanup process (e.g., either in the background, as described in FIGS. 6A-6F, or in-place, as described in FIGS. 7A-7C) in response to detecting a trigger; and in-memory 144 storing information in volatile memory, including but not limited to the following data structures:

non-persistent key-map 202 for mapping key information to location information (e.g., a slab index number) associated with the location of a data object in datastore 136 that corresponds to the key information (and, in turn, the location of a leaf node to which the data object belongs);

log record buffer 204 storing one or more operation commit records associated with pending memory operations being performed on datastore 136;

cache 206 storing nodes and/or data objects retrieved from the one or more tiered data structures stored in datastore 136, optionally including:

data object cache portion 212 storing zero or more data objects retrieved from the one or more tiered data structures stored in datastore 136; and node cache portion 214 storing zero or more nodes retrieved from the one or more tiered data structures stored in datastore 136; and transaction table 208 storing entries associated with each request to perform a transaction received from a requestor (e.g., computer system 110, FIG. 1).

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 302 may store a subset of the modules and data structures identified above. Furthermore, memory 302 may store additional modules and data structures not described above. In some embodiments, the programs, modules, and data structures stored in memory 302, or the computer readable storage medium of memory 302, provide instructions for implementing respective operations in the methods described below with reference to FIGS. 6A-6F and/or 7A-7C.

Although FIG. 3 shows management module 140, FIG. 3 is intended more as a functional description of the various features which may be present in a non-volatile computer system than as a structural schematic of the embodiments described herein. In practice, and as recognized by those of ordinary skill in the art, items shown separately could be combined and some items could be separated.

Figure 4A:
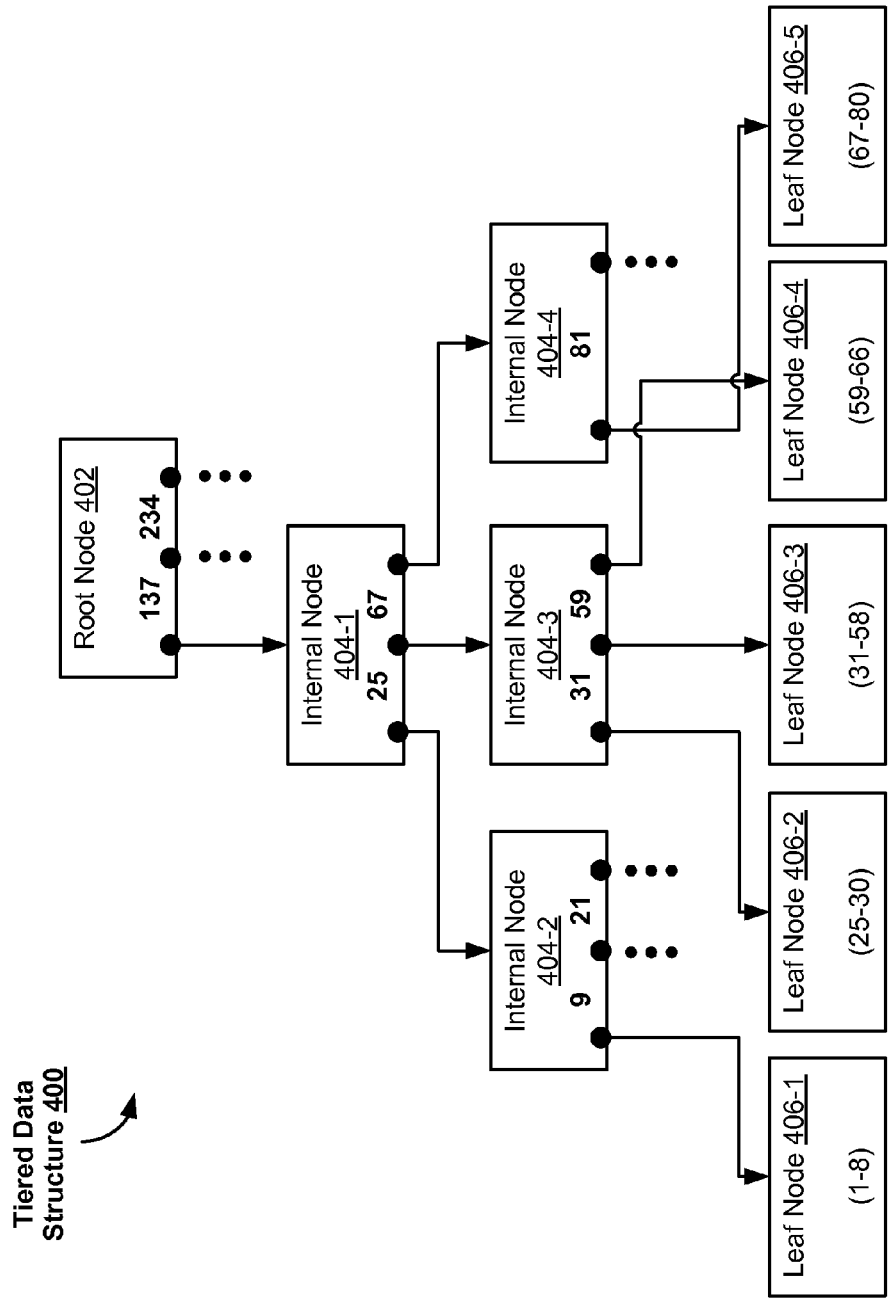
FIG. 4A illustrates an example of a tiered data structure in accordance with some embodiments.

FIG. 4A illustrates an example of a tiered data structure in accordance with some embodiments. Tiered data structure 400 includes a plurality of nodes. The plurality of nodes are organized in a tiered structure in which each respective node is connected to one or more other nodes in levels (tiers) above and/or below the respective node. A parent node for a respective node in tiered data structure 400 is a node that is a level (tier) above the respective node in tiered data structure 400 and refers to the respective node. A child node for a respective node in tiered data structure 400 is a node that is a level (tier) below the respective node in tiered data structure 400 and refers to the respective node. Two nodes are at the same level if they have a same number of nodes to traverse to reach root node 402. Root node 402 is an external node that has no parent node, typically there is only one root node for tiered data structure 400. Internal nodes 404 are nodes that have both a parent node and one or more child nodes and are thus internal to the tiered data structure. Leaf nodes 406 are nodes that do not have child nodes and are thus "external" nodes. Root node 402 and internal nodes 404 include references that indicate which child nodes are associated with a particular range of data. For example, root node 402 in FIG. 4A indicates that internal node 404-1 is associated with data with keys between 1 and 136. Internal node 404-1 indicates that: internal node 404-2 is associated with data objects having keys between 1 and 24; internal node 404-3 is associated with data objects having keys between 25 and 66; and internal node 404-4 is associated with data objects having keys between 67 and 136. Similarly, internal node 404-3 indicates that: leaf node 406-2 includes data with keys between 25 and 30; leaf node 406-3 includes data with keys between 31 and 58; and leaf node 406-4 includes data with keys between 59 and 66, and so on.

Navigating the tiered data structure typically, but optionally, relies on the assumption that keys are always sorted in a predefined key order (e.g., monotonically ascending), so that a node that is associated with data having keys between a first value and a second value is associated with all data in the tiered data structure that has keys between the first value and the second value. In some embodiments, each leaf node has a maximum size and when the leaf node exceeds the maximum size, the leaf node is split into two leaf nodes. In some embodiments, each leaf node has a minimum size and when a leaf node is below the minimum size, the leaf node is combined with one or more other leaf nodes. In some embodiments, each non-leaf node (e.g., root node or internal node) has a maximum number of child nodes, and when splitting of a leaf node results in a non-leaf node having more than the maximum number of child nodes, the non-leaf node is split to accommodate the extra child nodes. In some embodiments, each non-leaf node (e.g., root node or internal node) has a minimum number of child nodes, and when a combining two or more leaf nodes results in a non-leaf node having less than the minimum number of child nodes, the non-leaf node is combined with one or more other non-leaf nodes to accommodate the reduced number of child nodes. The tiered data structure may additionally conform to some or all of the rules associated with B–Trees, B+Trees, B*Trees or other tiered data structures.

Figure 4B:
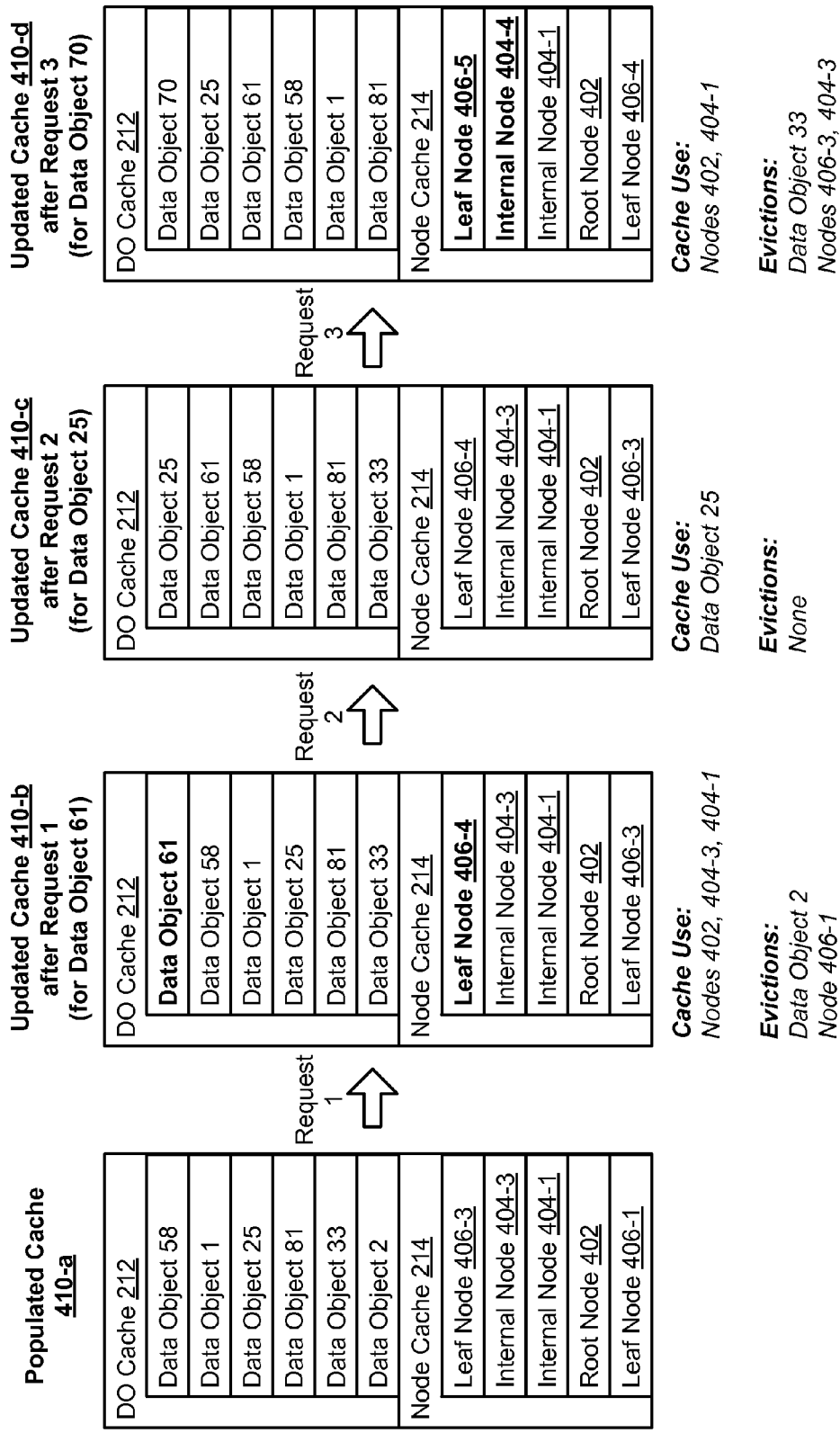
FIGS. 4B-4E illustrate the performance of example operations on the example tiered data structure in FIG. 4A in accordance with some embodiments.

FIG. 4B illustrates an example of efficient cache utilization in a tiered data structure in accordance with some embodiments. In FIG. 4B, populated cache 410-a is an example of cache 206 from FIG. 2A that is populated with one or more data objects and one or more nodes that were retrieved to respond to prior requests for data objects by one or more internal or external requestors. For example, one of the prior requests was a request for data object 58, so management module 140 traversed through tiered data structure 400 in FIG. 4A by traversing, in sequence, root node 402, internal node 404-1, internal node 404-3 to identify and retrieve leaf node 406-3, which includes data object 58. After retrieving data object 58, data object 58 is cached in data object cache portion 212 and the traversed nodes are cached in node cache portion 214. In FIG. 4B, the data objects in the populated cache 410 are shown in order of "staleness" where more stale data objects are near the bottom of data object cache portion 212 and less stale (e.g., fresher) data objects are near the top of data object cache portion 212, as data objects are refreshed, they are reordered in the cache to represent their staleness, even though the data objects are, in many circumstances, not actually moved within the cache. Similarly, in FIG. 4B, the nodes in the populated cache 410 are shown in order of "staleness" where more stale nodes are near the bottom of node cache portion 214 and less stale (e.g., fresher) data objects are near the top of node cache portion 214, as nodes are refreshed, they are reordered in the cache to represent their staleness, even though nodes are, in many circumstances, not actually moved within the cache.

In FIG. 4B, in response to a request (e.g., "request 1") for data object 61, management module 140 determines that data object 61 is not in data object cache portion 212 in populated cache 410-a. Subsequently, management module 140 traverses through tiered data structure 400 in FIG. 4A by traversing, in sequence, root node 402, internal node 404-1, internal node 404-3 to identify and retrieve leaf node 406-4, which includes data object 61. When traversing tiered data structure 400, management module 140 is able to use a number of cached nodes to improve response time (e.g., by using root node 402, internal node 404-1 and internal node 404-3 to determine that leaf node 406-4 has be retrieved from tiered data structure 400). Management module 140 caches the traversed nodes in node cache portion 214 and caches data object 61 in data object cache portion 212 as shown in updated cache 410-b in FIG. 4B. In order to make room for the traversed nodes and retrieved data object, data object 2 and leaf node 406-1 are evicted from cache 206 in accordance with a cache eviction policy, as shown in updated cache 410-b in FIG. 4B.

In FIG. 4B, in response to a request (e.g., "request 2") for data object 25, management module 140 determines that data object 25 is in data object cache portion 212 in populated cache 410-b. As data object 25 is already in data object cache portion 212, management module 140 does not traverse tiered data structure 400 to retrieve data object 25, because data object 25 is retrieved from cache 206. In conjunction with being retrieved, data object 25 is refreshed in data object cache portion 212 so that it is less stale than object 61 rather than being more stale than data object 61, as shown in updated cache 410-c in FIG. 4B. In some embodiments, data object 25 is identified in data object cache portion 212 using a hash table to locate a portion of data object cache portion 212 that includes data object 25. As no new data objects or nodes were added to cache 206, no data objects or nodes are evicted from cache 206.

In FIG. 4B, in response to a request (e.g., "request 3") for data object 70, management module 140 determines that data object 70 is not in data object cache portion 212 in populated cache 410-c. Subsequently, management module 140 traverses through tiered data structure 400 in FIG. 4A by traversing, in sequence, root node 402, internal node 404-1, internal node 404-4 to identify and retrieve leaf node 406-5, which includes data object 70. When traversing tiered data structure 400, management module 140 is able to use a number of cached nodes to improve response time (e.g., by using root node 402 and internal node 404-1 to determine that internal node 404-4 and leaf node 406-5 have to be retrieved from tiered data structure 400). Management module 140 caches the traversed nodes in node cache portion 214 and caches data object 70 in data object cache portion 212 as shown in updated cache 410-d in FIG. 4B. In order to make room for the traversed nodes and retrieved data object, data object 33, internal node 404-3, and leaf node 406-3 are evicted from cache 206 in accordance with a cache eviction policy, as shown in updated cache 410-d in FIG. 4B.

While the preceding examples have been shown with a small number of data objects and nodes, it should be understood that in a typical cache, a much larger number of data objects and nodes are stored in the cache and similar processes are performed. For example, in an 2 GB DRAM cache with a 1 GB data object cache portion, a 1 GB node cache portion, an average node size of 8 KB and an average data object size of 1 KB, the data object cache portion would hold approximately 1 million data objects and the node cache portion would hold approximately 250,000 nodes. In some embodiments, only internal nodes 404 are cached in node cache portion 214. In some embodiments, root node 402 and leaf nodes 406 are cached in node cache portion 214, but most leaf nodes are quickly evicted from node cache portion 214, while internal nodes 404 are frequently used and are thus frequently refreshed in cache 206, so that node cache portion 214 includes primarily internal nodes 404 during normal operation (e.g., 50% or more of the capacity of node cache portion 214 is occupied by internal nodes). Using a data object cache in addition to a node cache instead of solely using a node cache improves the performance of the cache by increasing the likelihood that a requested data object will be available from the cache. For example, using a 1 GB data object cache in addition to a 1 GB node cache approximately quadruples the object capacity of the cache as compared with a 2 GB node cache.

Figure 4C:
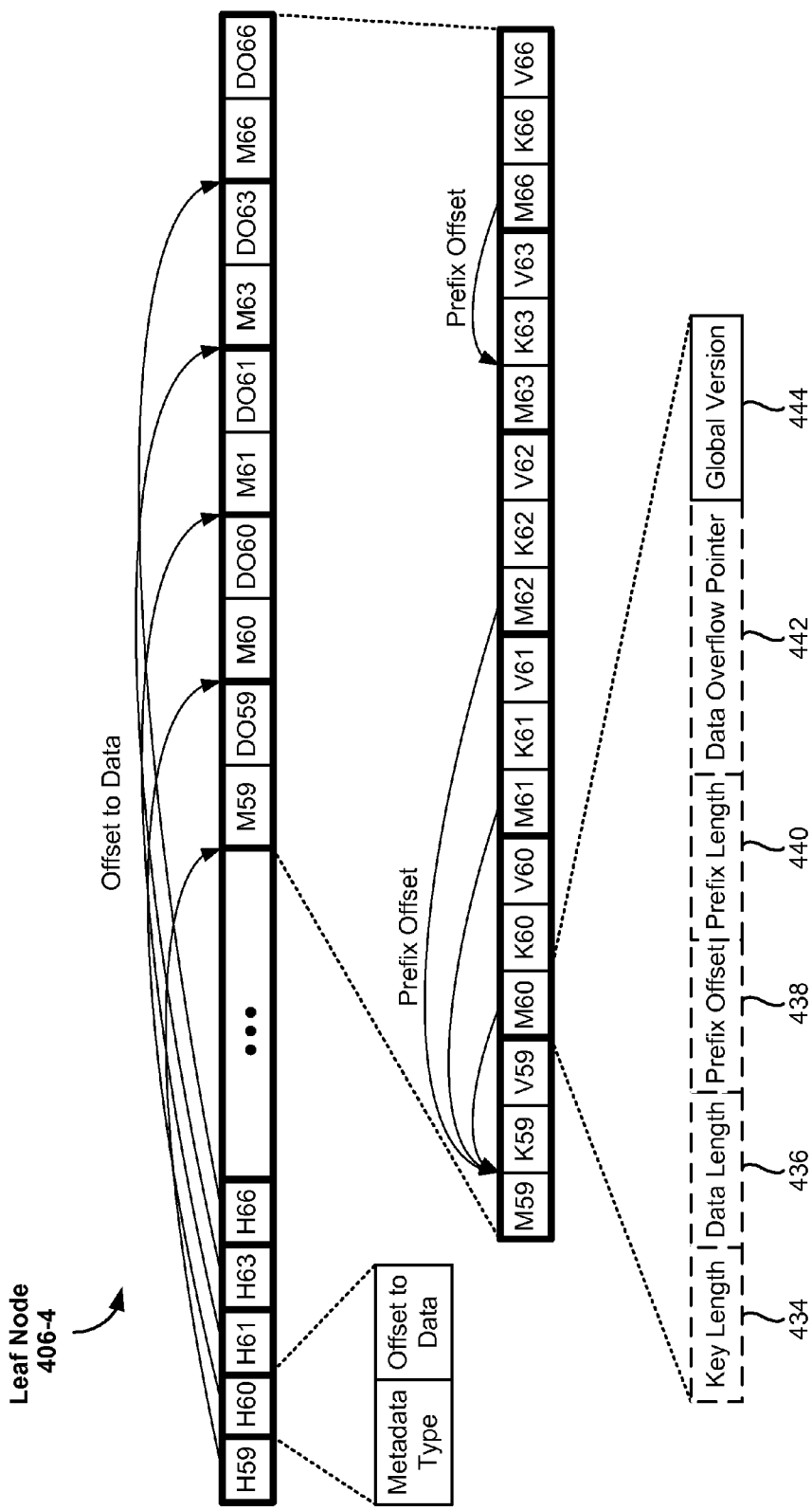
Figure 4D:
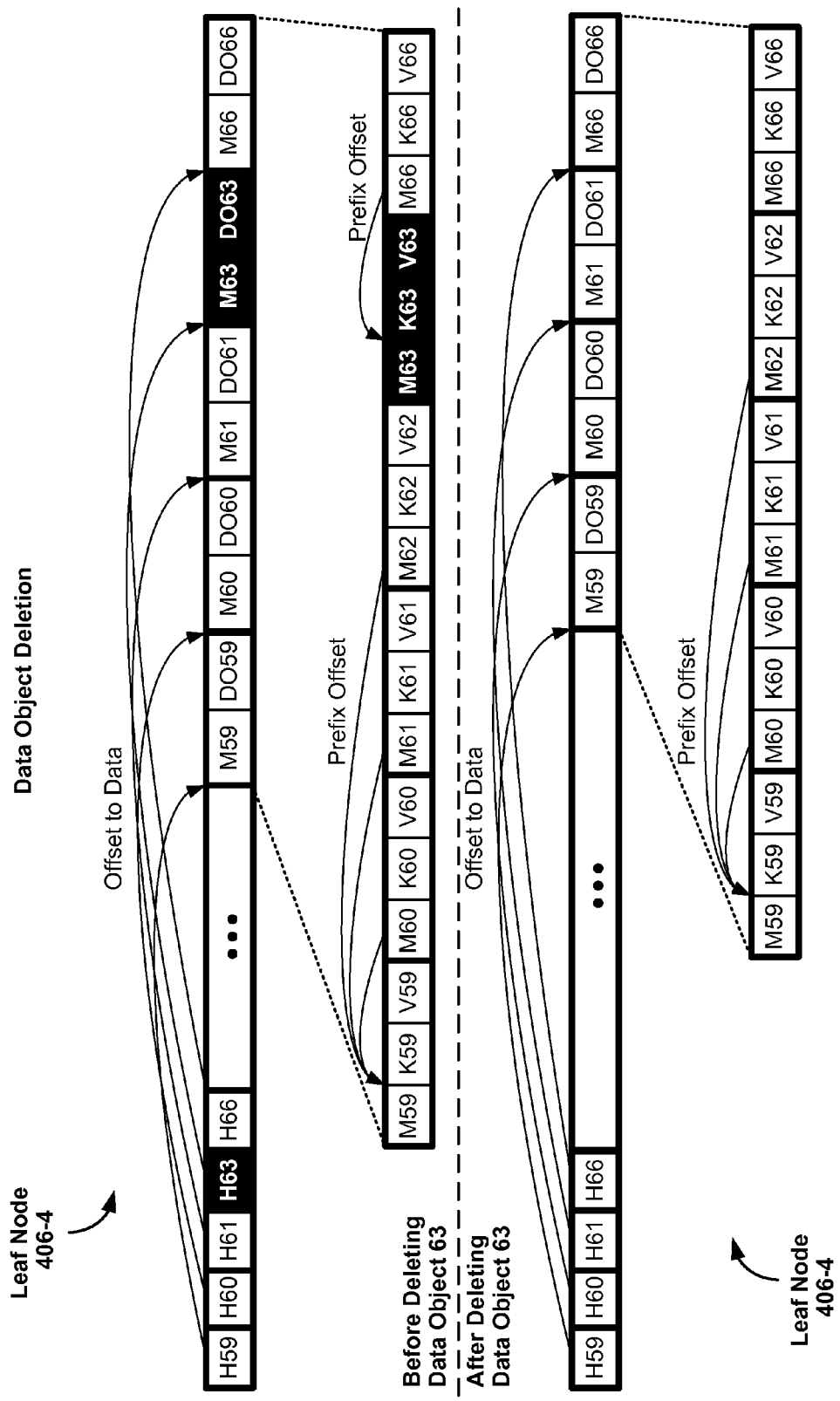
Figure 4E:
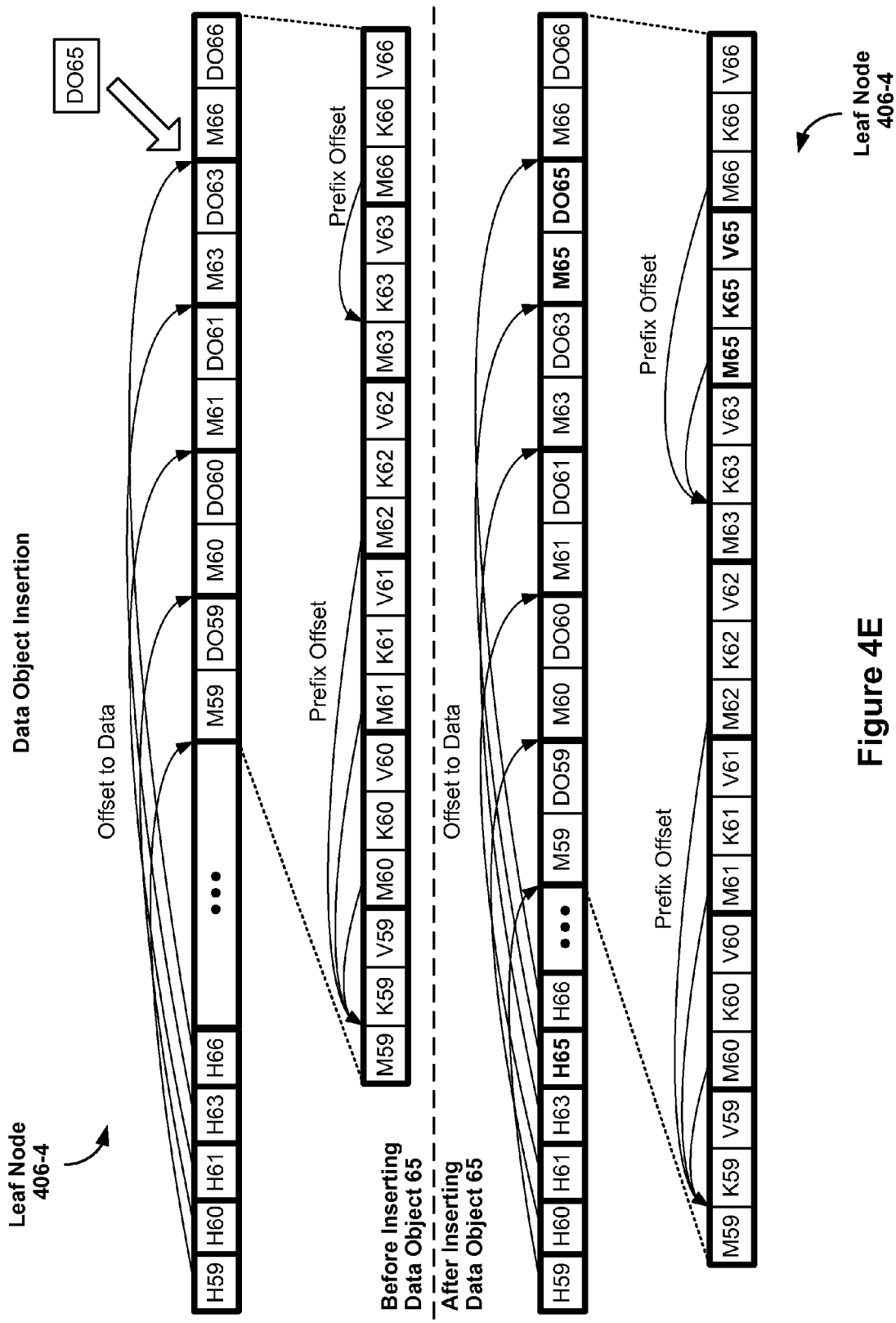

FIGS. 4C-4E illustrate examples of compaction of information in a tiered data structure in accordance with some embodiments. FIG. 4C shows an example leaf node 406-4 from tiered data structure 400 in FIG. 4A. Leaf node 406-4 includes data for data objects 59, 60, 61, 63 and 66. For each of these data objects (e.g., DO59, DO60, DO61, DO63, DO66), leaf node 406-4 includes a corresponding fixed length header (H59, H60, H61, H63, and H66, respectively) and corresponding metadata (e.g., M59, M60, M61, M63, and M66, respectively). The fixed length headers include a metadata type in embodiments where there are a plurality of different metadata types for metadata of the data objects, and an offset (e.g., a number of bytes) from a particular portion of the leaf node (e.g., a beginning or an end of the leaf node) to the location of the data object in the leaf node. The fixed length headers each have the same length, and can, thus, be used to perform a binary search through data objects in the leaf node. In some embodiments, the fixed length headers are packed to the left in the leaf node and the data objects and metadata are packed to the right in the leaf node, so that there is a growing area in the middle of the leaf node that increases or decreases in size as additional data objects are added to, or removed from, the leaf node. Packing the headers and data objects in different directions enables both the headers and the data objects to have fixed points to refer to when the data objects and nodes are identified by offsets (e.g., the headers can be identified based on an offset from a left edge of the leaf node, and the data objects and metadata can be identified based on an offset from a right edge of the leaf node).

The data objects (e.g., DO59, DO60, DO61, DO63, DO66) in leaf node 406-4 each include unique key information (e.g., K59, K60, K61, K63, K66, respectively) and a corresponding value (e.g., V59, V60, V61, V63, V66, respectively). In some embodiments, the unique key information for some of the data objects is a full unique key for the data objects, while the unique key information for other data objects is a portion of a unique key for the data objects, and the metadata for these data objects indicates a location of a key prefix that is shared with one or more other data objects that can be used to recreate the unique key for the data object in combination with the unique key information stored with the data object. For example, data object 59 includes a full unique key in unique key information K59, while data object 60 includes a partial key in unique key information K60 and metadata M60 associated with data object 60 is used to identify a location of a key prefix (e.g., a portion of K59 that serves as a key prefix for data object 60 and, in combination with unique key information K60 can be used to determine a unique key for data object 60). Similarly, data object 61 includes a partial key in unique key information K61 and metadata M61 associated with data object 61 is used to identify a location of a key prefix (e.g., a portion of K59 that serves as a key prefix for data object 61 and, in combination with unique key information K61 can be used to determine a unique key for data object 61).

Metadata (e.g., M59, M60, M61, M63, and M66) for a corresponding data object optionally includes one or more of the following: key length information 434 indicating a length of unique key information associated with the corresponding data object; data length information 436 indicating a length of the corresponding data object or the value of the corresponding data object; prefix offset information 438 that indicates a location of a start of a key prefix for the corresponding data object; prefix length information 440 that indicates a length of the key prefix for the corresponding data object; data overflow pointer 442 that indicates a location of data for the corresponding data object that is too large to fit in the leaf node; and global version information 444 that indicates a version of the corresponding data object. In some embodiments, global version information 444 includes information identifying the order of each change to data objects in tiered data structure 400 (FIG. 4A) or data objects in datastore 136 (FIGS. 1 and 2B), which can be used to determine whether a change to a first data object occurred before or after a change to a second, different, data object.

In some embodiments different data objects have different types of metadata with different lengths, sometimes called variable-length metadata. Using variable length metadata enables shorter metadata to be used in many situations, and using shorter metadata increases the number of data objects that can be stored in a leaf node. As one example, there are four types of metadata, type-0 metadata, type-1 metadata, type-2 metadata and type-3 metadata. Type-0 metadata is used when the data object has the same key prefix, key length, and data length as the preceding data object, in which case the metadata includes only global version information 444 (e.g., represented as a 64-bit unsigned integer), and other information such as key prefix location, data length and key length are determined by looking at the metadata corresponding to the preceding data object. Type-1 metadata is used when the data object has a key length and data length that can each fit in a single byte and data that fits in the leaf node, in which case the metadata includes key length information 434 (e.g., represented as an 8-bit unsigned integer), data length information 436 (e.g., represented as an 8-bit unsigned integer), prefix offset information 438 (e.g., represented as a 16-bit unsigned integer), prefix length information 440 (e.g., represented as an 8-bit unsigned integer), and global version information 444 (e.g., represented as a 64-bit unsigned integer). Type-2 metadata is used when the data object has a key length and data length that can each fit in two bytes, in which case the metadata includes key length information 434 (e.g., represented as a 16-bit unsigned integer), data length information 436 (e.g., represented as a 16-bit unsigned integer), prefix offset information 438 (e.g., represented as a 16-bit unsigned integer), prefix length information 440 (e.g., represented as a 16-bit unsigned integer), data overflow pointer 442 (e.g., represented as a 64-bit unsigned integer), and global version information 444 (e.g., represented as a 64-bit unsigned integer). Type-3 metadata is used for data objects that do not fit in the other categories, in which case the metadata includes key length information 434 (e.g., represented as a 32-bit unsigned integer), data length information 436 (e.g., represented as a 32-bit unsigned integer), prefix offset information 438 (e.g., represented as a 16-bit unsigned integer), prefix length information 440 (e.g., represented as a 32-bit unsigned integer), data overflow pointer 442 (e.g., represented as a 64-bit unsigned integer), and global version information 444 (e.g., represented as a 64-bit unsigned integer). Type-3 metadata is the most flexible metadata type, but is also the largest of these four metadata types. Enabling the use of other types of metadata (e.g., type-0, type-1, or type-2) saves space in the leaf node when type-3 metadata is not needed to store all of the relevant metadata for a data object. While the example above describes four types of metadata, the principles described above (e.g., using a shorter formats for metadata where the shorter format enables all of the necessary metadata information to be conveyed by the shorter metadata) would apply equally to other types of metadata and thus, in principle, any number of types of metadata could be used in an analogous manner.

FIG. 4D illustrates an example of deleting a data object from leaf node 406-4. In the upper part of FIG. 4D, before data object 63 has been deleted, leaf node 406-4 is shown with highlighting in black to indicate the information in leaf node 406-4 that will be deleted when the deletion operation is performed. After data object 63 has been deleted, header H63 is deleted from leaf node 406-4, as shown in the lower part of FIG. 4D, and the remaining headers (e.g., H59, H60, H61, and H66) are repacked against the left edge of leaf node 406-4. Additionally, after data object 63 has been deleted, data object DO63 and corresponding metadata M63 are deleted as shown in the lower part of FIG. 4D, and the remaining data objects (e.g., DO59, DO60, DO61, and DO66) and metadata (e.g., M59, M60, M61, and M66) are repacked against the right edge of leaf node 406-4. Additionally, before data object 63 was deleted, data object 66 relied on a portion of the key of data object 63 as a key prefix for data object 66. Thus, after data object 63 and its corresponding unique key information K63 is deleted, data object 66 can no longer rely on the portion of the key of data object 63 as a key prefix. Thus, in FIG. 4D, unique key information K66 for data object 66 is updated to include a full unique key for data object 66, and metadata M66 is updated to include a null value for the prefix offset information to indicate that there is no key prefix for data object 66 and that the unique key information K66 for data object 66 includes a full unique key. Alternatively, in some circumstances, management module 140 determines that there is another data object (e.g., data object 59) in leaf node 406-4 that is associated with unique key information that could be used as a new key prefix for data object 66, and unique key information K66 is updated to include a portion of the unique key for data object 66 that, when combined with the new key prefix can be used to generate the full unique key for data object 66, and metadata M66 is updated to point to unique key information (e.g., K59) for the other data object so that a portion of unique key information (e.g., K59) for the other data object can be used as a key prefix for data object 66. Additionally, in many circumstances, repacking the data objects and headers as described above after deleting data object 63 will change locations of data objects, metadata and headers relative to the locations from which offsets identifying locations of these elements are measured, and thus after a data object, header, and metadata have been deleted, management module 140 updates the offset information in the header and metadata corresponding to one or more of the other data objects (e.g., data objects that remain in leaf node 406-4 after to deleting data object 63).

FIG. 4E illustrates an example of adding a data object to leaf node 406-4. In the upper part of FIG. 4E, before data object 65 has been added, leaf node 406-4 is shown with data object DO65 that is to be added to leaf node 406-4. After data object 65 has been added, new header H65 is added in between header H63 and header H66, as shown in the lower part of FIG. 4E, and the headers (e.g., H59, H60, H61, H63, H65, and H66) are repacked against the left edge of leaf node 406-4. Additionally, after data object 65 has been added, data object DO65 and corresponding metadata M65 are added to leaf node 406-4 as shown in the lower part of FIG. 4E, and the data objects (e.g., DO59, DO60, DO61, DO63, DO65, and DO66) and metadata (e.g., M59, M60, M61, M63, M65, and M66) are repacked against the right edge of leaf node 406-4. Additionally, before data object 65 was added, data object 66 relied on a portion of the key of data object 63 as a key prefix for data object 66 and data object 63 was adjacent to metadata M66 for data object 66. Thus, after data object 65 is added in between data object 63 and data object 66, metadata M66 of data object 66 is updated to indicate a different offset for the key prefix for data object 66, because the relative position between metadata M66 and unique key information K63 has changed. Moreover, in FIG. 4E, newly added data object 65 is also able to use a portion of unique key information K63 as a key prefix, and thus metadata M65 of data object 65 is updated to identify a portion of K63 as a key prefix that can be combined with unique key information K65 to generate a full unique key for data object 65. Additionally, in many circumstances, repacking the data objects and headers as described above after adding data object 65 will change locations of data objects, metadata and headers relative to the locations from which offsets identifying locations of these elements are measured, and thus after a new data object, new header and new metadata have been inserted, management module 140 updates the offset information in the header and metadata corresponding to one or more of the other data objects (e.g., data objects that were in leaf node 406-4 prior to adding data object 65).

In some situations one or more data objects are updated without adding or deleting a data object from leaf node 406-4. However, even though a data object has not been added or deleted, updating a data object will, in some circumstances change a size of the data object (e.g., by changing a type of metadata used by the data object to a smaller or larger size of metadata or by changing a length of the data to a smaller or larger length). The change in the data object or associated metadata will, in many circumstances, change locations of data objects, metadata and headers relative to the locations from which offsets identifying locations of these elements are measured, and thus after a data object or metadata has been updated, management module 140 updates the offset information in the header and metadata corresponding to one or more of the other data objects.

FIGS. 5A-5D illustrate example operations performed on a tiered data structure in accordance with some embodiments. FIGS. 5A-5D show a portion of tiered data structure ("TDS") 502 that includes internal node 504 and leaf nodes 506. In FIGS. 5A-5D, in accordance with predefined parameters, internal node 504 is associated with a minimum number of two leaf nodes 506 and a maximum number of four leaf nodes 506. Thus, in FIGS. 5A-5D, internal node 504 includes at least two and at most four key information-sequence number parings (e.g., shown in FIGS. 5A-5D as K_-Q_) pointing to data objects in leaf nodes 506. In FIGS. 5A-5D, in accordance with predefined parameters, leaf nodes 506 have a maximum size whereby a respective leaf node 506 includes at most four data objects and a minimum size whereby the respective leaf node 506 includes at least two data objects. In FIGS. 5A-5D, data objects 512 included in leaf nodes 506 are each associated with a key information-sequence number paring (e.g., shown in FIGS. 5A-5D as K_-Q_) and data (e.g., a value shown in FIGS. 5A-5D as V_). In some embodiments, the sequence numbers associated with data objects 512 are unique numbers that are assigned to new data objects by management module 140 in monotonically ascending order.

Figure 5A:
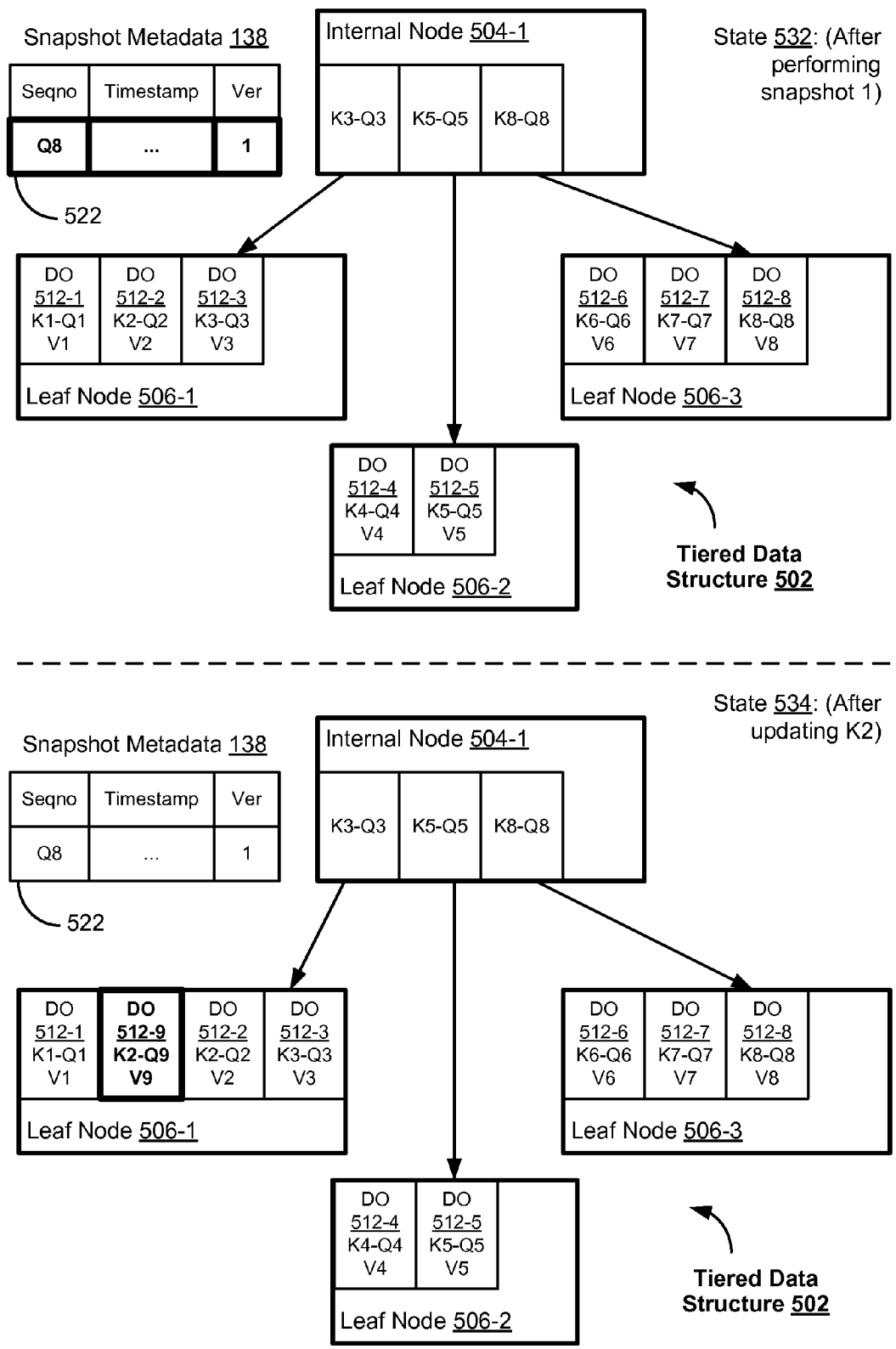
FIGS. 5A-5D illustrate the performance of example operations on a tiered data structure in accordance with some embodiments.

In FIG. 5A, state 532 shows TDS 502 and snapshot metadata 138 after management module 140 performs a first snapshot of TDS 502. In state 532, internal node 504-1 includes: (key 3-sequence number 3) pointing to rightmost data object 512-3 in leaf node 506-1; (key 5-sequence number 5) pointing to rightmost data object 512-5 in leaf node 506-2; and (key 8-sequence number 8) pointing to rightmost data object 512-8 in leaf node 506-3. In state 532, leaf node 506-1 includes: data object 512-1 corresponding to (key 1-sequence number 1) with value (V1); data object 512-2 corresponding to (key 2-sequence number 2) with value (V2); and data object 512-3 corresponding to (key 3-sequence number 3) with value (V3). In state 532, leaf node 506-2 includes: data object 512-4 corresponding to (key 4-sequence number 4) with value (V4); and data object 512-5 corresponding to (key 5-sequence number 5) with value (V5). In state 532, leaf node 506-3 includes: data object 512-6 corresponding to (key 6-sequence number 6) with value (V6); data object 512-7 corresponding to (key 7-sequence number 7) with value (V7); and data object 512-8 corresponding to (key 8-sequence number 8) with value (V8).

In FIGS. 5A-5D, snapshot metadata 138 includes snapshot entries for TDS 502. In state 532, snapshot metadata 138 includes snapshot entry 522 corresponding to the first snapshot of TDS 502. Snapshot entry 522 includes the following fields: A) sequence number 8 corresponding to the highest sequence number associated with a data object (e.g., data object 512-8) at the time of the first snapshot; B) a timestamp; and C) version number 1 indicating that snapshot entry 522 corresponds to a first snapshot of TDS 502. In some embodiments, snapshot entry 522 indicates that data objects associated with sequence numbers 1-8 (e.g., data objects 512-1, . . . , 512-8) are locked in the first snapshot.

In some embodiments, management module 140 receives from a requestor (e.g., computer system 110, FIG. 1) a request to perform an update/replacement operation whereby an old value of a respective data object is to be updated/replaced with a new value or a request to perform a deletion operation whereby an old value associated with a respective data object is to be replaced with a tombstone to indicate that the respective data object has been deleted. After receiving the request, management module 140 determines whether the respective data object is locked in a snapshot by comparing the unique sequence number of the data object with the highest sequence number (sometimes also called a boundary sequence number) included in the snapshot entries of snapshot metadata 138. If the sequence number of the respective data object is less than or equal to the boundary sequence number, management module 140 cannot perform the update/replacement or deletion operation on the respective data object in-place, and, instead, management module 140 creates a new data object so as to perform the update/replacement or deletion operation. However, if the unique sequence number of the respective data object is greater than the boundary sequence number, management module 140 performs the update/replacement or deletion operation in-place on the respective data object.

In FIG. 5A, state 534 shows TDS 502 and snapshot metadata 138 after management module 140 performs an update operation of the data object corresponding to key 2. For example, management module 140 receives a request to update the old value of a data object that corresponds to key 2 with a new value. In this example, management module 140 determines that data object 512-2, which corresponds to key 2, is locked in the first snapshot because its unique sequence number (2) is less than the boundary sequence number (8) corresponding to the first snapshot in snapshot entry 522. Continuing with this example, while maintaining data object 512-2, management module 140 inserts new data object 512-9 corresponding to (key 2-sequence number 9) with the new value (V9) into leaf node 506-1.

In state 534, leaf node 506-1 includes: data object 512-1 corresponding to (key 1-sequence number 1) with value (V1); new data object 512-9 corresponding to (key 2-sequence number 9) with value (V9); data object 512-2 corresponding to (key 2-sequence number 2) with value (V2); and data object 512-3 corresponding to (key 3-sequence number 3) with value (V3). State 534 indicates that new data object 512-9 was inserted to the left of data object 512-2 (i.e., reverse key order).

Figure 5B:
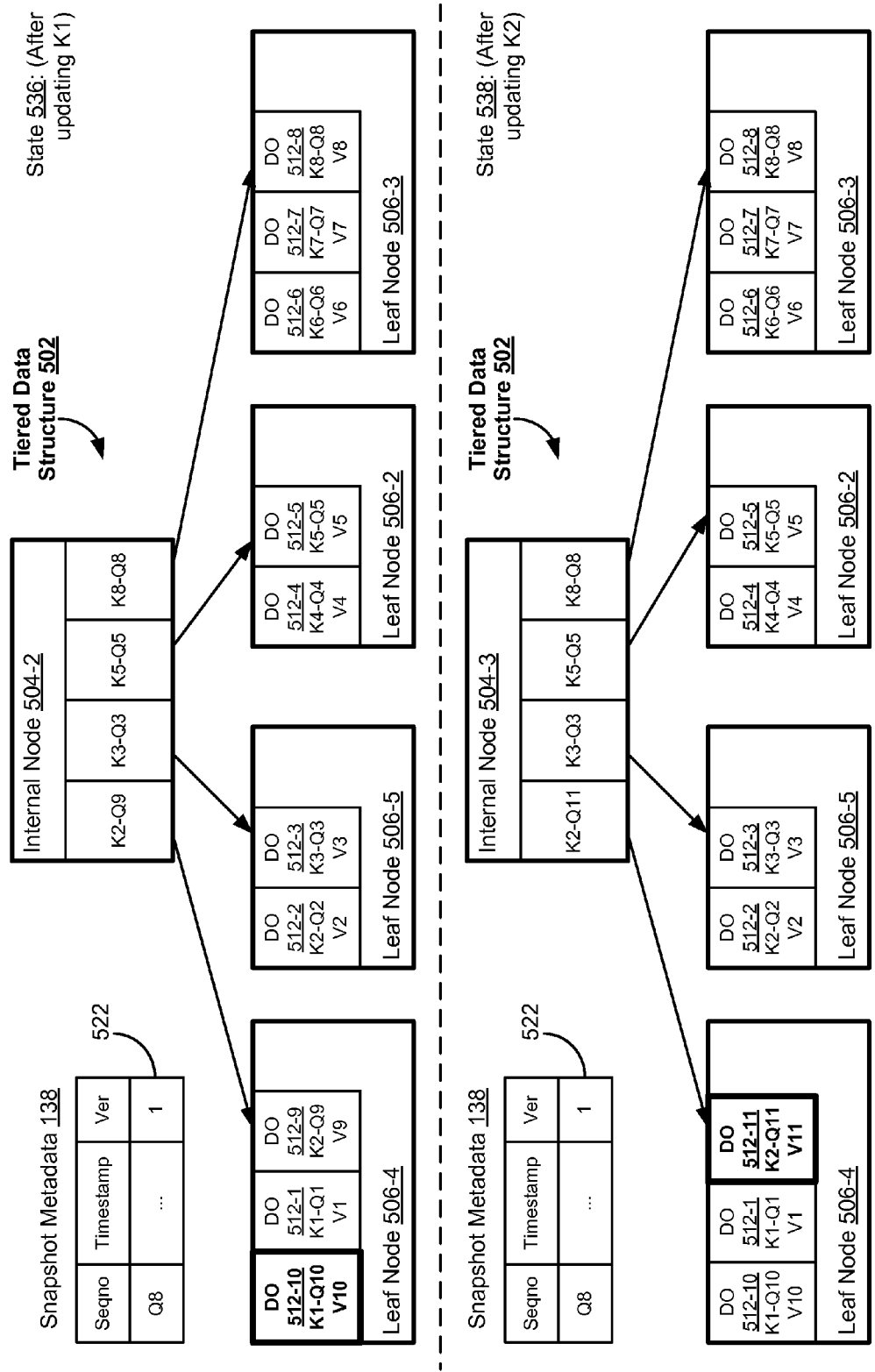

In FIG. 5B, state 536 shows TDS 502 and snapshot metadata 138 after management module 140 performs an update operation of the data object corresponding to key 1. For example, management module 140 receives a request to update the old value of a data object that corresponds to key 1 with a new value. In this example, management module 140 determines that data object 512-1, which corresponds to key 1, is locked in the first snapshot because its unique sequence number (1) is less than the boundary sequence number (8) corresponding to the first snapshot in snapshot entry 522. Continuing with this example, while maintaining data object 512-1, management module 140 inserts new data object 512-10 corresponding to (key 1-sequence number 10) with the new value (V 10) into leaf node 506-1. Continuing with this example, the insertion of new data object 512-10 causes leaf node 506-1 to be split into leaf nodes 506-4 and 506-5 between data object 512-9 and data object 512-2 because the insertion causes leaf node 506-1 to exceed the maximum leaf node size (e.g., a leaf node cannot include more than four data objects).

In state 536, internal node 504-2 includes: (key 2-sequence number 9) pointing to rightmost data object 512-9 in leaf node 506-4; (key 3-sequence number 3) pointing to rightmost data object 512-3 in leaf node 506-5; (key 5-sequence number 5) pointing to rightmost data object 512-5 in leaf node 506-2; and (key 8-sequence number 8) pointing to rightmost data object 512-8 in leaf node 506-3. In state 536, leaf node 506-4 includes: new data object 512-10 corresponding to (key 1-sequence number 10) with value (V10); data object 512-1 corresponding to (key 1-sequence number 1) with value (V1); and data object 512-9 corresponding to (key 2-sequence number 9) with value (V9). In state 536, leaf node 506-5 includes: data object 512-2 corresponding to (key 2-sequence number 2) with value (V2); and data object 512-3 corresponding to (key 3-sequence number 3) with value (V3). State 536 indicates that new data object 512-10 was inserted to the left of data object 512-1 (i.e., reverse key order).

In FIG. 5B, state 538 shows TDS 502 and snapshot metadata 138 after management module 140 performs an update operation of the data object corresponding to key 2. For example, management module 140 receives a request to update the old value of a data object that corresponds to key 2 with a new value. In this example, management module 140 determines that data object 512-9 is the data object corresponding to key 2 with the highest sequence number (e.g., the newest data object corresponding to key 2). Continuing with this example, management module 140 then determines that data object 512-9 is not locked in the first snapshot because its unique sequence number (9) is greater than the boundary sequence number (8) corresponding to the first snapshot in snapshot entry 522. Further in this example, management module 140 updates/replaces the old value (e.g., V9) of data object 512-9 with the new value (V11) in-place so as to create new data object 512-11 corresponding to (key 2-sequence number 11) in leaf node 506-4.

In state 538, internal node 504-3 includes: (key 2-sequence number 11) pointing to rightmost data object 512-11 in leaf node 506-4; (key 3-sequence number 3) pointing to rightmost data object 512-3 in leaf node 506-5; (key 5-sequence number 5) pointing to rightmost data object 512-5 in leaf node 506-2; and (key 8-sequence number 8) pointing to rightmost data object 512-8 in leaf node 506-3. In state 538, leaf node 506-4 includes: data object 512-10 corresponding to (key 1-sequence number 10) with value (V10); data object 512-1 corresponding to (key 1-sequence number 1) with value (V1); and new data object 512-11 corresponding to (key 2-sequence number 11) with value (V11).

Figure 5C:
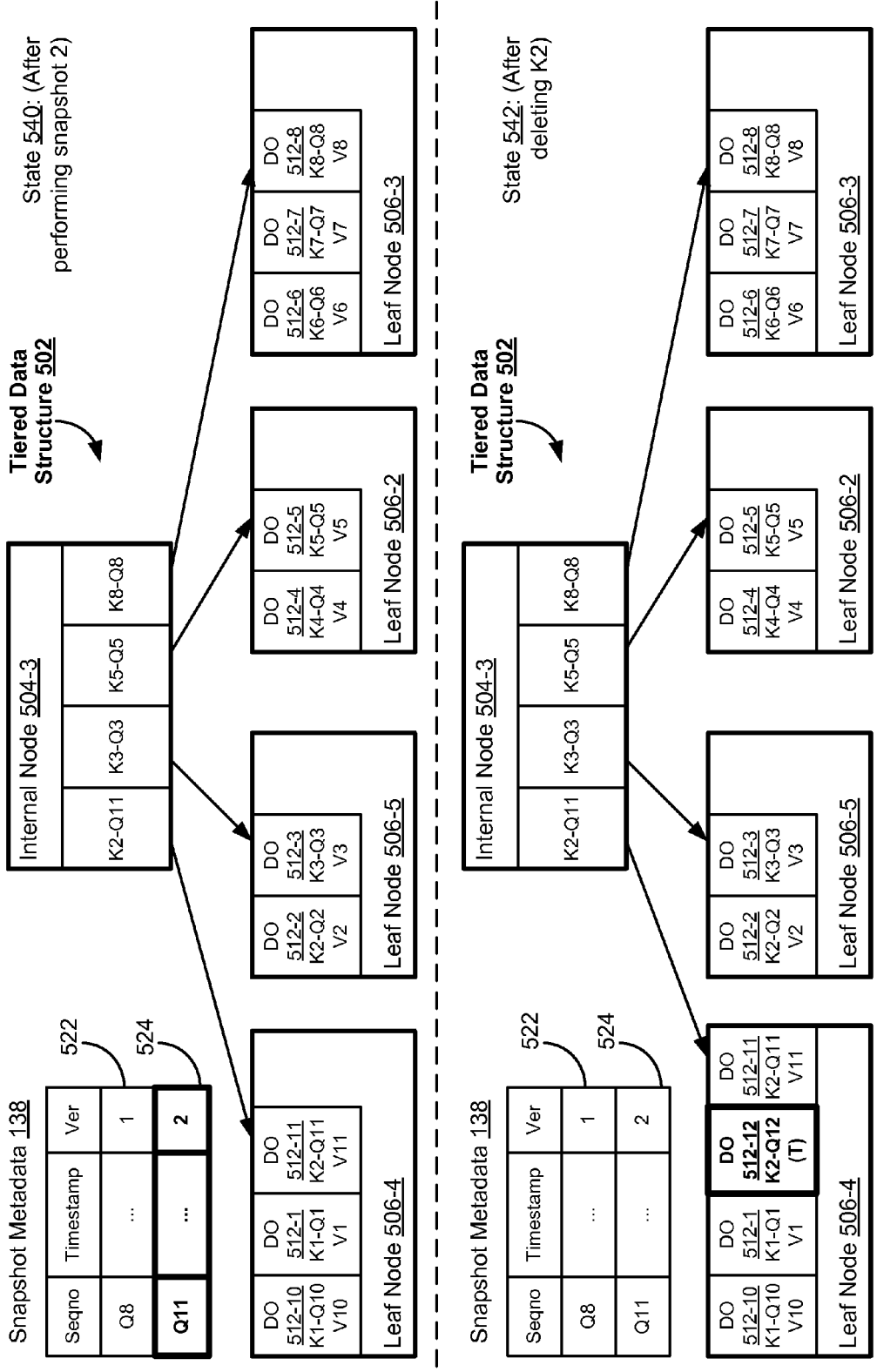

In FIG. 5C, state 540 shows TDS 502 and snapshot metadata 138 after management module 140 performs a second snapshot of TDS 502. In state 540, snapshot metadata 138 includes snapshot entry 524 corresponding to the second snapshot of TDS 502. Snapshot entry 524 includes the following fields: A) sequence number 11 corresponding to the highest sequence number associated with a data object (e.g., data object 512-11) at the time of the second snapshot; B) a timestamp; and C) version number 2 indicating that snapshot entry 524 corresponds to a second snapshot of TDS 502. In some embodiments, snapshot entry 524 indicates that data objects associated with sequence numbers 1-11 (e.g., data objects 512-1, . . . , 512-11) are locked in the second snapshot.

In FIG. 5C, state 542 shows TDS 502 and snapshot metadata 138 after management module 140 performs a deletion operation of the data object corresponding to key 2. For example, management module 140 receives a request to delete a data object that corresponds to key 2. In this example, management module 140 determines that data object 512-11 is the data object corresponding to key 2 with the highest sequence number (e.g., the newest data object corresponding to key 2). Continuing with this example, management module 140 then determines that data object 512-11 is locked in the second snapshot because its unique sequence number (11) is equal to the boundary sequence number (11) corresponding to the second snapshot in snapshot entry 524. Continuing with this example, while maintaining data object 512-11, management module 140 inserts new data object 512-12 corresponding to (key 2-sequence number 12) with a tombstone into leaf node 506-4. In some embodiments, the tombstone indicates that the associated data object has been deleted.

In state 542, leaf node 506-4 includes: data object 512-10 corresponding to (key 1-sequence number 10) with value (V10); data object 512-1 corresponding to (key 1-sequence number 1) with value (V1); new data object 512-12 corresponding to (key 2-sequence number 12) with a tombstone; and data object 512-11 corresponding to (key 2-sequence number 11) with value (V11). State 542 indicates that new data object 512-12 was inserted to the left of data object 512-11 (i.e., reverse key order).

In some embodiments, in response to receiving a request from the requestor (e.g., computer system 110, FIG. 1) to perform a cleanup process on one or more specified snapshots, management module 140 performs a cleanup process on a TDS (or multiple tiered data structures) associated with one or more specified snapshots, by:

A) identifying a cleanup sequence number, where the cleanup sequence number is a highest sequence number associated with the snapshot entries of the one or more specified snapshots;
B) deleting entries associated with the one or more specified snapshots from snapshot metadata 138;
C) identifying sets of redundant data objects, where a respective set of redundant data objects includes two or more data objects corresponding to same key information;
D) for a respective set of redundant data objects, identifying a data object with a highest sequence number;
E) for a respective set of redundant data objects, removing all data objects that are both: (i) associated with sequence numbers less than the sequence number of the identified data object with the highest sequence number in the set of redundant data objects; and (ii) associated with sequence numbers less than or equal to the cleanup sequence number; and
F) removing, from the TDS, all data objects that include a tombstone.

In some embodiments, when the request does not specify one or more snapshots, management module 140 performs the cleanup process as to an oldest or all snapshots included in snapshot metadata 138.

Figure 5D:
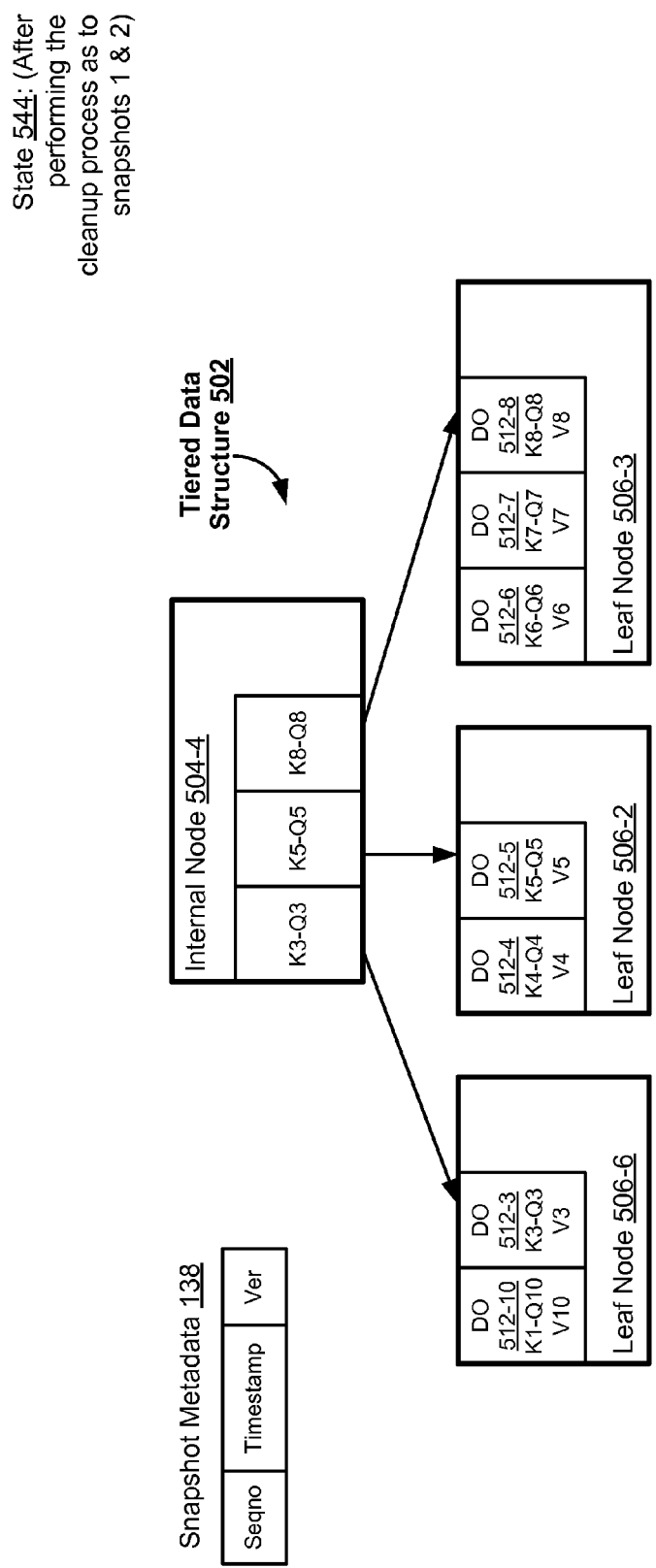
Figure 6A:
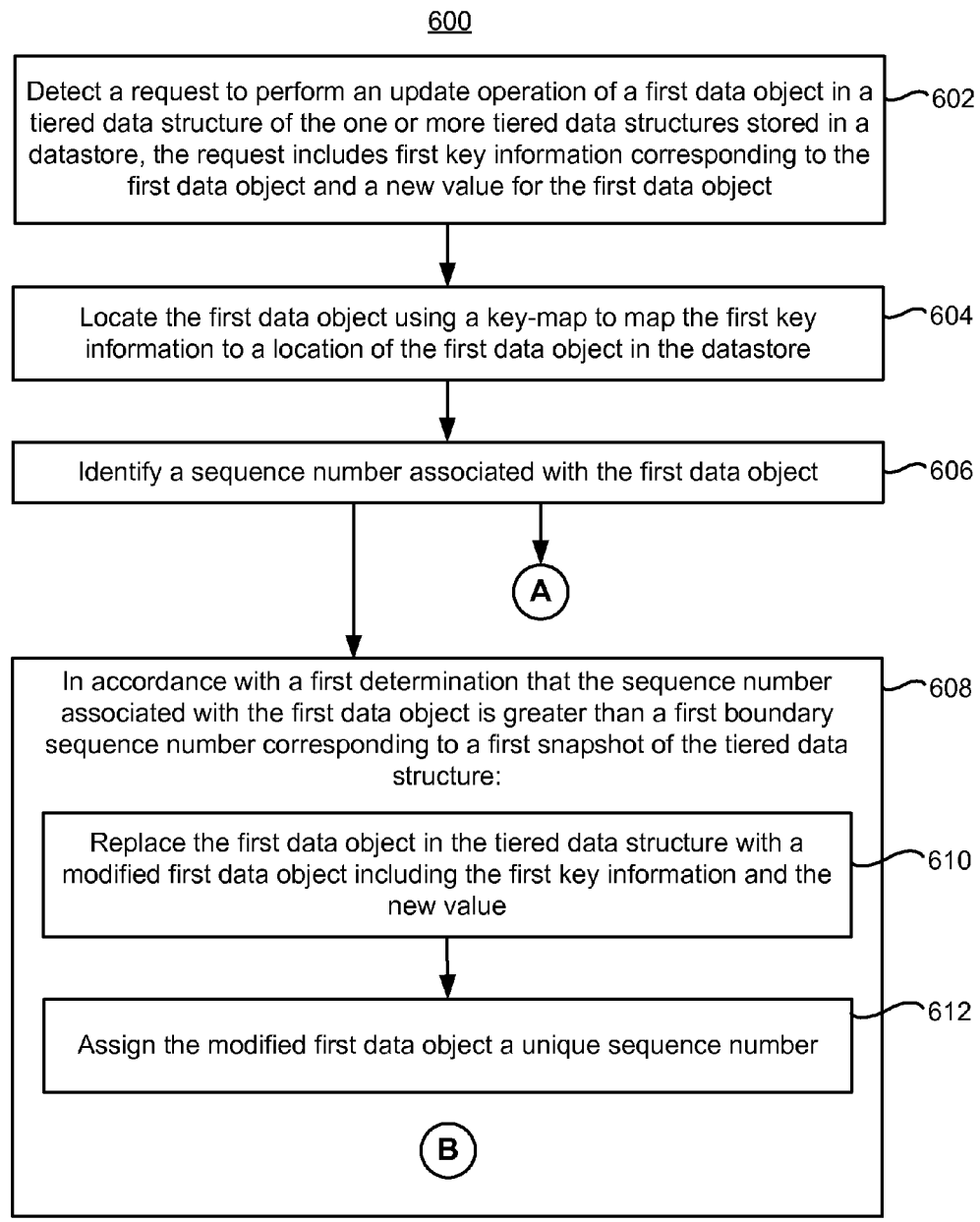
FIGS. 6A-6F illustrate a flowchart representation of a method of managing a tiered data structure in accordance with some embodiments.
Figure 6B:
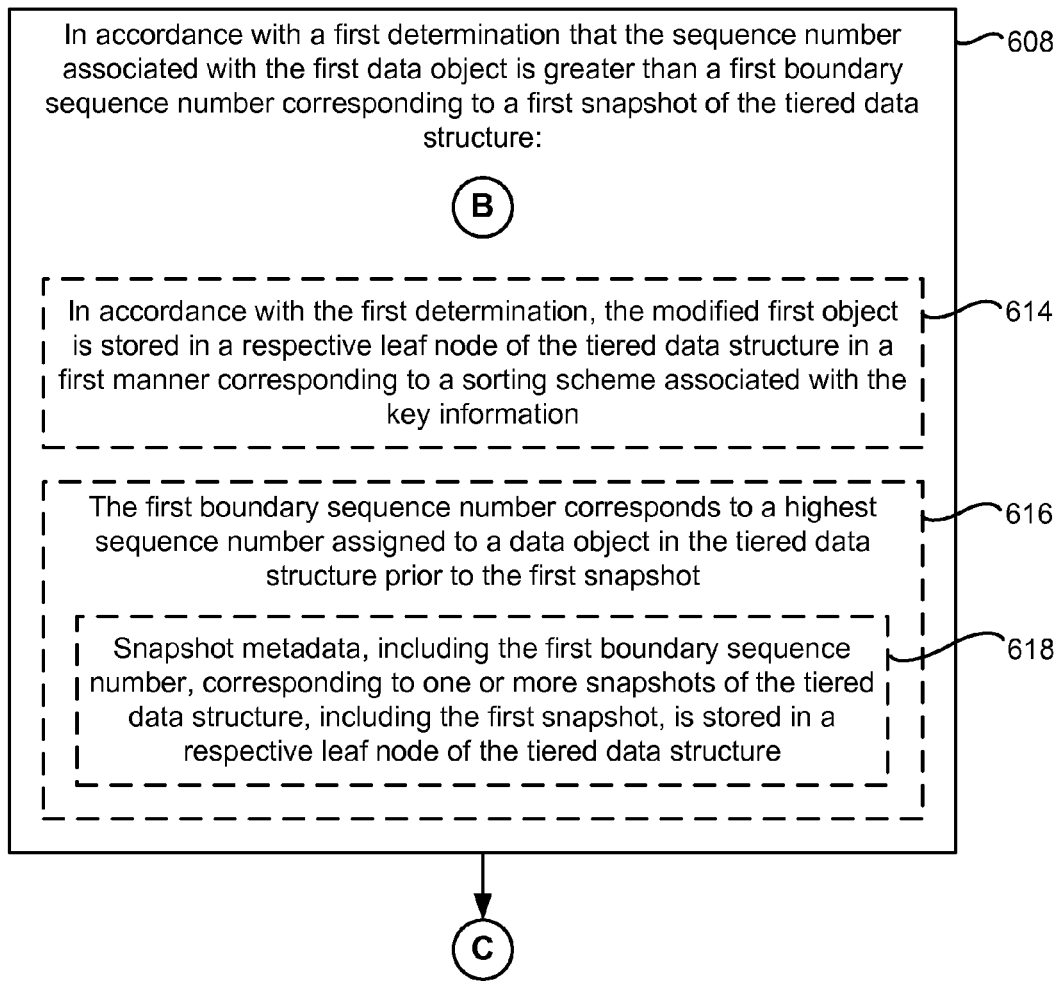
Figure 6C:
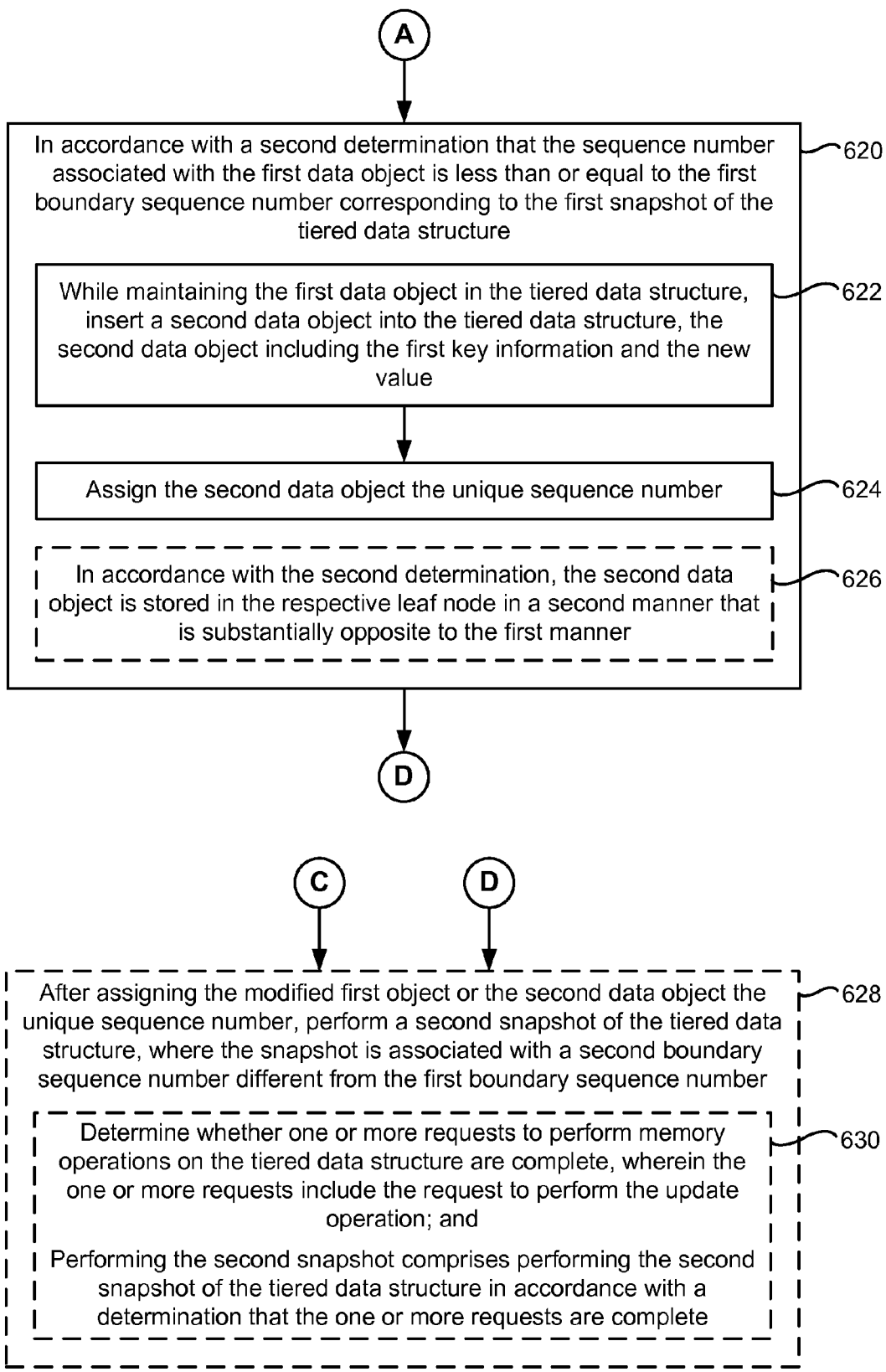
Figure 6D:
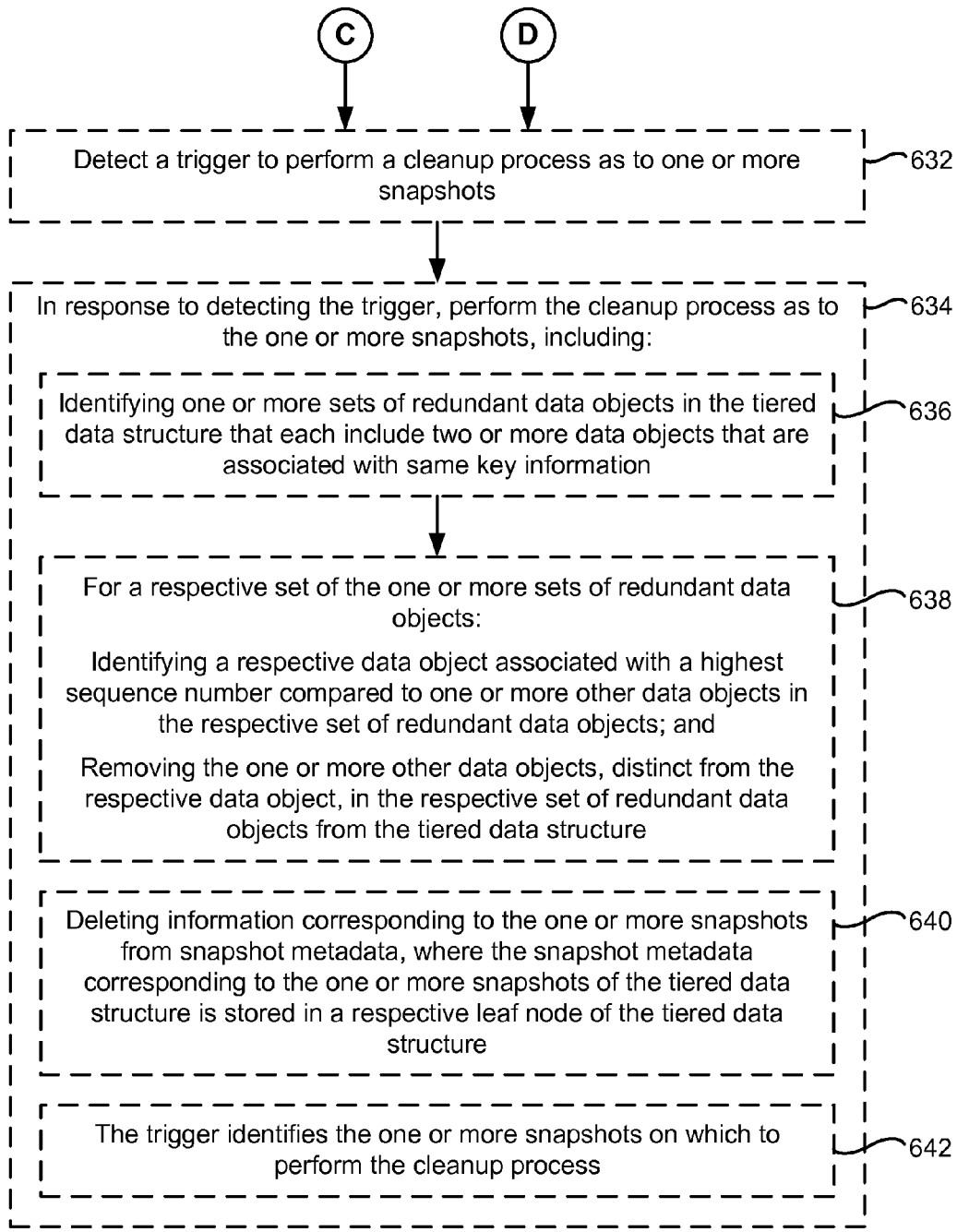
Figure 6E:
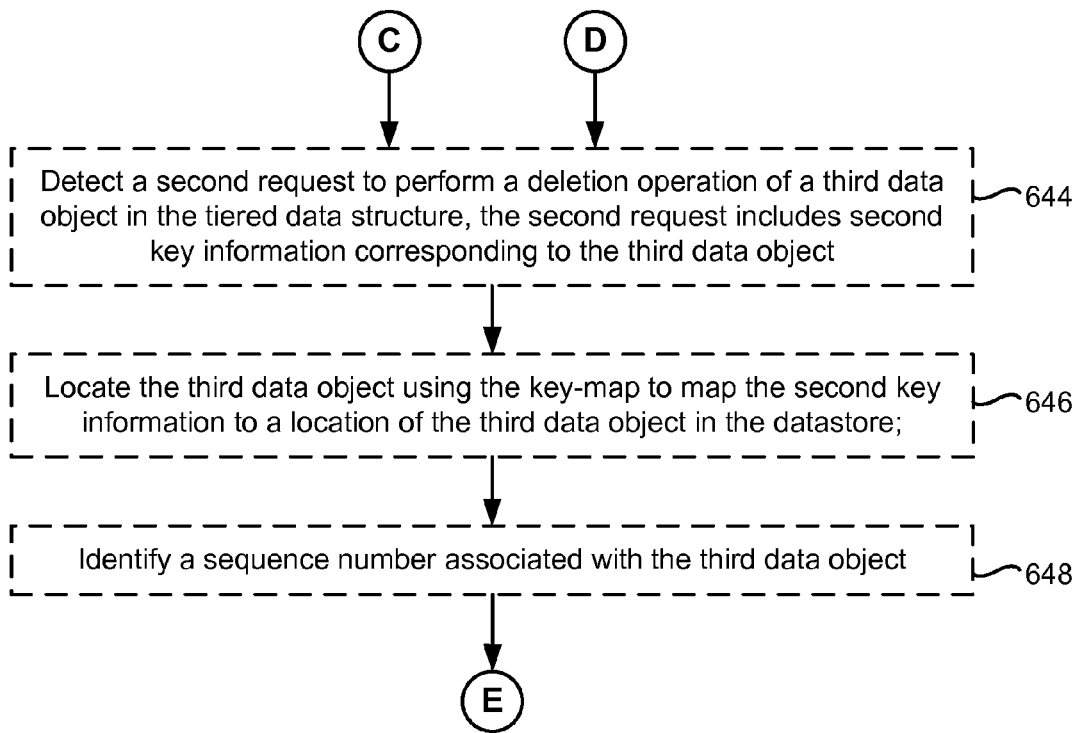
Figure 6F:
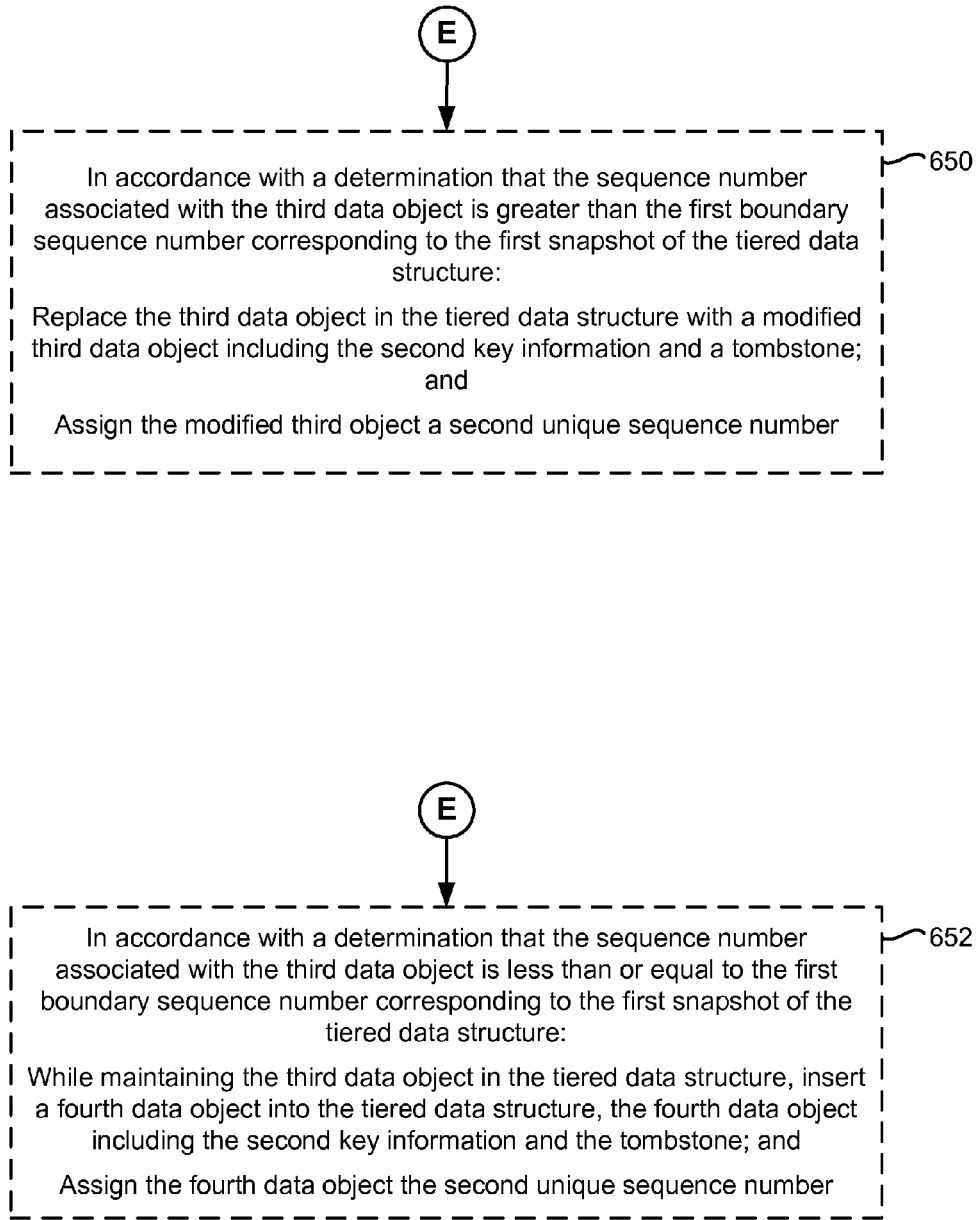

In FIG. 5D, state 544 shows TDS 502 and snapshot metadata 138 after management module 140 performs a cleanup process. For example, management module 140 receives a request to perform a cleanup process as to the first and second snapshots of TDS 502. In response to receiving this request, management module 140 identifies a cleanup sequence number (11) as the sequence number associated with the second snapshot in snapshot entry 524 and deletes snapshot entries 522 and 524 from snapshot metadata 138. Subsequently, management module 140 removes redundant data objects 512-11 and 512-2 from TDS 502 because data object 512-12 corresponds to the same key information as data objects 512-11 and 512-2 (e.g., key 2) but has a higher sequence number (e.g., sequence number 12) than data objects 512-11 and 512-2. Management module 140 also removes redundant data object 512-1 from TDS 502 because data object 512-10 corresponds to the same key information as data object 512-1 (e.g., key 1) but has a higher sequence number (e.g., sequence number 11) than data objects 512-1. Furthermore, management module removes data object 512-12 from TDS 502 because it includes a tombstone. Continuing with this example, the removal of data objects 512-1, 512-2, 512-11, and 512-12 and causes leaf nodes 506-4 and 506-5 to merge into leaf node 506-6 because the removal causes leaf nodes 506-4 and 506-5 to fall below the minimum leaf node size (e.g., a leaf node must include at least two data objects).

In state 544, internal node 504-4 includes: (key 3-sequence number 3) pointing to rightmost data object 512-3 in leaf node 506-6; (key 5-sequence number 5) pointing to rightmost data object 512-5 in leaf node 506-2; and (key 8-sequence number 8) pointing to rightmost data object 512-8 in leaf node 506-3. In state 544, snapshot metadata 138 includes no snapshot entries, and leaf node 506-6 includes: data object 512-10 corresponding to (key 1-sequence number 10) with value (V10); and data object 512-3 corresponding to (key 3-sequence number 3) with value (V3).

Attention is now directed to FIGS. 6A-6F, which illustrate a method 600 of managing a datastore storing one or more tiered data structures in accordance with some embodiments. Method 600 is, optionally, governed by instructions that are stored in a non-transitory computer readable storage medium and that are executed by one or more processors of a memory controller (e.g., management module 140, FIGS. 1 and 3). Each of the operations shown in FIGS. 6A-6F typically corresponds to instructions stored in a computer memory or non-transitory computer readable storage medium (e.g., memory 302 of management module 140 in FIG. 3). The computer readable storage medium optionally (and typically) includes a magnetic or optical disk storage device, solid state storage devices such as flash memory, 3D memory (as further described herein), or other non-volatile memory device or devices. The computer readable instructions stored on the computer readable storage medium typically include one or more of: source code, assembly language code, object code, or other instruction format that is interpreted or executed by one or more processors. In various embodiments, some operations in method 600 are combined and/or the order of some operations is changed from the order shown in FIGS. 6A-6F.

In some embodiments, method 600 is performed in a data storage system (e.g., data storage system 100, FIG. 1) that includes: (A) a memory controller (e.g., management module 140, FIGS. 1 and 3) with one or more processors (e.g., CPU(s) 142, FIGS. 1 and 3) and associated memory (e.g., memory 302, FIG. 3); (B) a non-volatile memory with snapshot metadata (e.g., snapshot metadata 138, FIG. 2B) and a datastore (e.g., datastore 136, FIG. 2B) storing one or more tiered data structures; and (C) a volatile memory with a key-map (e.g., non-persistent key-map 202, FIG. 2A) storing datastore location information for a plurality of keys corresponding to data objects in the one or more tiered data structures stored in the datastore. In some embodiments, the non-volatile memory ("NVM") comprises one or more NVM devices such as magnetic disk storage device(s), optical disk storage device(s), flash memory device(s), 3D memory device(s), or other NVM memory device(s). In some embodiments, the volatile memory comprises one or more volatile memory devices such as DRAM, SRAM, DDR RAM, or other random access solid state memory device(s). In some embodiments, the memory controller is operatively coupled with or, alternatively, includes the non-volatile memory and/or the volatile memory.

The memory controller detects (602) a request to perform an update operation of a first data object in a tiered data structure of the one or more tiered data structures stored in the datastore, the request includes first key information (e.g., a unique key or information from which a unique key can be identified such as a shortened key and a location/length of a key prefix) corresponding to the first data object and a new value for the first data object. In some embodiments, the corresponding value is data. In some embodiments, the corresponding value is a pointer identifying a location where the data is stored. In some embodiments, the data objects are contiguous data objects where the unique key information for a respective contiguous data object is adjacent or substantially adjacent to the corresponding value for the respective contiguous data object or other data for the respective contiguous data object that is adjacent to the corresponding value. In some embodiments, the data objects are split data objects where the unique key information for a respective split data object is separated from the corresponding value for the respective split data object by other data for other data objects and the unique key information for the respective split data object is stored with a pointer that identifies a location of the corresponding value for the respective split data object. For example, prior to state 534 in FIG. 5A, management module 140 receives a request to update the old value of a data object that corresponds to key 2 with a new value.

The memory controller locates (604) the first data object using a key-map to map the first key information to a location of the first data object in the datastore. In some embodiments, management module 140 locates the first data object by mapping the first key information to location information in non-persistent key-map 202. In some embodiments, the located first data object is a data object corresponding to the first key information with the highest sequence number. In some embodiments, the location information is the location of the data object in datastore 136, a pointer to the location of the data object in datastore 136, or the location of a slab in datastore 136 storing a leaf node of a respective TDS of the one or more tiered data structures stored in datastore 136 that includes the first data object. For example, with reference to FIG. 5A, in response to receiving the request to update the old value of the data object that corresponds to key 2 with a new value, management module 140 determines that data object 512-2 in TDS 502 corresponds to key 2.

The memory controller identifies (606) a sequence number associated with the first data object. In FIGS. 5A-5D, for example, data objects 512 included in leaf nodes 506 are each associated with a key information-sequence number paring (e.g., shown in FIGS. 5A-5D as K_-Q_) and data (e.g., a value shown in FIGS. 5A-5D as V_). For example, with reference to FIG. 5A, data object 512-2 is associated with sequence number 2.

In accordance with a first determination (608) that the sequence number associated with the first data object is greater than a first boundary sequence number corresponding to a first snapshot of the tiered data structure, the memory controller: replaces (610) the first data object in the tiered data structure with a modified first data object including the first key information and the new value; and assigns (612) the modified first data object a unique sequence number. In some embodiments, the boundary sequence number is the highest sequence number associated with the snapshot entries in snapshot metadata 138. In some embodiments, when a snapshot is performed on a respective TDS, the sequence number of the snapshot is the highest sequence number assigned to a data object in the respective TDS at the time the snapshot was performed. In some embodiments, when the snapshot is performed on two or more tiered data structures stored in datastore 136, the sequence number of the snapshot is the highest sequence number assigned to a data object in the two or more tiered data structures at the time the snapshot was performed. In FIG. 5A, for example, the first snapshot corresponding to snapshot entry 522 is the only snapshot of TDS 502, and, thus, the sequence number associated with the first snapshot (8) is the boundary sequence number.

In some embodiments, when the first data object is not locked in one of the snapshots, the first data object is replaced or updated in-place. In some embodiments, the first data object is replaced by a modified first data object that includes the new value. However, in some other embodiments, the first data object is not replaced by the modified first data object and, instead, the first data object is updated to include the new value. In FIG. 5B, for example, state 538 shows TDS 502 after management module 140 performs an update operation of the data object corresponding to key 2. For example, management module 140 receives a request to update the old value of a data object that corresponds to key 2 with a new value. In this example, management module 140 determines that data object 512-9 is the data object corresponding to key 2 with the highest sequence number (e.g., the newest data object corresponding to key 2). Continuing with this example, management module 140 then determines that data object 512-9 is not locked in the first snapshot because its unique sequence number (9) is greater than the boundary sequence number (8) corresponding to the first snapshot in snapshot entry 522. Further in this example, management module 140 updates/replaces the old value (e.g., V9) of data object 512-9 with the new value (V11) in-place so as to create new data object 512-11 corresponding to (key 2-sequence number 11) in leaf node 506-4.

In some embodiments, in accordance with the first determination, the memory controller stores (614) the modified first object in the respective leaf node of the tiered data structure in a first manner corresponding to a sorting scheme associated with the key information. In FIG. 5B, for example, state 538 shows that new data object 512-11 was stored in leaf node 506-4 in the predefined key order (e.g., right-to-left). For example, in FIGS. 5A-5D, the predefined key order for the keys in TDS 502 is monotonically ascending.

In some embodiments, the first boundary sequence number corresponds to (616) a highest sequence number assigned to a data object in the tiered data structure prior to the first snapshot. In some embodiments, the boundary sequence number is the highest sequence number associated with the snapshot entries in snapshot metadata 138. In some embodiments, when a snapshot is performed on a respective TDS, the sequence number of the snapshot is the highest sequence number assigned to a data object in the respective TDS at the time the snapshot was performed. In some embodiments, when the snapshot is performed on two or more tiered data structures stored in datastore 136, the sequence number of the snapshot is the highest sequence number assigned to a data object in the two or more tiered data structures at the time the snapshot was performed.

In some embodiments, the memory controller stores (618) snapshot metadata in a respective leaf node of the tiered data structure, the snapshot metadata includes the first boundary sequence number, corresponding to one or more snapshots (e.g., including the first snapshot) of the tiered data structure. In some embodiments, a snapshot is performed on one or more specified tiered data structures or all of the one or more tiered data structures stored in datastore 136. In some embodiments, snapshot metadata 138 stores a snapshot entry for each snapshot of the one or more tiered data structures stored in datastore 136. A respective snapshot entry for a snapshot in snapshot metadata 138 includes a sequence number of the snapshot, a timestamp of the snapshot (e.g., indicating the time the snapshot was performed or the time the snapshot entry was created), and a version number of the snapshot. In some embodiments, the respective snapshot entry also includes an indication of the one or more tiered data structures on which the snapshot was performed. In some embodiments, snapshot metadata 138 is located in a specified node with a well-known ID of one of the one or more tiered data structures stored in datastore 136. In this way, the node comprising snapshot metadata 138 is not (or is infrequently) evicted from cache 206, and the node comprising snapshot metadata 138 is accessed every time the tiered data structure is read from or written to. Alternatively, in some embodiments, each of the one or more tiered data structures stored in datastore 136 includes a node with a well-known ID that stores snapshot metadata corresponding to snapshots of the respective TDS.

In accordance with a second determination (620) that the sequence number associated with the first data object is less than or equal to the first boundary sequence number corresponding to the first snapshot of the tiered data structure, the memory controller: inserts (622) a second data object into the tiered data structure while maintaining the first data object in the tiered data structure, the second data object including the first key information and the new value; and assigns (624) the second data object the unique sequence number. In this embodiment, when the first data object is locked in one of the snapshots, a second data object that includes the new value is inserted into the TDS. In FIG. 5B, for example, state 536 shows TDS 502 after management module 140 performs an update operation of the data object corresponding to key 1. For example, management module 140 receives a request to update the old value of a data object that corresponds to key 1 with a new value. In this example, management module 140 determines that data object 512-1, which corresponds to key 1, is locked in the first snapshot because its unique sequence number (1) is less than the boundary sequence number (8) corresponding to the first snapshot in snapshot entry 522. Continuing with this example, while maintaining data object 512-1, management module 140 inserts new data object 512-10 corresponding to (key 1-sequence number 10) with the new value (V10) into leaf node 506-1.

In some embodiments, in accordance with the second determination, the memory controller stores (626) the second data object in the respective leaf node in a second manner that is substantially opposite to the first manner. In FIG. 5B, for example, state 536 shows that new data object 512-10 was inserted into leaf node 506-4 to the left of data object 512-1. As such, new data object 512-10 was inserted into leaf node 506-4 in a direction substantially opposite to the predefined key order (e.g., right-to-left).

In some embodiments, after assigning the modified first object or the second data object the unique sequence number, the memory controller performs (628) a second snapshot of the tiered data structure, where the snapshot is associated with a second boundary sequence number different from the first boundary sequence number. FIG. 5C, for example, state 540 shows snapshot metadata 138 after management module 140 performs a second snapshot of TDS 502. In state 540, snapshot metadata 138 includes snapshot entry 524 corresponding to the second snapshot. Snapshot entry 524 includes the following fields: A) sequence number 11 (e.g., a boundary sequence number) corresponding to the highest sequence number associated with a data object (e.g., data object 512-11) at the time of the second snapshot; B) a timestamp; and C) version number 2 indicating that snapshot entry 524 corresponds to a second snapshot of TDS 502. In FIG. 5C, for example, state 540 shows that the sequence number in snapshot entry 524 (11) corresponding to the second snapshot of TDS 502 is higher and different from the sequence number in snapshot entry 522 (8) corresponding to the first snapshot of TDS 502.

In some embodiments, the memory controller determines (630) whether one or more requests to perform memory operations on the tiered data structure are complete, where the one or more requests include the request to perform the update operation. In some embodiments, management module 140 or a component thereof (e.g., snapshot module 348, FIG. 3) performs the second snapshot of a specified TDS (or two or more specified tiered data structures) in accordance with a determination that the one or more requests to perform memory operations on the specified TDS are complete. As such, management module 140 or a component thereof (e.g., snapshot module 348, FIG. 3) waits to perform a snapshot on the specified TDS until all pending memory operations or transaction on the specified TDS are completed. As such, the snapshot is performed on a stable, consistent state of the specified TDS.

In some embodiments, the memory controller detects (632) a trigger to perform a cleanup process as to one or more snapshots. In some embodiments, the cleanup process is triggered according to a predefined schedule, by an event, or on-demand by a request from a requestor (e.g., computer system 110, FIG. 1). For example, the event includes a predetermined number of transactions or memory operations performed on the one or more tiered data structures stored in datastore 136 or restart/power-on of data storage system 100.

In some embodiments, in response to detecting the trigger, the memory controller performs (634) the cleanup process as to the one or more snapshots. In some embodiments, in response to the request to perform the cleanup process, management module 140 or a component thereof (e.g., cleanup module 350, FIG. 3) identifies a cleanup sequence number as the highest sequence number of the one or more specified snapshots. With reference to FIGS. 5C-5D, for example, management module 140 receives a request to perform a cleanup process as to the first and second snapshots (e.g., corresponding to snapshot entries 522 and 524, respectively). In this example, in response to receiving the request to perform the cleanup process, management module 140 or a component thereof (e.g., cleanup module 350, FIG. 3) identifies a cleanup sequence number as the highest sequence number of the first and second snapshots. Continuing with this example, in FIG. 5C, state 542 indicates that the sequence number corresponding to the second snapshot (11) in snapshot entry 524 is the highest sequence number between the snapshot entries 522 and 524 in snapshot metadata 138. Thus, in this example, the cleanup sequence number is 11.

In some embodiments, as part of the cleanup process, the memory controller identifies (636) one or more sets of redundant data objects in the tiered data structure that each include two or more data objects that are associated with same key information. For example, in state 542 of FIG. 5C, a first set of redundant data object includes data objects 512-1 and 512-10, which are both associated with key 1, and a second set of redundant data object includes data objects 512-2, 512-11, and 512-12, which are associated with key 2.

In some embodiments, as part of the cleanup process, for a respective set of the one or more sets of redundant data objects (638), the memory controller: identifies a respective data object associated with a highest sequence number compared to one or more other data objects in the respective set of redundant data objects; and removes the one or more other data objects, distinct from the respective data object, in the respective set of redundant data objects from the tiered data structure. In some embodiments, the one or more other data objects that are removed are data objects (i) associated with sequence numbers less than the sequence number of the identified data object with the highest sequence number in the set of redundant data objects, and (ii) associated with sequence numbers less than or equal to the cleanup sequence number. In some embodiments, the memory controller also removes all data objects that include a tombstone in the TDS (or multiple tiered data structures) associated with the one or more specified snapshots.

In FIG. 5D, for example, state 544 shows TDS 502 after management module 140 performs the cleanup process. For example, management module 140 receives a request to perform a cleanup process as to the first and second snapshots. Subsequently, management module 140 removes redundant data objects 512-11 and 512-2 from TDS 502 because data object 512-12 corresponds to the same key information as data objects 512-11 and 512-2 (e.g., key 2) but has a higher sequence number (e.g., sequence number 12) than data objects 512-11 and 512-2. Management module 140 also removes redundant data object 512-1 from TDS 502 because data object 512-10 corresponds to the same key information as data object 512-1 (e.g., key 1) but has a higher sequence number (e.g., sequence number 11) than data objects 512-1. Furthermore, management module removes data object 512-12 from TDS 502 because it includes a tombstone. After performing the cleanup process, leaf node 506-6, in state 544, includes: data object 512-10 corresponding to (key 1-sequence number 10) with value (V10); and data object 512-3 corresponding to (key 3-sequence number 3) with value (V3).

In some embodiments, as part of the cleanup process, the memory controller deletes (640) information corresponding to the one or more snapshots from snapshot metadata, where the snapshot metadata corresponding to the one or more snapshots of the tiered data structure is stored in a respective leaf node of the tiered data structure. In FIG. 5D, for example, state 544 shows snapshot metadata 138 after management module 140 performs the cleanup process. In response to receiving the request to perform the cleanup process as to the first and second snapshots, management module 140 deletes from snapshot metadata 138 snapshot entries 522 and 524 that correspond to the first and second snapshots, respectively. In state 544, for example, snapshot metadata 138 includes no snapshot entries.

In some embodiments, the trigger identifies (642) the one or more snapshots on which to perform the cleanup process. With respect to the example described above in steps 638 and 640, management module 140 receives a request to perform a cleanup process as to the first and second snapshots. In some embodiments, when the trigger does not specify one or more snapshots, an oldest snapshot or all snapshots are specified in the request to perform the cleanup process.

In some embodiments, the memory controller detects (644) a second request to perform a deletion operation of a third data object in the tiered data structure, the second request includes second key information corresponding to the third data object. For example, with respect to FIG. 5C, management module 140 receives a request to delete a data object that corresponds to key 2.

In some embodiments, the memory controller locates (646) the third data object using the key-map to map the second key information to a location of the third data object in the datastore. In some embodiments, management module 140 locates the third data object by mapping the second key information to location information in non-persistent key-map 202. For example, with reference to FIG. 5C, in response to receiving the request to delete the data object that corresponds to key 2, management module 140 determines that data objects 512-3 and 512-11 are associated with key 2. In this example, management module 140 determines that data object 512-11 is the data object corresponding to key 2 with the highest sequence number (e.g., the newest data object corresponding to key 2).

In some embodiments, the memory controller identifies (648) a sequence number associated with the third data object. For example, with reference to FIG. 5C, data object 512-11 is associated with sequence number 11.

In some embodiments, in accordance with a determination that the sequence number associated with the third data object is greater than the first boundary sequence number corresponding to the first snapshot of the tiered data structure, the memory controller (650): replaces the third data object in the tiered data structure with a modified third data object including the second key information and a tombstone; and assigns the modified third object a second unique sequence number. For example, management module 140 determines that the third data object is not locked in one of the snapshots of the TDS because its unique sequence number is greater than boundary sequence number. Continuing with this example, management module 140 updates/replaces in-place the old value the third data object with a tombstone so as to create a third modified data object with a new unique sequence number.

In some embodiments, in accordance with a determination that the sequence number associated with the third data object is less than or equal to the first boundary sequence number corresponding to the first snapshot of the tiered data structure, the memory controller (652): inserts a fourth data object into the tiered data structure while maintaining the third data object in the tiered data structure, the fourth data object including the second key information and the tombstone; and assigns the fourth data object the second unique sequence number. Continuing with the example in steps 646 and 648, management module 140 determines that data object 512-11 is locked in the second snapshot because its unique sequence number (11) is equal to the boundary sequence number (11) corresponding to the second snapshot in snapshot entry 524. Continuing with this example, while maintaining data object 512-11, management module 140 inserts new data object 512-12 corresponding to (key 2-sequence number 12) with a tombstone into leaf node 506-4. In some embodiments, the tombstone indicates that the associated data object has been deleted. In state 542 of FIG. 5C, leaf node 506-4 includes: data object 512-10 corresponding to (key 1-sequence number 10) with value (V10); data object 512-1 corresponding to (key 1-sequence number 1) with value (V1); new data object 512-12 corresponding to (key 2-sequence number 12) with a tombstone; and data object 512-11 corresponding to (key 2-sequence number 11) with value (V11).

It should be understood that the particular order in which the operations in FIGS. 6A-6F have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 700) are also applicable in an analogous manner to method 600 described above with respect to FIGS. 6A-6F. For example, the tiered data structures, data objects, nodes, and cleanup process described above with reference to method 600 optionally have one or more of the characteristics of the tiered data structures, data objects, nodes, and cleanup process described herein with reference to other methods described herein (e.g., method 700). For brevity, these details are not repeated here.

Figure 7A:
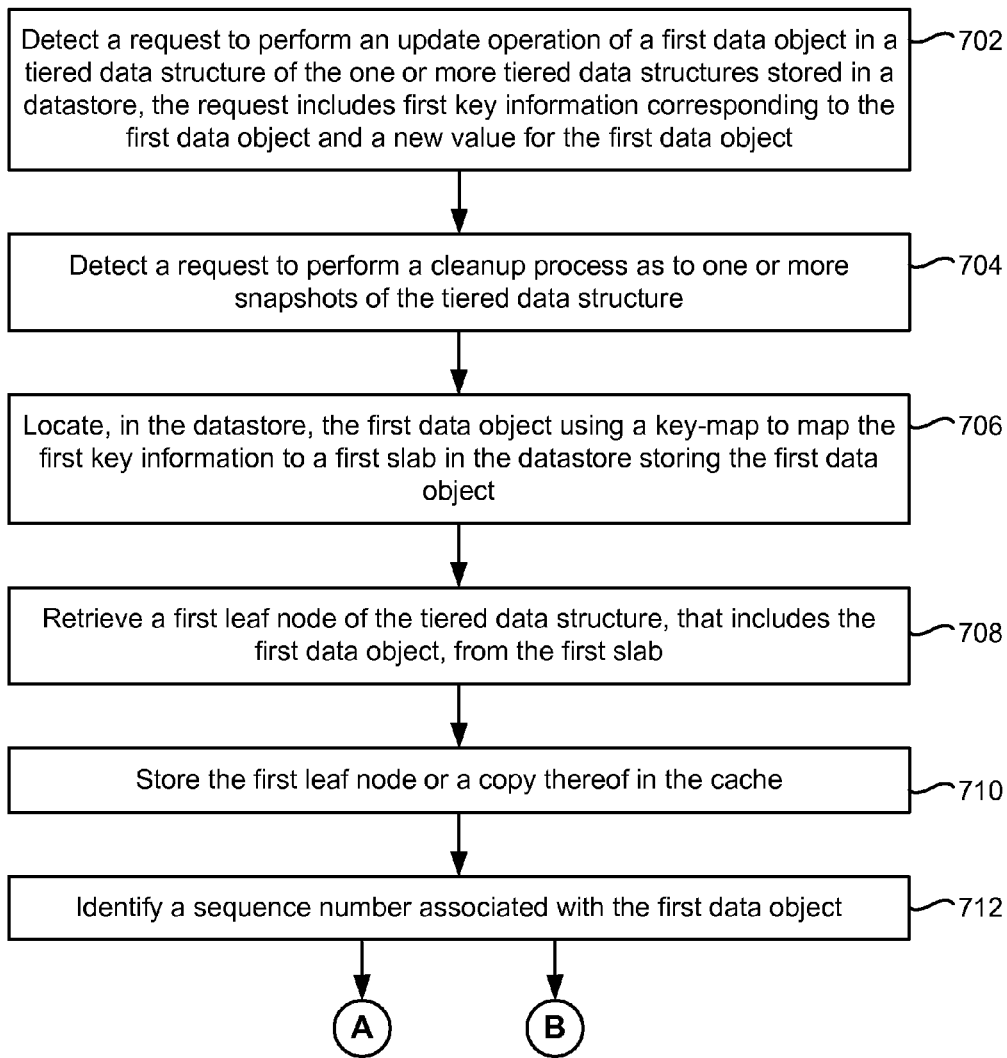
FIGS. 7A-7C illustrate a flowchart representation of a method of managing a tiered data structure in accordance with some embodiments.
Figure 7B:
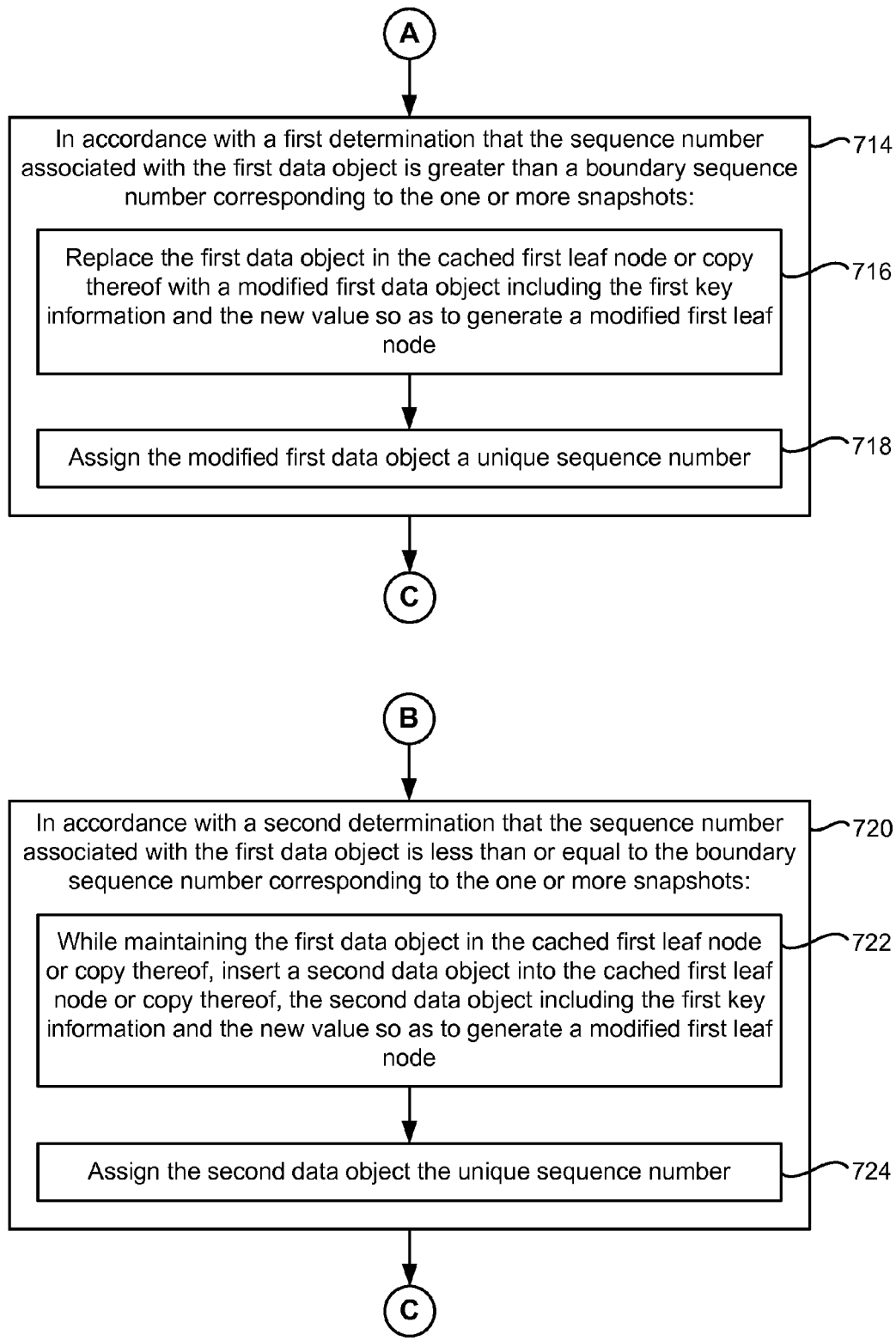
Figure 7C:
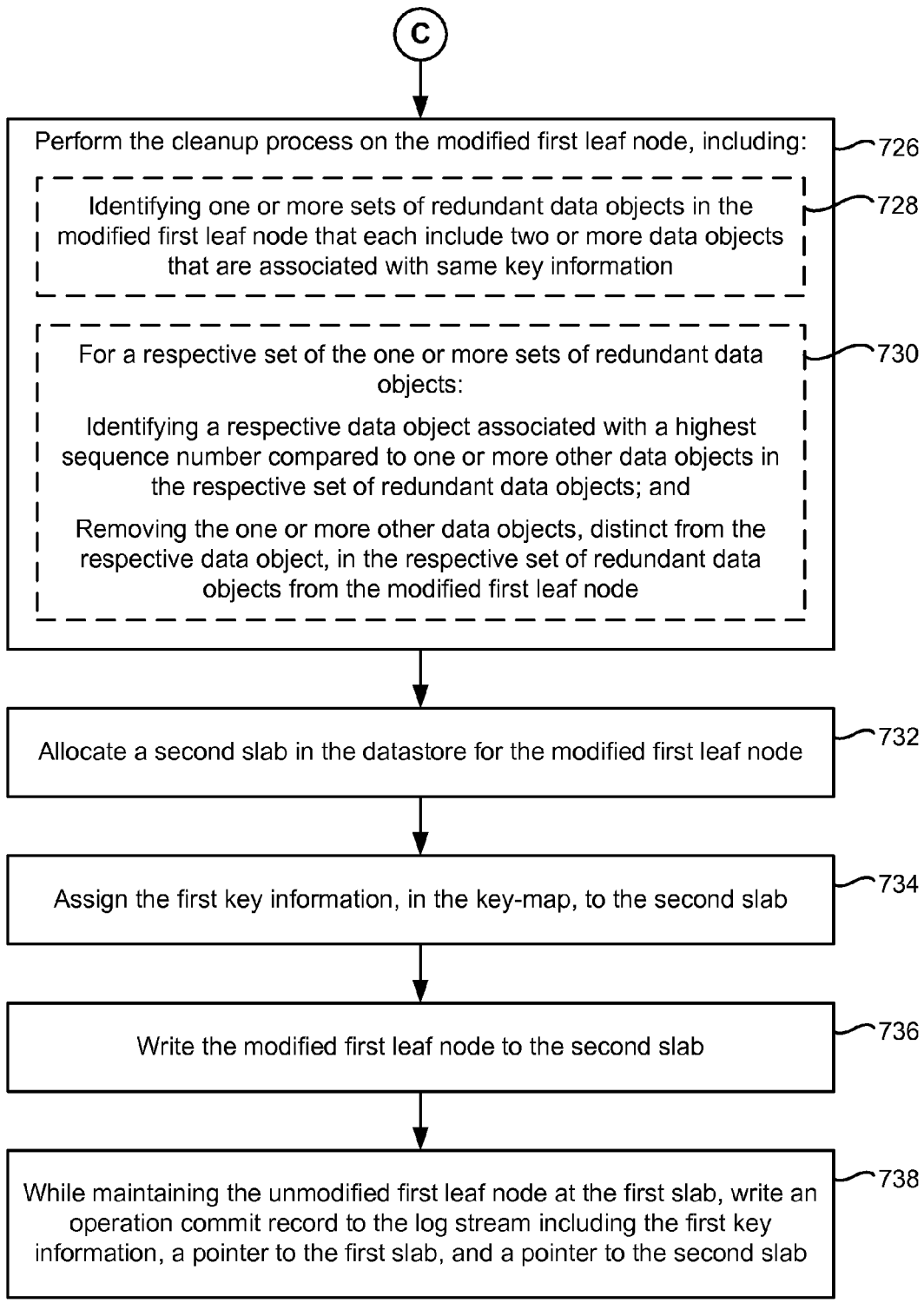

Attention is now directed to FIGS. 7A-7C, which illustrate a method 700 of managing a datastore storing one or more tiered data structures stored in accordance with some embodiments. Method 700 is, optionally, governed by instructions that are stored in a non-transitory computer readable storage medium and that are executed by one or more processors of a memory controller (e.g., management module 140, FIGS. 1 and 3). Each of the operations shown in FIGS. 7A-7C typically corresponds to instructions stored in a computer memory or non-transitory computer readable storage medium (e.g., memory 302 of management module 140 in FIG. 3). The computer readable storage medium optionally (and typically) includes a magnetic or optical disk storage device, solid state storage devices such as flash memory, 3D memory (as further described herein), or other non-volatile memory device or devices. The computer readable instructions stored on the computer readable storage medium typically include one or more of: source code, assembly language code, object code, or other instruction format that is interpreted or executed by one or more processors. In various embodiments, some operations in method 700 are combined and/or the order of some operations is changed from the order shown in FIGS. 7A-7C.

In some embodiments, method 700 is performed in a data storage system (e.g., data storage system 100, FIG. 1) that includes: (A) a memory controller (e.g., management module 140, FIGS. 1 and 3) with one or more processors (e.g., CPU(s) 142, FIGS. 1 and 3) and associated memory (e.g., memory 302, FIG. 3); (B) a non-volatile memory with snapshot metadata (e.g., snapshot metadata 138, FIG. 2B), a log stream (e.g., log stream 134, FIG. 2B), and a datastore (e.g., datastore 136, FIG. 2B) storing one or more tiered data structures; and (C) a volatile memory with a cache (e.g., cache 206, FIG. 2A) and a key-map (e.g., non-persistent key-map 202, FIG. 2A) storing datastore location information for a plurality of keys corresponding to data objects in the one or more tiered data structures stored in the datastore. In some embodiments, the non-volatile memory ("NVM") comprises one or more NVM devices such as magnetic disk storage device(s), optical disk storage device(s), flash memory device(s), 3D memory device(s), or other NVM memory device(s). In some embodiments, the volatile memory comprises one or more volatile memory devices such as DRAM, SRAM, DDR RAM, or other random access solid state memory device(s). In some embodiments, the memory controller is operatively coupled with or, alternatively, includes the non-volatile memory and/or the volatile memory.

The memory controller detects (702) a request to perform an update operation of a first data object in a tiered data structure of the one or more tiered data structures stored in the datastore, the request includes first key information (e.g., a unique key or information from which a unique key can be identified such as a shortened key and a location/length of a key prefix) corresponding to the first data object and a new value for the first data object. In some embodiments, the corresponding value is data. In some embodiments, the corresponding value is a pointer identifying a location where the data is stored. In some embodiments, the data objects are contiguous data objects where the unique key information for a respective contiguous data object is adjacent or substantially adjacent to the corresponding value for the respective contiguous data object or other data for the respective contiguous data object that is adjacent to the corresponding value. In some embodiments, the data objects are split data objects where the unique key information for a respective split data object is separated from the corresponding value for the respective split data object by other data for other data objects and the unique key information for the respective split data object is stored with a pointer that identifies a location of the corresponding value for the respective split data object. For example, prior to state 534 in FIG. 5A, management module 140 receives a request to update the old value of a data object that corresponds to key 2 with a new value.

The memory controller detects (704) a request to perform a cleanup process as to one or more snapshots of the tiered data structure. In some embodiments, the cleanup process is triggered according to a predefined schedule, by an event, or on-demand by a requestor (e.g., computer system 110, FIG. 1). For example, the event includes a predetermined number of transactions or memory operations performed on the one or more tiered data structures stored in datastore 136 or restart/power-on of data storage system 100. In some embodiments, the request includes one or more specified snapshots for the cleanup process. In some embodiments, when the request does not specify one or more snapshots for the cleanup process, the cleanup process is performed for an oldest snapshot or all snapshots.

In some embodiments, in response to the request to perform the cleanup process, management module 140 or a component thereof (e.g., cleanup module 350, FIG. 3) identifies a cleanup sequence number as the highest sequence number of the one or more specified snapshots. With reference to FIGS. 5C-5D, for example, management module 140 receives a request to perform a cleanup process as to the first and second snapshots (e.g., corresponding to snapshot entries 522 and 524, respectively). In this example, in response to receiving the request to perform the cleanup process, management module 140 or a component thereof (e.g., cleanup module 350, FIG. 3) identifies a cleanup sequence number as the highest sequence number of the first and second snapshots. Continuing with this example, in FIG. 5C, state 542 indicates that the sequence number corresponding to the second snapshot (11) in snapshot entry 524 is the highest sequence number between the snapshot entries 522 and 524 in snapshot metadata 138. Thus, in this example, the cleanup sequence number is 11.

The memory controller locates (706), in the datastore, the first data object using a key-map to map the first key information to a first slab in the datastore storing the first data object. In some embodiments, management module 140 locates the first data object by mapping the first key information to location information in non-persistent key-map 202. In some embodiments, the located first data object is a data object corresponding to the first key information with the highest sequence number. In some embodiments, the location information is the location of the data object in datastore 136, a pointer to the location of the data object in datastore 136, or the location of a slab in datastore 136 storing a leaf node of a respective TDS of the one or more tiered data structures stored in datastore 136 that includes the first data object. For example, with reference to FIG. 5A, in response to receiving the request to update the old value of the data object that corresponds to key 2 with a new value, management module 140 determines that data object 512-2 in TDS 502 corresponds to key 2.

The memory controller retrieves (708) a first leaf node of the tiered data structure from the first slab, the first leaf node includes the first data object. For example, with reference to FIG. 5A, after locating data object 512-2, management module 140 retrieves leaf node 506-1, including data object 512-2, from datastore 136.

The memory controller stores (710) the first leaf node or a copy thereof in the cache. Continuing with the example in steps 706 and 708, management module 140 stores leaf node 506-1 or a copy thereof in cache 206.

The memory controller identifies (712) a sequence number associated with the first data object. In FIGS. 5A-5D, for example, data objects 512 included in leaf nodes 506 are each associated with a key information-sequence number paring (e.g., shown in FIGS. 5A-5D as K_-Q_) and data (e.g., a value shown in FIGS. 5A-5D as V_). For example, with reference to FIG. 5A, data object 512-2 is associated with sequence number 2.

In accordance with a first determination (714) that the sequence number associated with the first data object is greater than a boundary sequence number, the memory controller: replaces (716) the first data object in the cached first leaf node or copy thereof with a modified first data object including the first key information and the new value so as to generate modified first leaf node; and assigns (718) the modified first data object a unique sequence number. In some embodiments, the boundary sequence number is the highest sequence number associated with the snapshot entries in snapshot metadata 138. In some embodiments, the boundary sequence number corresponds to the cleanup sequence number. However, in other embodiments, the boundary sequence number corresponds to a later snapshot that is not included in the one or more specified snapshots. In some embodiments, when a snapshot is performed on a respective TDS, the sequence number of the snapshot is the highest sequence number assigned to a data object in the respective TDS at the time the snapshot was performed. In some embodiments, when the snapshot is performed on two or more tiered data structures stored in datastore 136, the sequence number of the snapshot is the highest sequence number assigned to a data object in the two or more tiered data structures at the time the snapshot was performed. In FIG. 5A, for example, the first snapshot corresponding to snapshot entry 522 is the only snapshot of TDS 502, and, thus, the sequence number associated with the first snapshot (8) is the boundary sequence number.

In some embodiments, when the first data object is not locked in one of the snapshots, the first data object is replaced or updated in-place. In some embodiments, the first data object is replaced by s modified first data object that includes the new value. However, in some other embodiments, the first data object is not replaced by the modified first data object and, instead, the first data object is updated to include the new value. In FIG. 5B, for example, state 538 shows TDS 502 after management module 140 performs an update operation of the data object corresponding to key 2. For example, management module 140 receives a request to update the old value of a data object that corresponds to key 2 with a new value. In this example, management module 140 determines that data object 512-9 is the data object corresponding to key 2 with the highest sequence number (e.g., the newest data object corresponding to key 2). In this example, management module 140 retrieves leaf node 506-4, which includes data object 512-9, and stores leaf node 506-4 or a copy thereof in cache 206. Continuing with this example, management module 140 then determines that data object 512-9 is not locked in the first snapshot because its unique sequence number (9) is greater than the boundary sequence number (8) corresponding to the first snapshot in snapshot entry 522. Further in this example, management module 140 updates/replaces the old value (e.g., V9) of data object 512-9 with the new value (V11) in-place so as to create new data object 512-11 corresponding to (key 2-sequence number 11) in cached leaf node 506-4 or the copy thereof so as to generate a modified leaf node. For example, in state 538 of FIG. 5B, modified leaf node 506-4 includes: data object 512-10 corresponding to (key 1-sequence number 10) with value (V10); data object 512-1 corresponding to (key 1-sequence number 1) with value (V1); and new data object 512-11 corresponding to (key 2-sequence number 11) with value (V11).

In accordance with a second determination (720) that the sequence number associated with the first data object is less than or equal to the boundary sequence number, the memory controller: while maintaining the first data object in the cached first leaf node or copy thereof, inserts (722) a second data object into the cached first leaf node or copy thereof including the first key information and the new value so as to generate modified first leaf node; and assigning (724) the modified first data object a unique sequence number. In this embodiment, when the first data object is locked in one of the snapshots, a second data object that includes the new value is inserted into the TDS. In FIG. 5B, for example, state 536 shows TDS 502 after management module 140 performs an update operation of the data object corresponding to key 1. For example, management module 140 receives a request to update the old value of a data object that corresponds to key 1 with a new value. In this example, management module 140 retrieves leaf node 506-4, which includes data object 512-1, and stores leaf node 506-4 or a copy thereof in cache 206. In this example, management module 140 determines that data object 512-1, which corresponds to key 1, is locked in the first snapshot because its unique sequence number (1) is less than the boundary sequence number (8) corresponding to the first snapshot in snapshot entry 522. Continuing with this example, while maintaining data object 512-1, management module 140 inserts new data object 512-10 corresponding to (key 1-sequence number 10) with the new value (V10) into cached leaf node 506-4 or the copy thereof so as to generate a modified leaf node. For example, in state 536 of FIG. 5B, modified leaf node 506-4 includes: new data object 512-10 corresponding to (key 1-sequence number 10) with value (V10); data object 512-1 corresponding to (key 1-sequence number 1) with value (V1); and data object 512-9 corresponding to (key 2-sequence number 9) with value (V9).

The memory controller performs (726) the cleanup process on the modified first leaf node by identifying (728) one or more sets of redundant data objects in the modified first leaf node, where a respective set of redundant data objects includes two or more data objects with same key information. After generating the modified leaf node by performing the update operation on the cached leaf node, management module 140 or a component thereof (e.g., cleanup module 350, FIG. 3) performs the cleanup process on the modified leaf node by identifying zero or more sets of redundant data objects in the modified leaf node, where a respective set of redundant data objects includes two or more two or more data objects with same key information. For example, with respect to modified leaf node 506-4 in state 536 of FIG. 5B, the identified set of redundant data object includes data objects 512-1 and 512-10, which are both associated with key 1.

For a respective set of redundant objects, the memory controller (730): identifies a respective data object associated with a highest sequence number compared to the one or more other data objects in the respective set of redundant data objects; and removes the one or more other data objects, distinct from the respective data object, in the respective set of redundant data objects from the modified first leaf node. In some embodiments, the one or more other data objects that are removed are data objects (i) associated with sequence numbers less than the sequence number of the identified data object with the highest sequence number in the set of redundant data objects, and (ii) associated with sequence numbers less than or equal to the cleanup sequence number. In some embodiments, the memory controller also removes all data objects from the modified leaf node that include a tombstone. For example, with respect to modified leaf node 506-4 in state 536 of FIG. 5B, after identifying the set of redundant data object (e.g., data objects 512-1 and 512-10), management module 140 identifies data object 512-10 as the data object in the set of redundant data objects with the highest sequence number (e.g., 10) and removes data object 512-1 from modified leaf node 506-4 as data object 512-1 is both (i) associated with a sequence number (e.g., 1) that is lower than the sequence number associated with data object 512-10 (e.g., 10) and (ii) associated with a sequence number (e.g., 1) that is lower than the cleanup sequence number (e.g., 8, when the request to perform the cleanup process specified the first snapshot).

The memory controller allocates (732) a second slab in the datastore for the modified first leaf node. In some embodiments, after performing the cleanup process on the modified leaf node, management module 140 or a component thereof (e.g., allocation module 344, FIG. 3) allocates a free slab in datastore 136 for the modified leaf node.

The memory controller assigns (734) the first key information, in the key-map, to the second slab. In some embodiments, management module 140 or a component thereof updates keys in non-persistent key-map 202 that previously mapped to the slab storing the unmodified leaf node (e.g., the retrieved leaf node) to map to the slab allocated for the modified leaf node in step 732.

The memory controller writes (736) the modified first leaf node to the second slab in the datastore. In some embodiments, management module 140 or a component thereof writes the modified leaf node to the slab allocated for the modified leaf node in step 732.

In some embodiments, while maintaining the unmodified first leaf node at the first slab, the memory controller writes (738) an operation commit record corresponding to the update operation to the log stream, the operation commit record includes the first key information, a pointer to the first slab, and a pointer to the second slab. In some embodiments, the update operation is one of two or more memory operations included in a transaction requested by the requestor. The transaction is associated with a unique transaction identifier, and the operation commit record corresponding to the update operation also includes the unique transaction identifier. In some embodiments, after writing the modified leaf node in step 736, the management module 140 or a component thereof writes an operation commit record to log stream 134 that includes the unique transaction identifier, the first key information, a pointer to the slab storing the unmodified leaf node (e.g., the retrieved leaf node), and a pointer to the slab allocated for the modified leaf node in step 732.

It should be understood that the particular order in which the operations in FIGS. 7A-7C have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., method 600) are also applicable in an analogous manner to method 700 described above with respect to FIGS. 7A-7C. For example, the tiered data structures, data objects, nodes, and cleanup process described above with reference to method 700 optionally have one or more of the characteristics of the tiered data structures, data objects, nodes, and cleanup process described herein with reference to other methods described herein (e.g., method 600). For brevity, these details are not repeated here.

Semiconductor memory devices include: volatile memory devices such as dynamic random access memory ("DRAM") or static random access memory ("SRAM") devices; non-volatile memory devices such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"); and other semiconductor elements capable of storing information. Furthermore, each type of memory device may have different configurations. For example, flash memory devices may be configured in a NAND or a NOR configuration.

The memory devices can be formed from passive elements, active elements, or both. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles or a charge storage dielectric material.

Multiple memory elements may be configured so that they are connected in series or such that each element is individually accessible. By way of non-limiting example, NAND devices contain memory elements (e.g., devices containing a charge storage region) connected in series. For example, a NAND memory array may be configured so that the array is composed of multiple strings of memory in which each string is composed of multiple memory elements sharing a single bit line and accessed as a group. In contrast, memory elements may be configured so that each element is individually accessible such as a NOR memory array. One of skill in the art will recognize that the NAND and NOR memory configurations are exemplary, and memory elements may be otherwise configured.

The semiconductor memory elements included in a single device, such as memory elements located within and/or over the same substrate (e.g., a silicon substrate) or in a single die, may be distributed in a two- or three- dimensional manner (such as a two dimensional ("2D") memory array structure or a three dimensional ("3D") memory array structure).

In a two dimensional memory structure, the semiconductor memory elements are arranged in a single plane or single memory device level. Typically, in a two dimensional memory structure, memory elements are located in a plane (e.g., in an x-z direction plane) which extends substantially parallel to a major surface of a substrate that supports the memory elements. The substrate may be a wafer on which the material layers of the memory elements are deposited and/or in which memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arranged in non-regular or non-orthogonal configurations as understood by one of skill in the art. The memory elements may each have two or more electrodes or contact lines, including a bit line and a word line.

A three dimensional memory array is organized so that memory elements occupy multiple planes or multiple device levels, forming a structure in three dimensions (i.e., in the x, y, and z directions, where the y direction is substantially perpendicular and the x and z directions are substantially parallel to the major surface of the substrate).

As a non-limiting example, each plane in a three dimensional memory array structure may be physically located in two dimensions (one memory level) with multiple two dimensional memory levels to form a three dimensional memory array structure. As another non-limiting example, a three dimensional memory array may be physically structured as multiple vertical columns (e.g., columns extending substantially perpendicular to the major surface of the substrate in the y direction) having multiple elements in each column and therefore having elements spanning several vertically stacked planes of memory devices. The columns may be arranged in a two dimensional configuration, such as in an x-z plane, thereby resulting in a three dimensional arrangement of memory elements. One of skill in the art will understand that other configurations of memory elements in three dimensions will also constitute a three dimensional memory array.

By way of non-limiting example, in a three dimensional NAND memory array, the memory elements may be connected together to form a NAND string within a single plane, sometimes called a horizontal (e.g., x-z) plane for ease of discussion. Alternatively, the memory elements may be connected together to extend through multiple parallel planes. Other three dimensional configurations can be envisioned where some NAND strings contain memory elements in a single plane of memory elements (sometimes called a memory level) while other strings contain memory elements which extend through multiple parallel planes (sometimes called parallel memory levels). Three dimensional memory arrays may also be designed in a NOR configuration and in a ReRAM configuration.

A monolithic three dimensional memory array is one in which multiple planes of memory elements (also called multiple memory levels) are formed above and/or within a single substrate, such as a semiconductor wafer, according to a sequence of manufacturing operations. In a monolithic 3D memory array, the material layers forming a respective memory level, such as the topmost memory level, are located on top of the material layers forming an underlying memory level, but on the same single substrate. In some implementations, adjacent memory levels of a monolithic 3D memory array optionally share at least one material layer, while in other implementations adjacent memory levels have intervening material layers separating them.

In contrast, two dimensional memory arrays may be formed separately and then integrated together to form a non-monolithic 3D memory device in a hybrid manner. For example, stacked memories have been constructed by forming 2D memory levels on separate substrates and integrating the formed 2D memory levels atop each other. The substrate of each 2D memory level may be thinned or removed prior to integrating it into a 3D memory device. As the individual memory levels are formed on separate substrates, the resulting 3D memory arrays are not monolithic three dimensional memory arrays.

Associated circuitry is typically required for proper operation of the memory elements and for proper communication with the memory elements. This associated circuitry may be on the same substrate as the memory array and/or on a separate substrate. As non-limiting examples, the memory devices may have driver circuitry and control circuitry used in the programming and reading of the memory elements.

Further, more than one memory array selected from 2D memory arrays and 3D memory arrays (monolithic or hybrid) may be formed separately and then packaged together to form a stacked-chip memory device. A stacked-chip memory device includes multiple planes or layers of memory devices, sometimes called memory levels.

The term "three-dimensional memory device" (or 3D memory device) is herein defined to mean a memory device having multiple layers or multiple levels (e.g., sometimes called multiple memory levels) of memory elements, including any of the following: a memory device having a monolithic or non-monolithic 3D memory array, some non-limiting examples of which are described above; or two or more 2D and/or 3D memory devices, packaged together to form a stacked-chip memory device, some non-limiting examples of which are described above.

A person skilled in the art will recognize that the invention or inventions descried and claimed herein are not limited to the two dimensional and three dimensional exemplary structures described here, and instead cover all relevant memory structures suitable for implementing the invention or inventions as described herein and as understood by one skilled in the art.

It will be understood that, although the terms "first," "second," etc. may be used herein to describe various elements, these elements should not be limited by these terms. These terms are only used to distinguish one element from another. For example, a first data object could be termed a second data object, and, similarly, a second data object could be termed a first data object, which changing the meaning of the description, so long as all occurrences of the "first data object" are renamed consistently and all occurrences of the "second data object" are renamed consistently. The first data object and the second data object are both data objects, but they are not the same data object.

The terminology used herein is for the purpose of describing particular embodiments only and is not intended to be limiting of the claims. As used in the description of the embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific implementations. However, the illustrative discussions above are not intended to be exhaustive or to limit the claims to the precise forms disclosed. Many modifications and variations are possible in view of the above teachings. The implementations were chosen and described in order to best explain principles of operation and practical applications, to thereby enable others skilled in the art.

What is claimed is:

1. A method of managing a datastore storing one or more tiered data structures, comprising:
    at a memory controller with one or more processors, wherein the memory controller is operatively coupled with the datastore:
    detecting a request to perform an update operation of a first data object in a tiered data structure of the one or more tiered data structures stored in the datastore, the request includes first key information corresponding to the first data object and a new value for the first data object;
    locating the first data object using a key-map to map the first key information to a location of the first data object in the datastore;
    identifying a sequence number associated with the first data object;
    in accordance with a first determination that the sequence number associated with the first data object is greater than a first boundary sequence number corresponding to a first snapshot of the tiered data structure:
        replacing the first data object in the tiered data structure with a modified first data object including the first key information and the new value; and
        assigning the modified first object a unique sequence number; and
    in accordance with a second determination that the sequence number associated with the first data object is less than or equal to the first boundary sequence number corresponding to the first snapshot of the tiered data structure:
        while maintaining the first data object in the tiered data structure, inserting a second data object into the tiered data structure, the second data object including the first key information and the new value; and
        assigning the second data object the unique sequence number.

2. The method of claim 1, wherein the tiered data structure includes a plurality of internal nodes and a plurality of leaf nodes, a respective leaf node of the plurality of leaf nodes stores one or more data objects; and
    wherein each of the one or more data objects includes key information and a corresponding value and each of the one or more data objects is associated with a unique sequence number.

3. The method of claim 2, wherein, in accordance with the first determination, the modified first object is stored in the respective leaf node of the tiered data structure in a first manner corresponding to a sorting scheme associated with the key information; and
    wherein, in accordance with the second determination, the second data object is stored in the respective leaf node in a second manner that is substantially opposite to the first manner.

4. The method of claim 1, wherein the first boundary sequence number corresponds to a highest sequence number assigned to a data object in the tiered data structure prior to the first snapshot.

5. The method of claim 4, wherein snapshot metadata, including the first boundary sequence number, corresponding to one or more snapshots of the tiered data structure, including the first snapshot, is stored in a respective leaf node of the tiered data structure.

6. The method of claim 1, further comprising:
detecting a second request to perform a deletion operation of a third data object in the tiered data structure, the second request includes second key information corresponding to the third data object;
locating the third data object using the key-map to map the second key information to a location of the third data object in the datastore;
identifying a sequence number associated with the third data object;
in accordance with a determination that the sequence number associated with the third data object is greater than the first boundary sequence number corresponding to the first snapshot of the tiered data structure:
replacing the third data object in the tiered data structure with a modified third data object including the second key information and a tombstone; and
assigning the modified third object a second unique sequence number; and
in accordance with a determination that the sequence number associated with the third data object is less than or equal to the first boundary sequence number corresponding to the first snapshot of the tiered data structure:
while maintaining the third data object in the tiered data structure, inserting a fourth data object into the tiered data structure, the fourth data object including the second key information and the tombstone; and
assigning the fourth data object the second unique sequence number.

7. The method of claim 1, further comprising:
after assigning the modified first object or the second data object the unique sequence number, performing a second snapshot of the tiered data structure, wherein the snapshot is associated with a second boundary sequence number different from the first boundary sequence number.

8. The method of claim 7, further comprising:
determining whether one or more requests to perform memory operations on the tiered data structure are complete, wherein the one or more requests include the request to perform the update operation; and
wherein performing the second snapshot comprises performing the second snapshot of the tiered data structure in accordance with a determination that the one or more requests are complete.

9. The method of claim 1, further comprising:
detecting a trigger to perform a cleanup process as to one or more snapshots;
in response to detecting the trigger, performing the cleanup process as to the one or more snapshots, including:
identifying one or more sets of redundant data objects in the tiered data structure that each include two or more data objects that are associated with same key information;
for a respective set of the one or more sets of redundant data objects:
identifying a respective data object associated with a highest sequence number compared to one or more other data objects in the respective set of redundant data objects; and
removing the one or more other data objects, distinct from the respective data object, in the respective set of redundant data objects from the tiered data structure.

10. The method of claim 9, wherein performing the cleanup process as to the one or more snapshots further includes:
deleting information corresponding to the one or more snapshots from snapshot metadata;
wherein the snapshot metadata corresponding to the one or more snapshots of the tiered data structure is stored in a respective leaf node of the tiered data structure.

11. The method of claim 9, wherein the trigger identifies the one or more snapshots on which to perform the cleanup process.

12. The method of claim 1, wherein the datastore includes one or more three-dimensional (3D) memory devices and circuitry associated with operation of memory elements in the one or more 3D memory devices.

13. The method of claim 12, wherein the circuitry and one or more memory elements in a respective 3D memory device, of the one or more 3D memory devices, are on the same substrate.

14. A data storage system, comprising:
a datastore storing one or more tiered data structures; and
a memory controller with one or more processors, memory, and one or more programs, wherein the one or more programs are stored in the memory and configured to be executed by the one or more processors, the one or more programs including instructions for:
detecting a request to perform an update operation of a first data object in a tiered data structure of the one or more tiered data structures stored in the datastore, the request includes first key information corresponding to the first data object and a new value for the first data object;
locating the first data object using a key-map to map the first key information to a location of the first data object in the datastore;
identifying a sequence number associated with the first data object;
in accordance with a first determination that the sequence number associated with the first data object is greater than a first boundary sequence number corresponding to a first snapshot of the tiered data structure:
replacing the first data object in the tiered data structure with a modified first data object including the first key information and the new value; and
assigning the modified first object a unique sequence number; and
in accordance with a second determination that the sequence number associated with the first data object is less than or equal to the first boundary sequence number corresponding to the first snapshot of the tiered data structure:
while maintaining the first data object in the tiered data structure, inserting a second data object into the tiered data structure, the second data object including the first key information and the new value; and assigning the second data object the unique sequence number.

15. The data storage system of claim 14, wherein the tiered data structure includes a plurality of internal nodes and a plurality of leaf nodes, a respective leaf node of the plurality of leaf nodes stores one or more data objects; and
   wherein each of the one or more data objects includes key information and a corresponding value and each of the one or more data objects is associated with a unique sequence number.

16. The data storage system of claim 14, wherein the one or more programs, when executed by the one or more processors, cause the data storage system to:
   store modified first object, in accordance with the first determination, in the respective leaf node of the tiered data structure in a first manner corresponding to a sorting scheme associated with the key information; and
   store the second data object, in accordance with the second determination, in the respective leaf node in a second manner that is substantially opposite to the first manner.

17. The data storage system of claim 14, wherein the first boundary sequence number corresponds to a highest sequence number assigned to a data object in the tiered data structure prior to the first snapshot.

18. The data storage system of claim 14, wherein snapshot metadata, including the first boundary sequence number, corresponding to one or more snapshots of the tiered data structure, including the first snapshot, is stored in a respective leaf node of the tiered data structure.

19. The data storage system of claim 14, wherein the one or more programs, when executed by the one or more processors, cause the data storage system to:
   detect a second request to perform a deletion operation of a third data object in the tiered data structure, the second request includes second key information corresponding to the third data object;
   locate the third data object using the key-map to map the second key information to a location of the third data object in the datastore;
   identify a sequence number associated with the third data object;
   in accordance with a determination that the sequence number associated with the third data object is greater than the first boundary sequence number corresponding to the first snapshot of the tiered data structure:
      replace the third data object in the tiered data structure with a modified third data object including the second key information and a tombstone; and
      assign the modified third object a second unique sequence number; and
   in accordance with a determination that the sequence number associated with the third data object is less than or equal to the first boundary sequence number corresponding to the first snapshot of the tiered data structure:
      while maintaining the third data object in the tiered data structure, insert a fourth data object into the tiered data structure, the fourth data object including the second key information and the tombstone; and
      assign the fourth data object the second unique sequence number.

20. A non-transitory computer readable storage medium storing one or more programs, the one or more programs comprising instructions, which when executed by a memory controller with one or more processors, cause the memory controller to:
   detect a request to perform an update operation of a first data object in a tiered data structure of one or more tiered data structures stored in a datastore, the request includes first key information corresponding to the first data object and a new value for the first data object;
   locate the first data object using a key-map to map the first key information to a location of the first data object in the datastore;
   identify a sequence number associated with the first data object;
   in accordance with a first determination that the sequence number associated with the first data object is greater than a first boundary sequence number corresponding to a first snapshot of the tiered data structure:
      replace the first data object in the tiered data structure with a modified first data object including the first key information and the new value; and
      assign the modified first object a unique sequence number; and
   in accordance with a second determination that the sequence number associated with the first data object is less than or equal to the first boundary sequence number corresponding to the first snapshot of the tiered data structure:
      while maintaining the first data object in the tiered data structure, insert a second data object into the tiered data structure, the second data object including the first key information and the new value; and
      assign the second data object the unique sequence number.

* * * * *